(12) United States Patent
Iwagami et al.

(10) Patent No.: US 9,889,839 B2
(45) Date of Patent: Feb. 13, 2018

(54) VEHICLE ENGINE CONTROL SYSTEM

(71) Applicant: Mitsubishi Electric Corporation, Tokyo (JP)

(72) Inventors: Yuki Iwagami, Tokyo (JP); Koji Hashimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/271,326

(22) Filed: Sep. 21, 2016

(65) Prior Publication Data

US 2017/0291593 A1   Oct. 12, 2017

(30) Foreign Application Priority Data

Apr. 7, 2016   (JP) .................................. 2016-076987

(51) Int. Cl.
*B60W 10/06* (2006.01)
*F02D 41/00* (2006.01)
(Continued)

(52) U.S. Cl.
CPC ............ *B60W 10/06* (2013.01); *B60W 10/11* (2013.01); *F02D 41/0002* (2013.01);
(Continued)

(58) Field of Classification Search
None
See application file for complete search history.

(56) References Cited

U.S. PATENT DOCUMENTS

| 6,024,064 A * | 2/2000 | Kato ..................... F02D 41/065 |
| | | 123/179.17 |
| 6,799,110 B2 * | 9/2004 | Hashimoto ........... F02D 11/107 |
| | | 123/198 D |

(Continued)

FOREIGN PATENT DOCUMENTS

| JP | 2003-161194 A | 6/2003 |
| JP | 2007-177932 A | 7/2007 |

(Continued)

*Primary Examiner* — Dirk Wright
(74) *Attorney, Agent, or Firm* — Sughrue Mion, PLLC; Richard C. Turner

(57) ABSTRACT

There is provided a vehicle engine control system that includes engine and transmission control functions and enables evacuation driving to be readily performed. A monitoring control circuit unit and an error processing circuit unit monitors controlling operation of a main control circuit unit; when the occurrence frequency of valve-opening control abnormality becomes larger than threshold value, a first storage circuit stores the occurrence frequency, and driving of an intake valve control motor is stopped to set to fixed opening degree; when transmission-control abnormality is occurs, power supply to automatic transmission is stopped to set to the third speed fixation ratio; when an abnormality occurs, evacuation driving is implemented using fixed opening degree and automatic transmission ratio, variable rotation speed and fixed transmission ratio, or fixed opening degree and fixed transmission ratio. When valve-opening control abnormality or transmission-control abnormality occurs, fuel injection control is prevented from being inappropriately stopped.

14 Claims, 11 Drawing Sheets

(51) Int. Cl.
 *F02D 41/30* (2006.01)
 *F02D 41/26* (2006.01)
 *F02M 51/06* (2006.01)
 *B60W 10/11* (2012.01)

(52) U.S. Cl.
 CPC ......... *F02D 41/26* (2013.01); *F02D 41/3005* (2013.01); *F02M 51/061* (2013.01); *B60W 2510/0614* (2013.01); *B60W 2510/10* (2013.01); *B60W 2510/1005* (2013.01); *B60W 2710/0616* (2013.01)

(56) References Cited

U.S. PATENT DOCUMENTS

| | | | | |
|---|---|---|---|---|
| 7,621,837 B2* | 11/2009 | Sato | ........................ | F16H 61/12 475/127 |
| 7,912,600 B2* | 3/2011 | Iwagami | ................. | F02D 41/22 701/32.8 |
| 8,229,654 B2* | 7/2012 | Tahara | .................. | F02D 31/009 123/198 D |
| 8,755,980 B2* | 6/2014 | Sawada | ................. | F02D 31/003 180/336 |
| 8,942,908 B2* | 1/2015 | Worthing | ............... | F02D 11/107 123/198 D |
| 2003/0100975 A1 | 5/2003 | Hashimoto et al. | | |
| 2007/0161448 A1 | 7/2007 | Sato et al. | | |
| 2007/0161449 A1 | 7/2007 | Hayashi et al. | | |
| 2007/0167283 A1 | 7/2007 | Sato et al. | | |
| 2009/0134970 A1 | 5/2009 | Iwagami et al. | | |

FOREIGN PATENT DOCUMENTS

JP      2009-129267 A      6/2009
WO   WO-2013000646 A1 *   1/2013   .......... B60W 50/038

* cited by examiner

VEHICLE ENGINE CONTROL SYSTEM

INCORPORATION BY REFERENCE

The disclosure of Japanese Patent Application No. 2016-076987 filed on Apr. 7, 2016 including its specification, claims and drawings, is incorporated herein by reference in its entirety.

BACKGROUND OF THE INVENTION

The present invention relates to a vehicle engine control system provided with a microprocessor that has an engine control function and a transmission control function or with a first microprocessor and a second microprocessor that have the engine control function and the transmission control function, respectively, and particularly to a vehicle engine control system improved in such a way that a plurality of evacuation driving (limb-home) means can effectively be combined and utilized in response to an abnormality in valve-opening control of a throttle intake valve and/or an abnormality in speed-change control of a transmission.

DESCRIPTION OF THE RELATED ART

In general, engine control functions in a vehicle engine control system include a basic control function consisting of an ignition control function (in the case of a gasoline engine) and a fuel injection control function and a valve-opening control function for controlling the valve opening degree of an air-intake throttle; when an abnormality occurs in the valve-opening control, first evacuation driving can be implemented using a fixed throttle valve opening degree. In contrast, a transmission control function incorporated in the vehicle engine control system or implemented by a transmission control apparatus externally connected with the vehicle engine control system includes a speed-change control function that controls the transmission ratio of a continuously variable transmission in response to the step-on degree of the accelerator pedal and the present vehicle speed or performs multi-step automatic speed changing by combining the actions of a plurality of linear solenoid valves and hydraulic-clutch hydraulic pressure control, which is another basic control function, for back/forth switching, torque-converter lockup, all-wheel driving, and the like; when the control operation for the transmission is stopped, forward driving with a fixed transmission ratio suitable for a middle- or high-speed drive can be implemented.

For example, according to FIGS. 1 and 2 of Japanese Patent Application No. JP-A-2003-161194 (FIGS. 1 and 2 and ABSTRACT OF THE DISCLOSURE) "engine control apparatus", listed below, there are provided a main CPU 111 that functions as an engine control means for performing fuel injection control and valve-opening control of an intake valve and a sub-CPU 121 that functions as a transmission control means; when a first abnormality storage device 133 stores an abnormality, a power-supply load relay 104a for an intake valve opening degree control motor 108 is de-energized and then severe-abnormality evacuation driving is implemented using the fixed throttle valve opening degree represented in FIG. 2. The first abnormality storage device 133 is set when a first reset signal RST1 for the main CPU 111, a second reset signal RST2 for the sub-CPU 121, an actuator-system error output ER0, for valve-opening driving, that is detected by the main CPU 111, or a sever-sensor-abnormality detection output ER1 of a valve opening control system occurs; the first abnormality storage device 133 is reset when a power switch 107 is closed.

JP-A-2003-161194 is characterized in that an abnormality is categorized into a sever abnormality or a slight abnormality by determining, for example, as to whether both of a pair of accelerator position sensors that detects the step-on degree of an accelerator pedal are abnormal or any one of them is regarded as being normal or as to whether both of a pair of throttle position sensors that detects the intake valve opening degree are abnormal or any one of them is regarded as being normal, so that simple evacuation driving can be implemented without relying on the fixed throttle valve opening degree.

According to FIG. 1 of Japanese Patent Application No. JP-A-2009-129267 (FIG. 1, ABSTRACT OF THE DISCLOSURE, and Paragraphs [0006], [0007], [0008], and [0009]) "a vehicle electronic control apparatus with a monitoring control circuit", listed below, a main control circuit unit 20A that performs fuel injection control, valve-opening control of an intake valve, and speed-change control of a transmission is serial connected with a monitoring control circuit unit 30A that includes transmission-related input and output circuits; question information for monitoring the controlling operation of the main control circuit unit 20A is transmitted thereto by the monitoring control circuit unit 30A; the monitoring control circuit unit 30A compares answer information obtained from the main control circuit unit 20A with correct answer information preliminarily stored in the monitoring control circuit unit 30A so as to determine whether or not an abnormality exists in the control by the main control circuit unit 20A; then, in the case where an abnormality is detected, the monitoring control circuit unit 30A generates a reset output RST2 so as to initialize and then restart the main control circuit unit 20A. When detecting an abnormality in the monitoring control circuit unit 30A, the main control circuit unit 20A generates a reset output RST1 so as to initialize and then restart the monitoring control circuit unit 30A; a watchdog timer 40 monitors a watchdog signal WD, which is a pulse train signal generated by a microprocessor 20 included in the main control circuit unit 20A; when the pulse width of the watchdog signal WD exceeds a predetermined value, the watchdog timer 40 generates a reset pulse RST so as to initialize and then restart the main control circuit unit 20A and the monitoring control circuit unit 30A. JP-A-2009-129267 is characterized in that the same question information is repeatedly transmitted in order to prolong the question communication period so that synchronous communication of upstream and downstream signals is implemented while the control load on the main control circuit unit 20A is reduced.

In contrast, Japanese Patent Application No. JP-A-2007-177932 (FIG. 5, ABSTRACT OF THE DISCLOSURE, and Paragraph [0011]) "a hydraulic pressure controller for a multi-step automatic transmission" discloses a hydraulic pressure controller that makes it possible that in the case where when a vehicle is traveling, all of the solenoids of a plurality of electromagnetic valves for selecting a gear step turn off, the gear step is fixed to a relatively high-speed step and the engine is restarted so that the gear step is set to a relatively low-speed step and hence the vehicle is restarted. As a result, an abnormality that occurs while a vehicle travels can be prevented from suddenly decelerating the vehicle; moreover, restating after a temporary stop can be facilitated.

SUMMARY OF THE INVENTION

(1) Explanation for Problems in the Prior Art

In JP-A-2003-161194, the engine control apparatus is configured in such a way that actuator-system and sensor-system hardware abnormalities can be detected; however, when an abnormality exists in the control system, a hardware abnormality cannot be recognized although it exists, or a determination that a hardware abnormality exists is implemented although it does not exist; thus, the reliability of the abnormality detection means is posed as a problem. Moreover, in JP-A-2003-161194, when due to a run-away abnormality in the sub-CPU 121, the second reset signal RST2 is generated, the first abnormality storage device 133 stores the occurrence of this abnormality; as a result, power supply to the intake valve opening degree control motor 108 is stopped so that the valve opening degree is set to a fixed intake valve opening degree, and the transmission ratio is set, for example, to the third-speed fixed transmission ratio for middle- or high-speed driving. Accordingly, there has been a problem that in the case where the engine output is limited and the transmission ratio is set to the third speed for middle- or high-speed driving, it is difficult to escape from a run-off state or to drive on an uphill road. In the case where a transmission ratio fixation mechanism is designed in such a way that when the sub-CPU 121 is abnormally stopped by the second reset signal RST2, the transmission ratio is set to the first-speed ratio or the second-speed ratio for low-speed driving, the foregoing problems are solved; however, there has been a problem that when during high-speed driving, an abnormality occurs in the sub-CPU 121 and the transmission ratio moves to the first-speed ratio or the second-speed ratio, the sudden deceleration may be caused.

According to foregoing JP-A-2009-129267, the monitoring control circuit unit 30A determines whether or not an abnormality exists in the control performed by the main control circuit unit 20A, and in the case where an abnormality is detected, the main control circuit unit 20A is initialized and then restarted; thus, there is demonstrated a characteristic that in the case where hardware-abnormality detection based on JP-A-2003-161194 and control-abnormality detection based on JP-A-2009-129267 are combined, the abnormality detection means becomes many-sided. However, according to JP-A-2009-129267, when abnormal control by at least one of the valve-opening control means and the gear-shift control means continues, the main control circuit unit 20A is stopped by the reset output RST2; thus, there has been a problem that stoppage of the fuel injection control may make the evacuation driving infeasible.

Control abnormality includes a temporary abnormality caused by a malfunction attributed to noise or the like and a continuous abnormality caused by an abnormality in a microprocessor hardware; the continuous abnormality includes a non-runaway repeated abnormality in which repeated control operation of the microprocessor is continued and hence no watchdog-timer abnormality is caused and a runaway repeated abnormality in which the repeated control operation of the microprocessor is stopped and hence the watchdog-timer abnormality is caused. In the case the control abnormality is a temporary abnormality, the microprocessor is reset and restarted through reset processing, so that the abnormal state can be cancelled and be followed by the normal state. However, there has been a problem that the fuel injection control is stopped not only at a time when the runaway repeated abnormality is continuing but also at a time of the non-runaway repeated abnormality that is not so severe as the run-away abnormality.

According to foregoing JP-A-2007-177932, in the case where when a transmission-control abnormality occurs, the driving of the automatic transmission control electromagnetic valve is fully stopped, the transmission ratio moves to, for example, the third speed fixation suitable for middle- or high-speed driving, so that sudden deceleration of the vehicle can be prevented; however, when the vehicle should be restarted in this situation, it is required to restart the engine. When in order to restart the engine, the power switch is temporarily opened, the memory about the fact that an abnormality has occurred is reset, in general; thus, there has been a problem that when the abnormality factor has not been eliminated, the transmission-control abnormality occurs again as the driving is restarted and hence endless abnormality occurrence routine is caused. When a nonvolatile memory stores the fact that a transmission-control abnormality has occurred, this kind of problem is not caused; however, there has been a problem that in the case where the transmission-control abnormality has temporarily been caused by a malfunction attributed to noise, recovery processing for this abnormality cannot be implemented, although this abnormality is originally the one from which normal driving can be recovered by restarting.

(2) Objective of the Present Invention

The first objective of the present invention is that a single vehicle engine control system performs both engine control and transmission control so that as a whole, a compact, inexpensive, and integrated vehicle engine control system is configured, and that appropriate diverse evacuation driving that responds to an abnormality in the throttle valve control system and an abnormality in the transmission control system is made possible. The second objective of the present invention is that a vehicle engine control system is disposed in the vicinity of the engine and a transmission control apparatus is disposed in the vicinity of the transmission so that a separate-type vehicle engine control system that can shorten the lengths of input and output wiring leads is configured, and that further diverse evacuation driving that responds to an abnormality in the throttle valve control system and an abnormality in the transmission control system is made possible. The third objective of the present invention is that an integrated or separate-type vehicle engine control system is configured compact and inexpensive and in such a way as to make it possible to perform diverse evacuation driving in response to an abnormality in the throttle valve control system and an abnormality in the transmission control system; the third objective of the present invention is also to provide a vehicle engine control system that can raise the abnormality-monitoring function and can prevent evacuation driving function from being lost because due to the raising of the abnormality-monitoring function, the basic function is inappropriately stopped.

A vehicle engine control system according to the first invention of the present invention is a multi-function vehicle engine control system whose collective case includes a main control circuit unit connected with an engine control output circuit unit and a transmission control output circuit unit, a monitoring control circuit unit serial connected with the main control circuit unit, and an error processing circuit unit. The main control circuit unit includes a microprocessor that operates with an opening/closing signal or an analogue signal, as an input signal, obtained from a first sensor group and a second sensor group, which are utilized in engine control and transmission control, and that generates at least a fuel injection control output for a fuel-injection electromagnetic valve, a valve-opening control output for an intake valve opening degree control motor for an intake valve provided in an air-intake throttle, and a transmission-control output, including at least a speed-change control output, for an automatic transmission; and a valve-opening drive mechanism of the intake valve using the intake valve opening degree control motor includes an initial-position returning mechanism that makes it possible to perform evacuation driving using a fixed intake valve opening degree when power supply to the intake valve opening degree control motor is stopped. A transmission driving mechanism of the automatic transmission includes a transmission ratio fixation mechanism that makes it possible to at least travel forward at a fixed transmission ratio suitable for middle- or high-speed driving when during variable-speed forward driving, power supply to the automatic transmission is stopped or when power-supply driving of all automatic transmission control electromagnetic valves included in the automatic transmission is stopped; the monitoring control circuit unit is provided with a valve-opening system control abnormality determinator that sequentially transmits to the microprocessor in operation a plurality of question information pieces related to at least a creation program for the valve-opening control output, receives from the microprocessor answer information pieces corresponding to the question information pieces, compares the answer information pieces with the respective corresponding correct answer information pieces, preliminarily stored in the monitoring control circuit unit, determines whether or not a code check abnormality and an answering-response delay exist in the answer information so as to determine whether or not a valve-opening control abnormality including a communication abnormality and a question-answer abnormality exists, and then creates a valve opening control abnormality signal, which is one of valve opening system control abnormality signals.

The error processing circuit unit is provided with a watchdog timer that generates a basic reset signal when a calculation period of the microprocessor is abnormal and then initializes and restarts the microprocessor, a first storage circuit that is set when a first state is established in which the occurrence count or the occurrence frequency of each of the basic reset signal and the valve opening control abnormality signal becomes the same as or larger than a predetermined threshold value or the total occurrence count or the total occurrence frequency of the basic reset signal and the valve opening control abnormality signal becomes the same as or larger than a predetermined threshold value, and a first gate circuit; when the first storage circuit has stored the occurrence of an abnormality, a first cutoff circuit stops power supply to the intake valve opening degree control motor; the first gate circuit resets the microprocessor through the basic reset signal and the valve opening control abnormality signal when the first state has not been established, and after the first storage circuit has stored the occurrence of an abnormality, the first gate circuit prohibits the valve opening control abnormality signal from performing reset processing of the microprocessor so that a continuous non-runaway repeated abnormality related to valve-opening control is suppressed from providing an effect to fuel injection control, and the error processing circuit unit further detects and stores an occurrence state of at least a transmission system control abnormality signal, and a second cutoff circuit, which responds to the transmission system control abnormality signal, stops power supply to at least the automatic transmission control electromagnetic valve in the automatic transmission by having detected a transmission-control abnormality.

A vehicle engine control system according to the second invention of the present invention is a function-separated vehicle engine control system whose first case includes a first main control circuit unit connected with an engine control output circuit unit, a first monitoring control circuit unit serial connected with the first main control circuit unit, and a first error processing circuit unit. The vehicle engine control system is connected with a transmission control apparatus whose second case includes a second main control circuit unit connected with a transmission control output circuit unit, a second monitoring control circuit unit serial connected with the second main control circuit unit, and a second error processing circuit unit; the first main control circuit unit includes a first microprocessor that operates with an opening/closing signal or an analogue signal, as an input signal, obtained from a first sensor group, which is utilized in engine control, and a second sensor group, which is shared with partial transmission control, and that generates at least a fuel injection control output for a fuel-injection electromagnetic valve and a valve-opening control output for an intake valve opening degree control motor for an intake valve provided in an air-intake throttle; a valve-opening drive mechanism of the intake valve using the intake valve opening degree control motor includes an initial-position returning mechanism that makes it possible to perform evacuation driving using a fixed intake valve opening degree when power supply to the intake valve opening degree control motor is stopped; the second main control circuit unit includes a second microprocessor that operates with an opening/closing signal or an analogue signal, as an input signal, obtained from the second sensor group utilized in transmission control and the first sensor group, which is shared with partial engine control, and that generates at least a speed-change control output for an automatic transmission control electromagnetic valve; a transmission driving mechanism of an automatic transmission containing the automatic transmission control electromagnetic valve includes a transmission ratio fixation mechanism that makes it possible to at least travel forward at a fixed transmission ratio suitable for middle- or high-speed driving when during variable-speed forward driving, power supply to the automatic transmission is stopped or when driving of all the automatic transmission control electromagnetic valves is stopped.

The first monitoring control circuit unit is provided with a valve-opening system control abnormality determinator that sequentially transmits to the first microprocessor in operation a plurality of question information pieces related to at least a creation program for the valve-opening control output, receives from the first microprocessor answer information pieces corresponding to the question information pieces, compares the answer information pieces with the respective corresponding correct answer information pieces, preliminarily stored in the first monitoring control circuit unit, determines whether or not a code check abnormality and an answering-response delay exist in the answer information so as to determine whether or not a valve-opening control abnormality including a communication abnormality and a question-answer abnormality exists, and then creates the valve opening control abnormality signal, which is one of valve opening system control abnormality signals; the first error processing circuit unit is provided with a watchdog timer that generates a basic reset signal when a calculation period of the first microprocessor is abnormal and then initializes and restarts the first microprocessor, a first storage circuit that is set when a first state is established in which the occurrence count or the occurrence frequency of each of the basic reset signal and the valve opening control abnormality signal becomes the same as or larger than a predetermined threshold value or the total occurrence count or the total occurrence frequency of the basic reset signal and the valve opening control abnormality signal becomes the same as or larger than a predetermined threshold value, and a first gate circuit.

When the first storage circuit has stored the occurrence of an abnormality, a first cutoff circuit stops power supply to the intake valve opening degree control motor; the first gate circuit resets the first microprocessor through the basic reset signal and the valve opening control abnormality signal when the first state has not been established, and after the first storage circuit has stored the occurrence of an abnormality, the first gate circuit prohibits the valve opening control abnormality signal from performing reset processing of the first microprocessor so that a continuous non-runaway repeated abnormality related to valve-opening control is suppressed from providing an effect to fuel injection control; the second error processing circuit unit further detects and stores an occurrence state of at least a transmission system control abnormality signal, and a second cutoff circuit, which responds to the transmission system control abnormality signal, stops driving of or power supply to at least the automatic transmission control electromagnetic valve in the automatic transmission by having detected a transmission-control abnormality.

A vehicle engine control system according to the third invention of the present invention is a multi-function vehicle engine control system whose collective case includes a main control circuit unit connected with an engine control output circuit unit and a transmission control output circuit unit, a monitoring control circuit unit serial connected with the main control circuit unit, and an error processing circuit unit, or a function-separated vehicle engine control system whose first case includes a first main control circuit unit connected with an engine control output circuit units, a first monitoring control circuit unit serial connected with the first main control circuit unit, and a first error processing circuit unit.

The function-separated vehicle engine control system is connected with a transmission control apparatus whose second case includes a second main control circuit unit connected with a transmission control output circuit unit, a second monitoring control circuit unit serial connected with the second main control circuit unit, and a second error processing circuit unit; the monitoring control circuit unit, and the first monitoring control circuit unit and the second monitoring control circuit unit, and, the error processing circuit unit, and the first error processing circuit unit and the second error processing circuit unit are all integrated in such a way that the redundancy of common part among the corresponding circuit units is avoided, and the integrated device forms a shared integrated circuit device that collaborates with the main control circuit unit, the first main control circuit unit, or the second main control circuit unit; the main control circuit unit or the first main control circuit unit includes a microprocessor or a first microprocessor, as the case may be, that operates with an opening/closing signal or an analogue signal, as an input signal, obtained from a first sensor group, which is utilized in engine control, and a second sensor group, which is utilized in transmission control, and that generates at least a fuel injection control output for a fuel-injection electromagnetic valve and a valve-opening control output for an intake valve opening degree control motor for an intake valve provided in an air-intake throttle.

The main control circuit unit or the second main control circuit unit includes the microprocessor or the second microprocessor, as the case may be, that operates with an opening/closing signal or an analogue signal, as an input signal, obtained from the first sensor group, which is utilized in engine control, and the second sensor group, which is utilized in transmission control, and that generates a transmission-control output, including at least a speed-change control output, for an automatic transmission; a valve-opening drive mechanism of the intake valve using the intake valve opening degree control motor includes an initial-position returning mechanism that makes it possible to perform evacuation driving using a fixed intake valve opening degree when power supply to the intake valve opening degree control motor is stopped; a transmission driving mechanism of the automatic transmission includes a transmission ratio fixation mechanism that makes it possible to at least travel forward at a fixed transmission ratio suitable for middle- or high-speed driving when during variable-speed forward driving, power supply to the automatic transmission is stopped or when power-supply driving of all automatic transmission control electromagnetic valves included in the automatic transmission is stopped; a shared monitoring control circuit unit incorporated in the integrated circuit device is provided with a valve-opening system control abnormality determinator that sequentially transmits to the microprocessor or the first microprocessor in operation a plurality of question information pieces related to at least a creation program for the valve-opening control output, receives from the microprocessor or the first microprocessor answer information pieces corresponding to the question information pieces, compares the answer information pieces with the respective corresponding correct answer information pieces, preliminarily stored in the shared monitoring control circuit unit, determines whether or not a code check abnormality and an answering-response delay exist in the answer information so as to determine whether or not a valve-opening control abnormality including a communication abnormality and a question-answer abnormality exists, and then creates a valve opening control abnormality signal, which is one of valve opening system control abnormality signals.

A shared error processing circuit unit incorporated in the integrated circuit device is provided with a watchdog timer that generates a basic reset signal when a calculation period of the microprocessor or the first microprocessor is abnormal and then initializes and restarts the microprocessor or the first microprocessor, a first storage circuit that is set when a first state is established in which the occurrence count or the occurrence frequency of each of the basic reset signal and the valve opening control abnormality signal becomes the same as or larger than a predetermined threshold value or the total occurrence count or the total occurrence frequency of the basic reset signal and the valve opening control abnormality signal becomes the same as or larger than a predetermined threshold value, and a first gate circuit; when the first storage circuit has stored the occurrence of an abnormality, a first cutoff circuit stops power supply to the intake valve opening degree control motor; the first gate circuit resets the microprocessor or the first microprocessor through the basic reset signal and the valve opening control abnormality signal when the first state has not been established, and after the first storage circuit has stored the occurrence of an abnormality, the first gate circuit prohibits the valve opening control abnormality signal from performing reset processing of the microprocessor or the first microprocessor so that a continuous non-runaway repeated abnormality related to valve-opening control is suppressed from providing an effect to fuel injection control, and the main control circuit unit or the second main control circuit unit collaborates with the shared error processing circuit unit incorporated in the integrated circuit device so as to detect and store an occurrence state of at least a transmission system control abnormality signal, and a second cutoff circuit, which responds to the transmission system control abnormality signal, stops a driving output to at least the automatic transmission control electromagnetic valve in the automatic transmission by having detected a transmission-control abnormality.

As described above, the vehicle engine control system according to the first invention of the present invention includes a microprocessor that performs engine control and transmission control; when the first state is established in which the occurrence count or the occurrence frequency of each of the basic reset signal generated by the watchdog timer and the valve opening control abnormality signal generated by the control abnormality determinator becomes the same as or larger than a predetermined threshold value, the first storage circuit stores the occurrence of an abnormality and stops power supply to the intake valve opening degree control motor so as to set the intake valve opening degree to a fixed intake valve opening degree; until the first storage circuit stores the occurrence of an abnormality, the basic reset signal and the valve opening control abnormality signal implement reset processing of the microprocessor, and after the first storage circuit has stored the occurrence of an abnormality, the basic reset signal continues the reset processing of the microprocessor; however, the valve opening control abnormality signal is prohibited from implementing reset processing of the microprocessor. The microprocessor further responds to the occurrence of a transmission system control abnormality during variable-speed forward driving, and stops power supply to at least all the automatic transmission control electromagnetic valves, so that the driving mode moves to the mode of driving at a fixed transmission ratio for forward and middle- or high-speed driving.

In the vehicle engine control system according to the second invention of the present invention, the first microprocessor that performs engine control and the second microprocessor that performs transmission control are contained in respective separate cases and collaborate with each other; with regard to the first microprocessor, when the first state is established in which the occurrence count or the occurrence frequency of each of the basic reset signal generated by the watchdog timer and the valve opening control abnormality signal generated by the control abnormality determinator becomes the same as or larger than a predetermined threshold value, the first storage circuit stores the occurrence of an abnormality and stops power supply to the intake valve opening degree control motor so as to set the intake valve opening degree to a fixed intake valve opening degree; until the first storage circuit stores the occurrence of an abnormality, the basic reset signal and the valve opening control abnormality signal implement reset processing of the first microprocessor, and after the first storage circuit has stored the occurrence of an abnormality, the basic reset signal continues the reset processing of the first microprocessor; however, the valve opening control abnormality signal is prohibited from implementing reset processing of the first microprocessor. The second microprocessor further responds to the occurrence of a transmission system control abnormality during variable-speed forward driving, and stops power supply to at least all the automatic transmission control electromagnetic valves, so that the driving mode moves to the mode of driving at a fixed transmission ratio for forward and middle- or high-speed driving.

In the vehicle engine control system according to the third invention of the present invention, the microprocessor that performs engine control and transmission control or the first and second microprocessors that perform engine control and transmission control, respectively, are separately utilized; when the first state is established in which the occurrence count or the occurrence frequency of each of the basic reset signal generated by the watchdog timer and the valve opening control abnormality signal generated by the control abnormality determinator for each of the microprocessors the becomes the same as or larger than a predetermined threshold value, the first storage circuit stores the occurrence of an abnormality and stops power supply to the intake valve opening degree control motor so as to set the intake valve opening degree to a fixed intake valve opening degree; until the first storage circuit stores the occurrence of an abnormality, the basic reset signal and the valve opening control abnormality signal implement reset processing of the microprocessor for engine control, and after the first storage circuit has stored the occurrence of an abnormality, the basic reset signal continues the reset processing of the microprocessor for engine control; however, the valve opening control abnormality signal is prohibited from implementing reset processing of the microprocessor for engine control. The microprocessor or the second microprocessor related to transmission control responds to the occurrence of a transmission system control abnormality during variable-speed forward driving, and stops power supply to at least all the automatic transmission control electromagnetic valves, so that the driving mode moves to the mode of driving at a fixed transmission ratio for forward and middle- or high-speed driving.

Accordingly, abnormality monitoring by the watchdog timer on a sporadic abnormality or a continuous abnormality in the microprocessor and initialization/restarting processing based on the abnormality monitoring are always effective; with regard to the valve opening control abnormality signal related to valve-opening control of the intake valve, when after driving is started, an abnormality with less occurrence count or less occurrence frequency than a predetermined occurrence count or a predetermined occurrence frequency occurs, the microprocessor is initialized and restarted and recovery processing for the sporadic abnormality is performed, so that fuel injection control, the valve-opening control, and the transmission control can normally be performed; in the case where the occurrence of an abnormality continues, this recovery processing is stopped; thus, in the case of a non-runaway repeated abnormality that is a continuous abnormality but does not lead to a runaway abnormality of the microprocessor, the microprocessor is not reset by the basic reset signal; as a result, although the valve-opening control by the microprocessor cannot be implemented, the fuel injection control can be implemented and hence evacuation driving at a fixed transmission ratio becomes effective, and when a runaway abnormality occurs in the microprocessor, initialization and restarting are implemented through the basic reset signal; thus, there is demonstrated an effect that when the runaway abnormality is contingent and sporadic, at least fuel injection control recovers to the normal state and hence the evacuation driving can be continued.

An automatic transmission mechanically or electrically performs selection at least among the variable-speed forward driving mode, the backward driving mode, the neutral mode, and the parking mode; in the case where while the variable-speed forward driving mode is selected, a transmission system control abnormality occurs and hence power supply and driving of all the automatic transmission control electromagnetic valves are stopped or all power sources for the automatic transmission are cut off, the transmission ratio of the transmission is fixed to a ratio that is the middle transmission ratio or larger, for example, the third-speed forward driving mode; however, because the engine control is effective, there is demonstrated an effect that third-speed evacuation driving, which is more advantageous than evacuation driving at a fixed intake valve opening degree, can be implemented. In particular, when during high-speed driving, both the valve-opening control and the transmission control become abnormal, the high-speed driving is followed by the third-speed-fixed driving with a fixed throttle valve opening degree; however, because the transmission ratio is the middle-speed ratio or higher, for example, the third speed, there is demonstrated an effect that the engine brake does not operate in a rapid and abrupt manner. In this regard, however, when all the power sources for the automatic transmission are stopped, the present mode such as the backward driving mode, the forward driving mode, the neutral mode, or the parking mode is maintained regardless of which mode has been selected, and then the gear step is set, for example, to the third-speed fixation step.

The foregoing and other object, features, aspects, and advantages of the present invention will become more apparent from the following detailed description of the present invention when taken in conjunction with the accompanying drawings.

DETAILED DESCRIPTION OF THE EMBODIMENTS

Embodiment 1

(1) Detailed Description of Configuration

Figure 1:
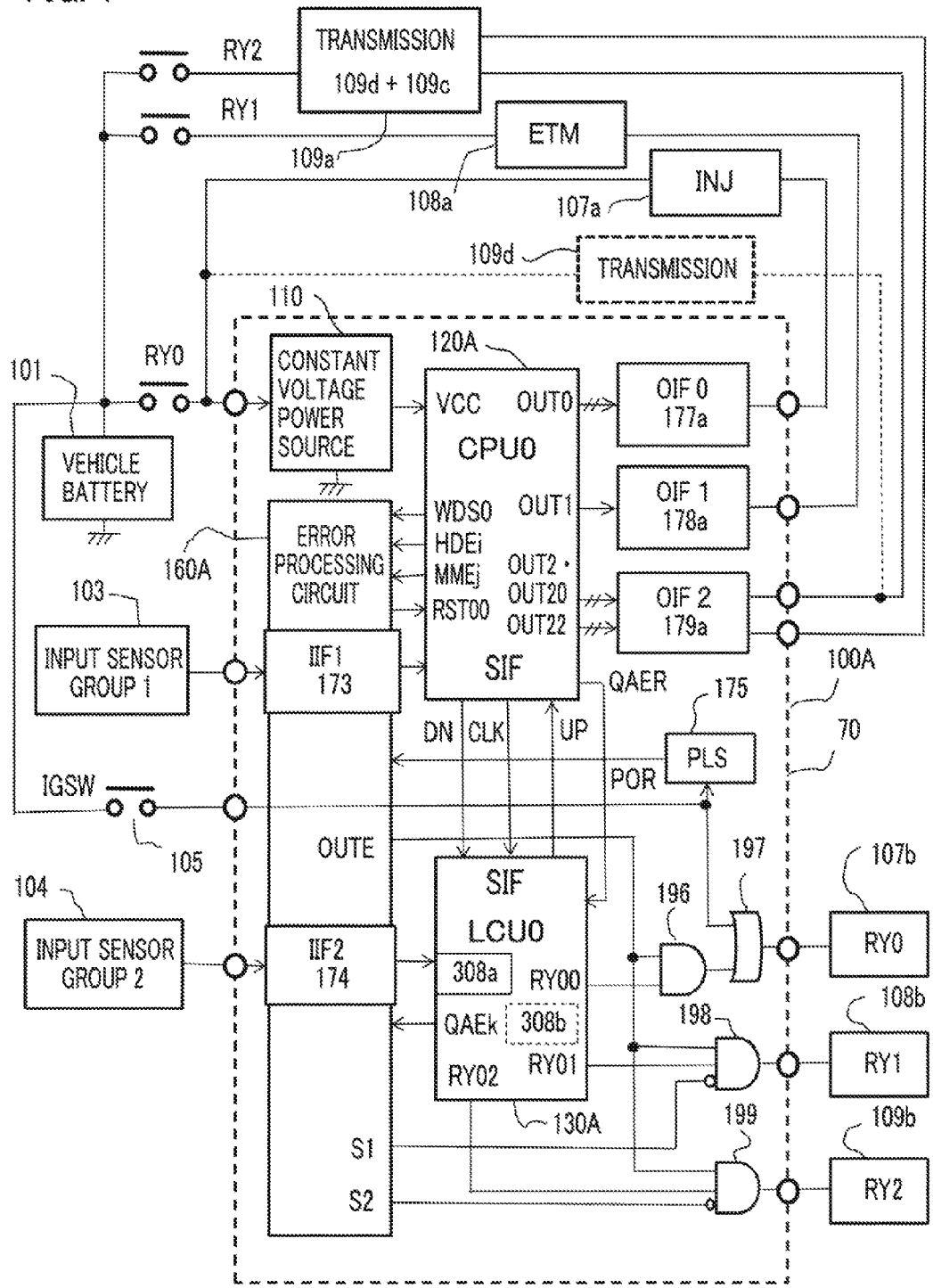
FIG. 1 is a block diagram illustrating the overall configuration of a vehicle engine control system according to Embodiment 1 of the present invention.

Hereinafter, with reference to FIG. 1, which is a block diagram illustrating the overall configuration of a vehicle engine control system 100A according to Embodiment 1 of the present invention, the configuration thereof will be explained in detail. In FIG. 1, the vehicle engine control system 100A is configured mainly with a main control circuit unit 120A, a monitoring control circuit unit 130A, and an error processing circuit unit 160A that are mounted on an unillustrated circuit board and are contained in a collective case 70; the vehicle engine control system 100A is an integrated engine control apparatus in which an engine control circuit function and a transmission control function are included. The power-source terminal of the vehicle engine control system 100A is connected with a vehicle battery 101 through a main apparatus power supply command output RY0, which is an output element of a main apparatus control power source relay 107b that is energized by way of an after-mentioned self-holding circuit 197 when a power switch 105 is closed. A first sensor group 103 includes various kinds of sensors to be utilized in controlling an engine such as a crank angle sensor for detecting the rotation angle of an engine and a rotation sensor for detecting the rotation speed thereof, an air flow sensor for measuring an intake amount of air that passes through a throttle intake valve, an accelerator position sensor for detecting the step-on degree of an accelerator pedal, a throttle position sensor for detecting an intake valve opening degree, and a gas sensor for detecting a concentration of oxygen in an exhaust-gas sensor.

In this regard, however, the accelerator position sensor and the engine rotation sensor among the various kinds of sensors are utilized also in transmission control. The second sensor group 104 includes various kinds of sensors to be utilized in controlling a transmission such as a vehicle speed sensor, a gearshift sensor for detecting the selection position of a gearshift lever, an oil temperature sensor or an oil pressure sensor in a transmission. In this regard, however, a vehicle speed sensor and a gearshift sensor among the various kinds of sensors are utilized also in engine control. A fuel-injection electromagnetic valve 107a, which is one of basic electric loads to be supplied with electric power by the vehicle battery 101 through the main apparatus power supply command output RY0, is provided in each of the cylinders of a multi-cylinder engine; in the case where this engine is a gasoline engine, an unillustrated ignition coil, as another one of the basic electric loads, is added thereto. An intake valve opening degree control motor 108a, which is a major first auxiliary apparatus, is supplied with electric power by the vehicle battery 101 through a first auxiliary apparatus power supply command output RY1, which is an output element of a valve-opening control power source relay 108b; there is provided a fail-safe mechanism for compulsory and mechanical resetting so that when power supply to the intake valve opening degree control motor 108a is stopped, the opening degree is set to a fixed intake valve opening degree at which a rotation speed higher than the idling rotation speed can be obtained.

An automatic transmission 109a, which is a major second auxiliary apparatus, is supplied with electric power by the vehicle battery 101 through a second auxiliary apparatus power supply command output RY2, which is an output element of a transmission control power source relay 109b; when the power supply is stopped, a predetermined fixed transmission ratio, which is a transmission ratio suitable for middle- or high-speed driving, is obtained. The basic electric loads of the automatic transmission 109a include a low-speed step selection electromagnetic valve 109d, which is driven when a low-speed forward driving mode or a backward driving mode is mechanically or electrically selected through manual operation of a gearshift lever; as the power supply system for the basic electric load, instead of the second auxiliary apparatus power supply command output RY2, the main apparatus power supply command output RY0 can also be utilized in such a way as represented by a dotted line; the low-speed step selection electromagnetic valve 109d is included in an automatic transmission control electromagnetic valve 109c or a dedicated electromagnetic valve is utilized, as the low-speed step selection electromagnetic valve 109d. The automatic transmission control electromagnetic valve 109c in the automatic transmission 109a is to change the transmission ratios in a no-step manner or in a multistep manner; in the case where when a variable-speed forward driving mode is selected, power supply to all the automatic transmission control electromagnetic valves 109c is stopped, the fixed transmission ratio suitable for middle- or high-speed driving is obtained.

With regard to the internal configuration of the vehicle engine control system 100A, the constant voltage power source 110 generates a control voltage Vcc, which is a stabilized voltage of, for example, DC 5V, and other stabilized voltages and supplies electric power to a microprocessor CPU0 and input/output interface circuit units. The main control circuit unit 120A, which is an integrated circuit device and includes mainly a microprocessor CPU0, is configured with a nonvolatile program memory, which is, for example, a flash memory, a data memory, which is part of the region of the program memory or another nonvolatile memory with which reading and writing can electrically be performed, a built-in memory including a volatile RAM, a multi-channel A/D converter, and a communication interface circuit SIF. The main control circuit unit 120A is connected with the first sensor group 103 by way of a first input interface circuit 173 and with the second sensor group 104 by way of a second input interface circuit 174; the main control circuit unit 120A is also connected with a fuel-injection electromagnetic valve 107a and the intake valve opening degree control motor 108a by way of engine control output circuit units 177a and 178a, respectively, and with an automatic transmission control electromagnetic valve 109c and the low-speed step selection electromagnetic valve 109d of the automatic transmission 109a by way of a transmission control output circuit unit 179a.

A fuel injection control output OUT0 generated by the microprocessor CPU0 performs energization drive of the fuel-injection electromagnetic valve 107a provided in each of the cylinders, at a predetermined timing and for a predetermined period; however, in practice, instantaneous rapid power supply control through an unillustrated stepped-up voltage or opened-valve holding control is implemented. A valve-opening control output OUT1 performs reversible rotation drive of the intake valve opening degree control motor 108a so as to obtain the valve opening degree of the air-intake throttle corresponding to a step-on degree of the accelerator pedal. A transmission-control output OUT2 for controlling the automatic transmission 109a includes a transmission control output OUT20 and a speed-change control output OUT22; in the case where the automatic transmission 109a operates in mechanical conjunction with a selection position of the shift lever to be manually operated, so that each of the driving modes including Reverse R, Neutral N, Low-speed forward D1, Variable-speed forward D, and Parking P is determined, the transmission control output OUT20 performs energization drive of the low-speed step selection electromagnetic valve 109d. In the case where the driving mode of the automatic transmission 109a is electrically controlled in conjunction with a selection position of the shift lever, for example, a control output for a motor that performs driving-mode-selection drive is added and the transmission control output OUT20 performs energization drive of the low-speed step selection electromagnetic valve 109d in the selected backward driving mode or low-speed forward driving mode.

The speed-change control output OUT22 operates in conjunction with the step-on degree of the accelerator pedal and the vehicle speed so as to perform energization drive of a plurality of automatic transmission control electromagnetic valves 109c at a time when a variable-speed forward driving mode is selected. The plurality of automatic transmission control electromagnetic valves 109c is configured in such a way that energization drive is selectively applied to one of or a number of them so that multistep transmission ratios are obtained; alternatively, each of the plurality of automatic transmission control electromagnetic valves 109c is a linear solenoid valve for obtaining a no-step transmission ratio by increasing or decreasing the effective diameter of a pair of variable-speed pulleys. The error processing circuit unit 160A, described later in FIG. 2, monitors the pulse width of a pulse train signal WDS0, which is a watchdog signal to be generated by the microprocessor CPU0; when the pulse width of the train signal WDS0 is normal, the error processing circuit unit 160A generates an output permission signal OUTE. In addition, the error processing circuit unit 160A monitors a hardware abnormality signal HDEi, a memory abnormality signal MMEj, and a question-answer abnormality signal QAEk to be generated by the monitoring control circuit unit 130A, described later in FIG. 3; in the case where an abnormality occurs, a composite reset signal RST00 initializes and then restarts the microprocessor CPU0.

The monitoring control circuit unit 130A is serial connected with the microprocessor CPU0 by way of the serial-parallel converter SIF, and the monitoring control circuit unit 130A and the microprocessor CPU0 mutually perform signal communication by use of a downstream signal DN and an upstream signal UP that are synchronized with a clock signal CLK; in this example, part of signals obtained from the second sensor group 104 are transmitted to the microprocessor CPU0 through the upstream signal UP. The monitoring control circuit unit 130A is provided with a valve-opening system control abnormality determination means 308a for creating the question-answer abnormality signal QAEk, and generates a main apparatus power supply control output RY00, a first auxiliary apparatus power supply control output RY01, and a second auxiliary apparatus power supply control output RY02 in response to commands issued by the microprocessor CPU0 through the downstream signal DN. In addition, with regard to the question-answer abnormality signal QAEk, the transmission system control abnormality determination means 308b may be omitted. The error processing circuit unit 160A generates a first state storage signal S1 for storing occurrence of an abnormality in the valve opening control system and a second state storage signal S2 for storing occurrence of an abnormality in the transmission control system; each of the storage states is erased by a reset circuit 175 that generates a power-on-reset signal POR when the power switch 105 is closed.

The power cutoff circuit 196 receives, as a self-holding signal for the self-holding circuit 197, the output of a logical multiplication of the main apparatus power supply control output RY00 generated by the monitoring control circuit unit 130A and the output permission signal OUTE generated by the error processing circuit unit 160A; a circuit-closure signal from the power switch 105 is inputted, as a driving signal for a logical sum, to the self-holding circuit 197; the output of the self-holding circuit 197 energizes the main apparatus control power source relay 107b. Accordingly, when the power switch 105 is closed, the main apparatus control power source relay 107b is energized, so that the main apparatus power supply command output RY0 is generated, and hence the microprocessor CPU0 starts its operation and generates the main apparatus power supply control output RY00; after that, even when the power switch 105 is closed, the energization of the main apparatus control power source relay 107b is continued; however, when the microprocessor CPU0 stops the main apparatus power supply control output RY00 or when the error processing circuit unit 160A stops the output permission signal OUTE, the main apparatus control power source relay 107b is de-energized.

A first cutoff circuit 198 energizes the valve-opening control power source relay 108b by use of the output of a logical multiplication of the first auxiliary apparatus power supply control output RY01 generated by the monitoring control circuit unit 130A, the output permission signal OUTE generated by the error processing circuit unit 160A, and the logical inversion signal of the first state storage signal S1; the valve-opening control power source relay 108b is energized and controlled by the first auxiliary apparatus power supply control output RY01; however, when the watchdog signal becomes abnormal and hence the output permission signal OUTE is stopped or when the first state storage signal S1 is generated as an abnormality occurs in the valve opening control system, the valve-opening control power source relay 108b is de-energized. A second cutoff circuit 199 energizes the transmission control power source relay 109b by use of the output of a logical multiplication of the second auxiliary apparatus power supply control output RY02 generated by the monitoring control circuit unit 130A, the output permission signal OUTE generated by the error processing circuit unit 160A, and the logical inversion signal of the second state storage signal S2; the transmission control power source relay 109b is energized and controlled by the second auxiliary apparatus power supply control output RY02; however, when the watchdog signal becomes abnormal and hence the output permission signal OUTE is stopped or when the second state storage signal S2 is generated as an abnormality occurs in the transmission control system, the transmission control power source relay 109b is de-energized.

The microprocessor CPU0 generates a reverse monitoring abnormality determination signal QAER for resetting the monitoring control circuit unit 130A; the reverse monitoring abnormality determination signal QAER is a signal for initializing the monitoring control circuit unit 130A in the case where when in response to question information obtained from the monitoring control circuit unit 130A, the microprocessor CPU0 intentionally transmits an erroneous answer to the monitoring control circuit unit 130A, monitors the processing state of the monitoring control circuit unit 130A, and then determines whether or not the monitoring control circuit unit 130A is normally operating, it is determined that the monitoring control circuit unit 130A is not normally operating. With regard to the basic electric loads of the automatic transmission 109a, in the case where selection control of the positions of Reverse, Neutral, Forward, and Parking is electrically performed through manual operation of the gearshift lever, this mode selection function is regarded as the second basic function of the microprocessor CPU0; as the power supply system for the basic electric load including the low-speed step selection electromagnetic valve 109d, instead of the second auxiliary apparatus power supply command output RY2, the main apparatus power supply command output RY0 can also be utilized in such a way as represented by a dotted line. As the microprocessor CPU0 whose control load is large, a multicore CPU can also be utilized.

Figure 2:
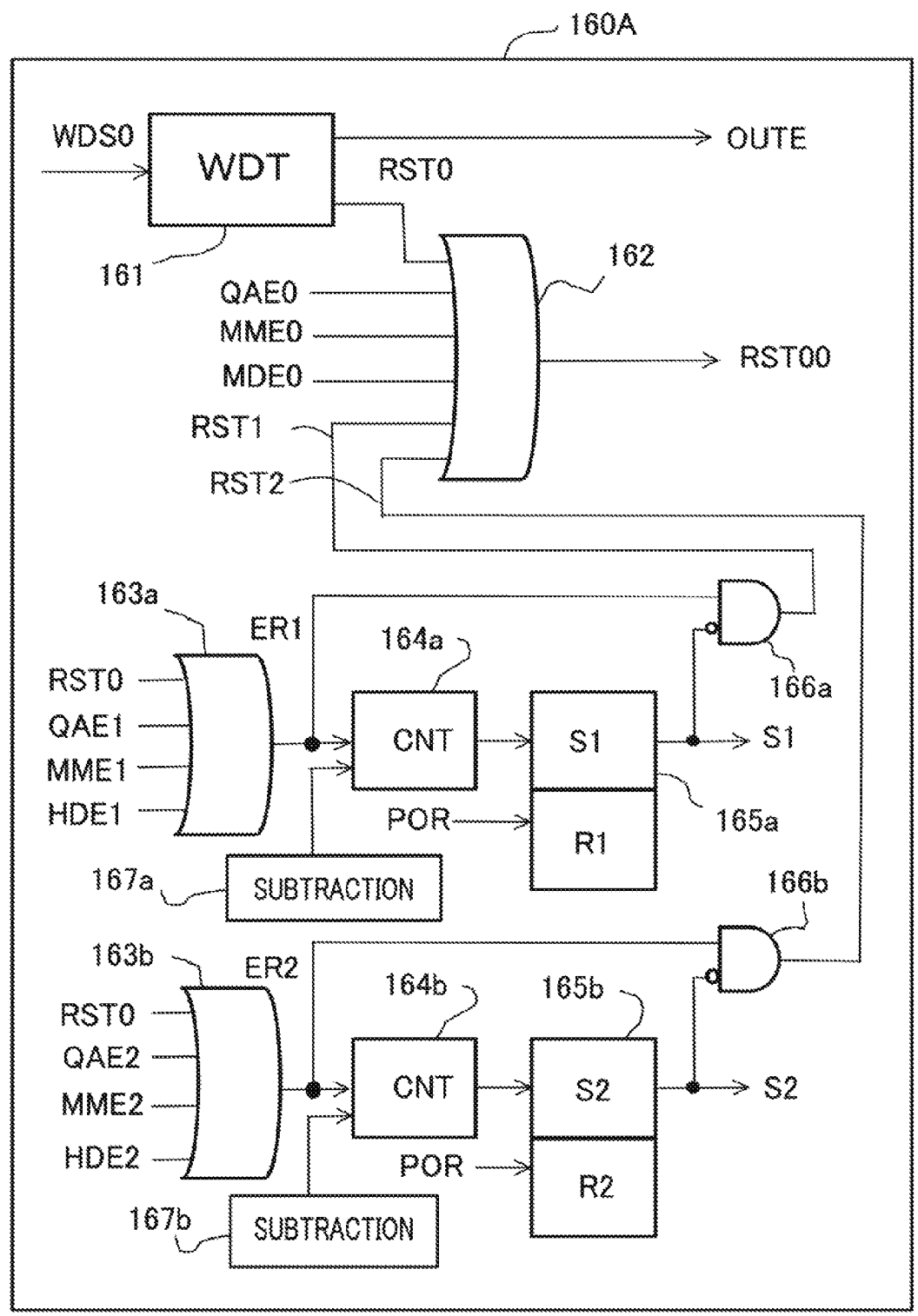
FIG. 2 is a detailed circuit configuration diagram of an error processing circuit unit in the vehicle engine control system in FIG. 1.

Next, FIG. 2, which is a detailed circuit configuration diagram of the error processing circuit unit represented in FIG. 1, will be explained. In FIG. 2, a watchdog timer 161 provided in the error processing circuit unit 160A measures the on-time width and the off-time width of the pulse train signal WDS0, which is a watchdog signal generated by the microprocessor CPU0; when the pulse width of the pulse train signal WDS0 exceeds a predetermined time, the watchdog timer 161 generates a basic reset signal RST0, and when the microprocessor CPU0 normally operates, the watchdog timer 161 generates the output permission signal OUTE. The error processing circuit unit 160A is provided with a total logical sum circuit 162 for generating the composite reset signal RST00, a first logical sum circuit 163a for generating a valve opening system control abnormality signal ER1, and a second logical sum circuit 163b for generating a transmission system control abnormality signal ER2. The basic reset signal RST0 generated by the watchdog timer 161, a valve opening control abnormality signal QAE1 generated by the valve-opening system control abnormality determination means 308a, described later in FIG. 3, a valve opening control unit memory abnormality signal MME1 generated by the microprocessor CPU0, and a valve opening control unit H/W abnormality signal HDE1 are inputted to and logically summed up in the first logical sum circuit 163a.

With regard to the first logical sum circuit 163a, the valve opening control abnormality signal QAE1 is an abnormality detection signal that relates to a creation program for the valve-opening control output OUT1, which is created by the microprocessor CPU0, and that is created by the monitoring control circuit unit 130A in the case where when each of two or more question information pieces to be generated by the monitoring control circuit unit 130A and corresponding answer information obtained from the microprocessor CPU0 are compared with each other, no predetermined correct answer information is obtained. The valve opening control unit memory abnormality signal MME1 is an abnormality detection signal that is created by the microprocessor CPU0 when there occurs a code check abnormality related to a valve-opening control region of the RAM that collaborates with the microprocessor CPU0. The valve opening control unit H/W abnormality signal HDE1 is an abnormality detection signal that is created by the microprocessor CPU0 when there occurs a hardware error that is caused by disconnection or a short circuit in part of the input/output circuits that are connected with the microprocessor CPU0 and are related to valve-opening control. A first counter 164a counts the number of occurrence instances of the valve opening system control abnormality signal ER1, which is an output signal of the first logical sum circuit 163a; when the number of occurrence instances thereof reaches a predetermined threshold number, the first counter 164a sets a first storage circuit 165a, which is a flip-flop circuit, so as to generate the first state storage signal S1.

A subtraction clock signal 167a periodically decreases the present counting value of the first counter 164a so that when the occurrence frequency of the valve opening system control abnormality signal ER1 is low, the present counting value of the first counter 164a does not increase up to a predetermined threshold number and hence the first storage circuit 165a is not set; subtraction limitation prevents the present counting value from becoming smaller than "0". The first storage circuit 165a is reset by a power-on-reset signal POR to be generated when the power switch 105 is closed. A first gate circuit 166a generates the first reset signal RST1, which is the output of a multiplication of the logical inversion signal of the first state storage signal S1 and the valve opening system control abnormality signal ER1, and inputs the first reset signal RST1 to the total logical sum circuit 162. Thus, before the first state storage signal S1 is generated, the valve opening system control abnormality signal ER1 is inputted to the total logical sum circuit 162; however, after the first state storage signal S1 has been generated, the valve opening system control abnormality signal ER1 is cut off. In this regard, however, because directly inputted also to the total logical sum circuit 162, the basic reset signal RST0 is still effective after the first state storage signal S1 is generated.

The basic reset signal RST0 generated by the watchdog timer 161, a transmission control abnormality signal QAE2 generated by the transmission system control abnormality determination means 308b, described later in FIG. 3, a transmission control unit memory abnormality signal MME2 generated by the microprocessor CPU0, and a transmission control unit H/W abnormality signal HDE2 are inputted to and logically summed up in the second logical sum circuit 163b. With regard to the second logical sum circuit 163b, the transmission control abnormality signal QAE2 is an abnormality detection signal that relates to a creation program for the speed-change control output OUT22, which is created by the microprocessor CPU0, and that is created by the monitoring control circuit unit 130A in the case where when each of two or more question information pieces to be generated by the monitoring control circuit unit 130A and corresponding answer information obtained from the microprocessor CPU0 are compared with each other, no predetermined correct answer information is obtained. The transmission control unit memory abnormality signal MME2 is an abnormality detection signal that is created by the microprocessor CPU0 when there occurs a code check abnormality related to a transmission control region of the RAM that collaborates with the microprocessor CPU0. The transmission control unit H/W abnormality signal HDE2 is an abnormality detection signal that is created by the microprocessor CPU0 when there occurs a hardware error that is caused by disconnection or a short circuit in part of the input/output circuits that are connected with the microprocessor CPU0 and are related to transmission control.

A second counter 164b counts the number of occurrence instances of the transmission system control abnormality signal ER2, which is an output signal of the second logical sum circuit 163b; when the number of occurrence instances thereof reaches a predetermined threshold number, the second counter 164b sets a second storage circuit 165b, which is a flip-flop circuit, so as to generate the second state storage signal S2. A subtraction clock signal 167b periodically decreases the present counting value of the second counter 164b so that when the occurrence frequency of the transmission system control abnormality signal ER2 is low, the present counting value of the second counter 164b does not increase up to a predetermined threshold number and hence the second storage circuit 165b is not set; subtraction limitation prevents the present counting value from becoming smaller than "0". The second storage circuit 165b is reset by the power-on-reset signal POR to be generated when the power switch 105 is closed. A second gate circuit 166b generates the second reset signal RST2, which is the output of a multiplication of the logical inversion signal of the second state storage signal S2 and the transmission system control abnormality signal ER2, and inputs the second reset signal RST2 to the total logical sum circuit 162.

Thus, before the second state storage signal S2 is generated, the transmission system control abnormality signal ER2 is inputted to the total logical sum circuit 162; however, after the second state storage signal S2 has been generated, the transmission system control abnormality signal ER2 is cut off. In this regard, however, because directly inputted also to the total logical sum circuit 162, the basic reset signal RST0 is still effective after the second state storage signal S2 is generated. The basic reset signal RST0 generated by the watchdog timer 161, a basic control abnormality signal QAE0 generated by the valve-opening system control abnormality determination means 308a or the transmission system control abnormality determination means 308b, described later in FIG. 3, a basic unit memory abnormality signal MME0 generated by the microprocessor CPU0, and a basic unit H/W abnormality signal HDE0 are inputted to and logically summed up in the total logical sum circuit 162. With regard to the total logical sum circuit 162, the basic control abnormality signal QAE0 is an abnormality detection signal that relates to a creation program for the fuel injection control signal OUT0 or the transmission control output OUT20, which is created by the microprocessor CPU0, and that is created by the monitoring control circuit unit 130A in the case where when each of two or more question information pieces to be generated by the monitoring control circuit unit 130A and corresponding answer information obtained from the microprocessor CPU0 are compared with each other, no predetermined correct answer information is obtained.

The basic unit memory abnormality signal MME0 is an abnormality detection signal that is created by the microprocessor CPU0 when there occurs a code check abnormality related to a basic control region of the RAM that collaborates with the microprocessor CPU0; the basic unit H/W abnormality signal HDE0 is an abnormality detection signal that is created by the microprocessor CPU0 when there occurs a hardware error that is caused by disconnection or a short circuit in part of the input/output circuits that are connected with the microprocessor CPU0 and are related to the basic control. When there exists an overlapping part between the basic control region and the valve-opening control region or the transmission control region of the RAM, the overlapping part is dealt as the one that belongs to any one of or both of the basic control region and the valve-opening control region or the transmission control region. In this embodiment, the first counter 164a and the second counter 164b are provided in the output circuit units of the first logical sum circuit 163a and second logical sum circuit 163b, respectively; however, it may be allowed that the first counter 164a and the second counter 164b are moved to the input circuit units of the first logical sum circuit 163a and second logical sum circuit 163b, respectively, and the respective determination threshold values for the input signals are set or that the subtraction processing steps of the subtraction clock signals 167a and 167b are omitted.

In the foregoing explanation, the memory abnormality signal is limited to a code check abnormality in the RAM; however, it may be allowed that a code check abnormality in a related program memory or data memory is included. It may be allowed that the reset processing by the microprocessor CPU0 is software resetting without utilizing the resetting terminal. With regard to a hardware abnormality, for example, in the case where both of a pair of accelerator position sensors for detecting the step-on degree of the accelerator pedal are abnormal, power supply to the intake valve opening degree control motor 108a is immediately stopped without resetting the microprocessor CPU0 so that the driving mode moves to the evacuation driving using the fixed throttle valve opening degree. As described above, the respective separate abnormality processing steps are applied to various hardware abnormalities detected separately; it is desirable that with regard to the detection means for hardware abnormality, related to part of the input and output circuits that highly depend on software, the initialization and restarting of the microprocessor CPU0 are once implemented before abnormality dealing processing is implemented so that it is reconfirmed whether or not there exists an abnormality; thus, the foregoing hardware abnormality signals HDEi (I=0, 1, 2) are logically summed up so as to become the composite reset signal RST00.

(2) Detailed Description of Operation and Action

Next, the operation of the vehicle engine control system according to Embodiment 1 of the present invention, configured as illustrated in FIGS. 1 through 2, will be explained in detail. At first, in FIGS. 1 and 2, when the power switch 105 is closed, the main apparatus control power source relay 107b is driven by way of the self-holding circuit 197; the vehicle battery 101 supplies electric power to the constant voltage power source 110 through the main apparatus power supply command output RY0, which is an output element of the main apparatus control power source relay 107b; the control voltage Vcc is applied to the main control circuit unit 120A, the monitoring control circuit unit 130A, and the error processing circuit unit 160A, so that control operation is started. The microprocessor CPU0 included in the main control circuit unit 120A performs driving control of the fuel-injection electromagnetic valve 107a, the intake valve opening degree control motor 108a, and the automatic transmission 109a, in response to the operation states of the first and second sensor groups and the contents of program memories that collaborate with the microprocessor CPU0. A valve opening mechanism of the intake valve includes an initial-position returning mechanism that makes it possible to perform evacuation driving using the fixed intake valve opening degree when power supply to the intake valve opening degree control motor 108a is stopped; when the valve-opening control power source relay 108b is energized, the intake valve opening degree control motor 108a can be supplied with electric power.

A transmission driving mechanism of the automatic transmission 109a includes a transmission ratio fixation mechanism that makes it possible to at least travel forward at a fixed transmission ratio suitable for middle- or high-speed driving when during variable-speed forward driving, power supply to the automatic transmission 109a is stopped or when power-supply driving of all the automatic transmission control electromagnetic valves 109c included in the automatic transmission 109a is stopped; when the transmission control power source relay 109b is energized, the automatic transmission 109a can be supplied with electric power. In the case where the low-speed step selection electromagnetic valve 109d included in the automatic transmission 109a is supplied with electric power through the main apparatus power supply command output RY0, as represented by a dotted line in FIG. 1, forward and backward driving at a low-speed step can be implemented when the gearshift lever is set to a low-speed forward or backward position, even when the transmission control power source relay 109b has been de-energized; when the gearshift lever is switched to the variable-speed forward driving mode, evacuation driving at a fixed transmission ratio corresponding to the third speed, for example, can be implemented.

The watchdog signal to be generated by the microprocessor CPU0 is monitored by the watchdog timer 161 represented in FIG. 2; when a runaway abnormality that causes an excessive calculation period occurs, the basic reset signal RST0 is generated so as to initialize and then restart the microprocessor CPU0. In the case where even when the microprocessor CPU0 restarts, the watchdog timer 161 immediately operates and hence the basic reset signal RST0 is generated again and where this situation continues, the microprocessor CPU0 eventually does not perform control operation and hence the electric loads are in a non-operating state. However, when a sporadic malfunction attributed to noise causes a runaway abnormality in the microprocessor CPU0, the microprocessor CPU0 can be recovered to the normal state through initialization and restarting. The abnormality monitoring of the main control circuit unit 120A is implemented in such a way that subject of abnormality monitoring is divided into basic system control, valve opening system control, and transmission system control; in each of the systems, the abnormality monitoring is implemented in such a way that the subject of abnormality monitoring is divided into a question-answer abnormality, a memory abnormality, and a hardware abnormality.

Specifically explaining the concept of the foregoing question-answer abnormality, for example, it is assumed that the microprocessor CPU0 includes a control program of "adding an input X and an input Y so as to obtain the output Z"; in order to ascertain whether or not this program is correctly implemented, the input X is replaced by a constant A and the input Y is replaced by a constant B so that the addition result Z is answered, and then it is determined whether or not the addition result Z coincides with an expected result C. There exist various combinations between the constant A and the constant B; the data table number thereof is designated by a question number Qi. In response to the question number Qi transmitted from the monitoring control circuit unit 130A, the microprocessor CPU0 returns the result of addition of (A+B) to the monitoring control circuit unit 130A by use of a data table, which is preliminarily stored in the program memory; the monitoring control circuit unit 130A compares the answer information with known correct answer information C so as to determine whether or not a calculation control abnormality exists.

When any one of a question-answer abnormality, a memory abnormality, and a hardware abnormality occurs, there exist two cases, i.e., the case where the calculation period becomes so long that there occurs a runaway abnormality that results in occurrence of the basic reset signal RST0 and the case where the abnormality occurrence period is so short that no runaway abnormality occurs. Even in the case where no runaway abnormality occurs, there exist two cases, i.e., the case where when due to occurrence of an abnormality, the microprocessor CPU0 is initialized and then restarted, the abnormality occurs again (a non-runaway repeated abnormality) and the case where the abnormality is eliminated through initialization. Even in the case where a runaway abnormality occurs, there exist two cases, i.e., the case where when due to occurrence of an abnormality, the microprocessor CPU0 is initialized and then restarted, the abnormality occurs again (a runaway repeated abnormality) and the case where the abnormality is eliminated through initialization.

Figure 3:
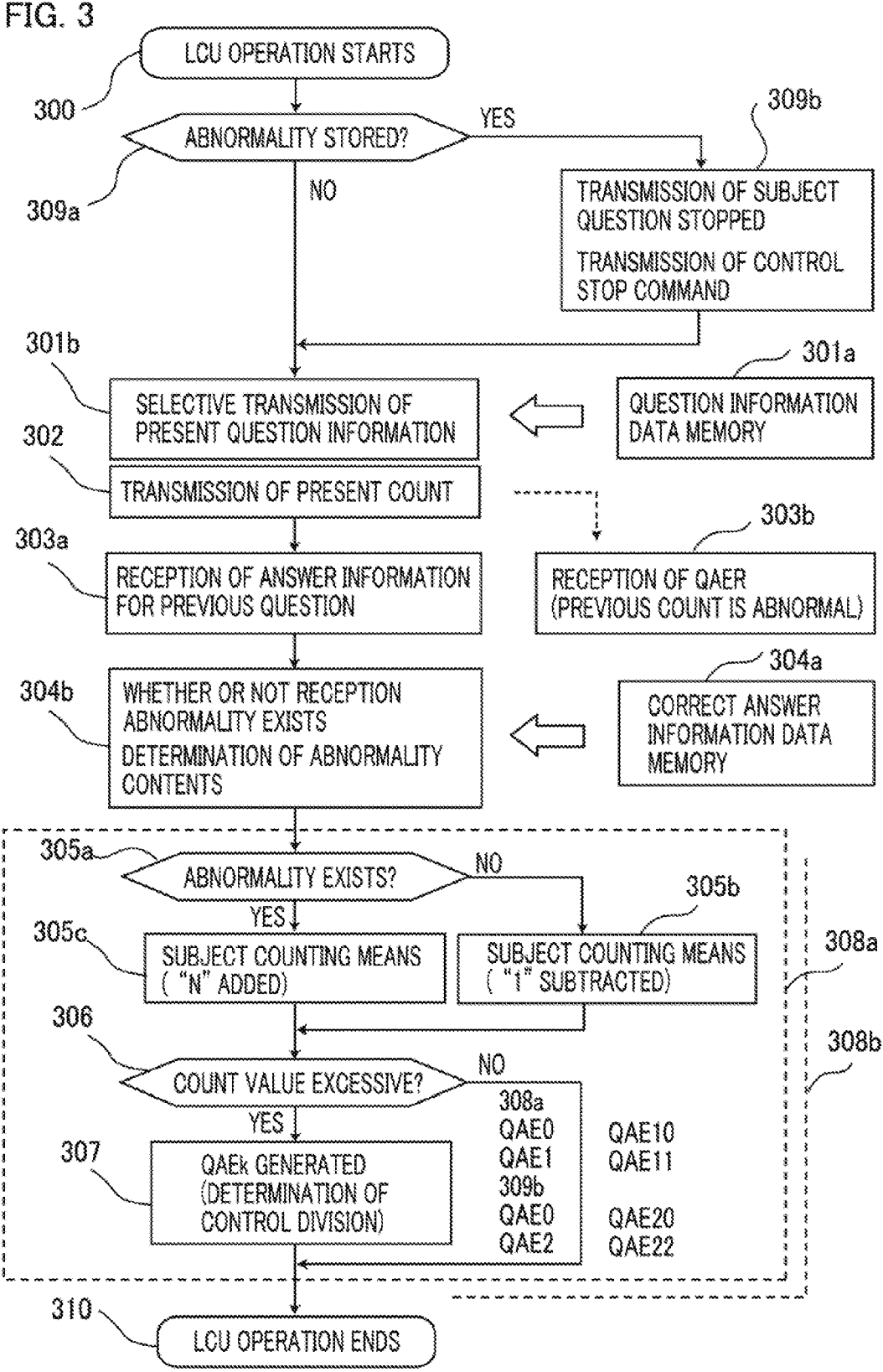
FIG. 3 is an equivalent flowchart for explaining determination operation, for a question-answer abnormality, that is performed by the vehicle engine control system in FIG. 1.

Next, there will in detail be explained FIG. 3, which is an equivalent flowchart for explaining determination operation, for a question-answer abnormality, that is performed by the vehicle engine control system in FIG. 1. In FIG. 3, the process 300 is an operation start step for the monitoring control circuit unit 130A, which is a local control unit (LCU) formed of a logic circuit having no microprocessor. The process 309a is a determination step in which it is monitored whether or not the first storage circuit 165a of the valve opening control system or the second storage circuit 165b of the transmission control system in FIG. 2 has stored the fact that an abnormality occurred, in which in the case where any one of the foregoing storage circuits has stored the fact that an abnormality occurred, the determination result becomes "YES" and the process 309a is followed by the process 309b, and in which in the case where none of the foregoing storage circuits has stored the fact that an abnormality occurred, the determination result becomes "NO" and the process 309a is followed by the process 301b. The process 309b is a step in which it is decided that transmission of any new question information for the control system where the fact that an abnormality occurred has been stored is stopped and in which a command for stopping implementation of the control program that creates the valve-opening control output OUT1 or the speed-change control output OUT22 is transmitted.

The process 301b is a step in which the question number Qi stored in a question information data memory 301a provided in the monitoring control circuit unit 130A is selected at random and transmitted to the microprocessor CPU0; in this embodiment, a question, to the valve-opening control system or the transmission control system, that has been stopped in the process 309b is eliminated. The process 302 is a step in which the present value of a totaling means that performs addition processing and subtraction processing in after-mentioned processes 305c and 305b, respectively, is transmitted to the microprocessor CPU0; the process 302 is followed by the process 303a. The process 303a is a step in which the answer information from the microprocessor CPU0, which relates to immediately previous question information transmitted in the process 301b, is received; the process 303a is followed by the process 304b. The process 304b is a step in which it is determined whether or not there exists a code check abnormality or an answer delay abnormality in the answer information received in the process 303a and in which in the case where normal data is received, correct answer information stored in a correct answer information data memory 304a provided in the monitoring control circuit unit 130A is referred to, the correct answer data for the question information transmitted in the process 301b is read, and then it is determined whether or not the received normal answer data and the correct data coincide with each other; the process 304b is followed by the process 305a.

The process 305a is a determination step; in the case where in the process 304b, it is determined that an abnormality exists, the result of the determination in the process 305a becomes "YES", and then the process 305c follows the process 305a; in the case where there exists no abnormality, the result of the determination in the process 305a becomes "NO", and then the process 305b follows the process 305a. The process 305b is a step in which "1" is subtracted from the present value of a totaling register provided in the monitoring control circuit unit 130A; subtraction limitation prevents the present value of the totaling register from becoming smaller than "0"; the process 305b is followed by the process 306. The process 305c is a step in which a variation value n is added to the present value of the totaling register provided in the monitoring control circuit unit 130A; the step 305c is followed by the step 306. The value of the variation value n differs depending on the contents of the abnormality determination in the process 304b; for example, in the case where a code error such as a parity error exists in received answer data, n is set to "1", in the case where an answer delay exists, n is set to "2", and in the case where the received answer data does not coincide with the correct answer information, n is set to "3".

The totaling registers that perform addition and subtraction processing items in the processes 305b and 305c include a basic totaling register for determining whether or not a basic control abnormality exists, a valve-opening totaling register for determining whether or not a valve-opening control abnormality exists, and a transmission totaling register for determining whether or not a transmission-control abnormality exists; the determination as to which totaling register performs the addition or subtraction is made based on the number of transmitted question information. In the process 306, it is determined whether or not the present value of any one of the totaling registers has exceeded a predetermined abnormality determination threshold value (e.g., 9); in the case where the present value of any one of the totaling registers has exceeded the predetermined abnormality determination threshold value, the result of the determination becomes "YES", and then the step 306 is followed by the step 307; in the case where the present value of none of the totaling registers has exceeded the predetermined abnormality determination threshold value, the result of the determination becomes "NO", and then, the step 306 is followed by the operation end process 310. In the process 307, based on the register in which the threshold value has been exceeded, the basic control abnormality signal QAE0, the valve opening control abnormality signal QAE1, or the transmission control abnormality signal QAE2 in FIG. 2 is generated; when the occurrence of any one of the abnormality signals is recognized, the present value of the corresponding totaling register is initialized to "0", and then the next abnormality determination is started. Other control items are implemented in the operation end process 310, and then the operation start process 300 is resumed.

Each of the process blocks 308a and 308b consisting of the processes 305a through 307 serves as the control abnormality determination means based on a question and an answer; in this control abnormality determination means, by use of the totaling register, it is determined whether or not an abnormality has occurred, in response to a plurality of abnormality instances; therefore, the valve opening control abnormality signal QAE1 or the transmission control abnormality signal QAE2 in FIG. 2 may set the first storage circuit 165a or second storage circuit 165b without passing through the first counter 164a or the second counter 164b, as the case may be. The microprocessor CPU0 receives information on the present value of the totaling register, transmitted upstream in the process 302; when there exists some margin in the present value, the microprocessor CPU0 intentionally transmits downstream erroneous answer information for question information transmitted upstream in the process 301b and monitors the operation state of the monitoring control circuit unit 130A by determining whether or not the monitoring control circuit unit 130A, which has received the erroneous answer information, sends, in the next upstream transmission, present value information to which the variation value of 3 has been added; when the operation of the monitoring control circuit unit 130A is abnormal, the reverse monitoring abnormality determination signal QAER is generated; then, in the process 303b, the monitoring control circuit unit 130A is initialized.

Figure 4:
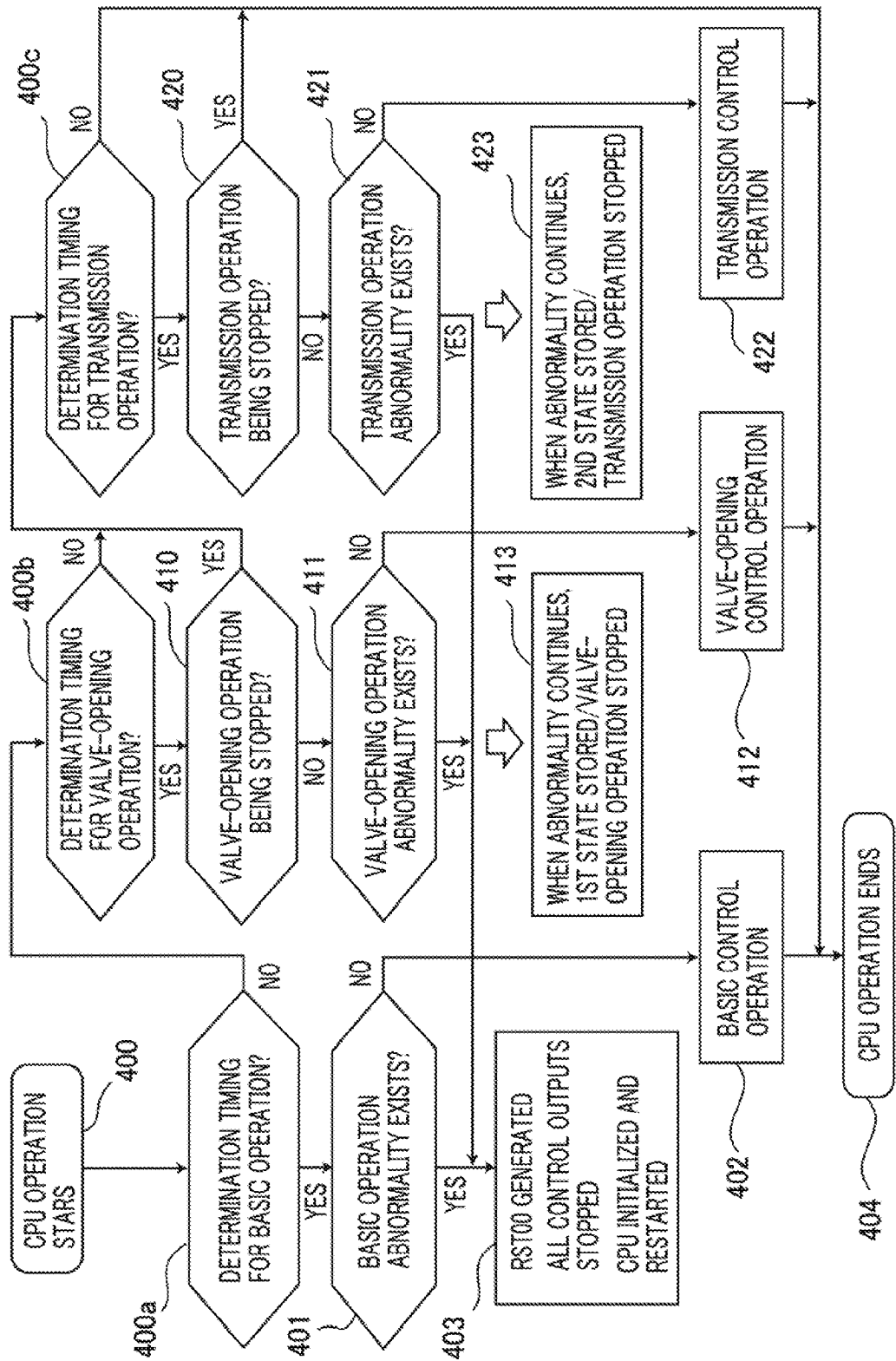
FIG. 4 is a flowchart for explaining the operation concept of abnormality determination by the vehicle engine control system in FIG. 1.

Next, FIG. 4, which is a flowchart representing the operation concept of the abnormality determination by the vehicle engine control system in FIG. 1, will be explained. In FIG. 4, the process 400 is a step in which controlling operation by the microprocessor CPU0 is started. The process 400a is a time slot determination step in which it is determined whether or not the present timing is an abnormality determination timing related to the basic control operation including the fuel injection control output OUT0; in the case where the present timing is the abnormality determination timing, the result of the determination becomes "YES", and then the process 400a is followed by the process 401; in the case where the present timing is not the abnormality determination timing, the result of the determination becomes "NO", and then the process 400a is followed by the process 400b. The process 400b is a time slot determination step in which it is determined whether or not the present timing is an abnormality determination timing related to the valve-opening control operation including the valve-opening control output OUT1; in the case where the present timing is the abnormality determination timing, the result of the determination becomes "YES", and then the process 400b is followed by the process 410; in the case where the present timing is not the abnormality determination timing, the result of the determination becomes "NO", and then the process 400b is followed by the process 400c. The process 400c is a time slot determination step in which it is determined whether or not the present timing is an abnormality determination timing related to the transmission control operation including the transmission-control output OUT2; in the case where the present timing is the abnormality determination timing, the result of the determination becomes "YES", and then the process 400c is followed by the process 420; in the case where the present timing is not the abnormality determination timing, the result of the determination becomes "NO", and then the process 400c is followed by the process 404. In the operation end process 404, other control operation items are implemented; then, the operation start process 400 is resumed.

In the process 401, it is determined whether or not any one of the basic operation abnormalities related to various items inputted to the total logical sum circuit 162 represented in FIG. 2 has occurred and hence the composite reset signal RST00 has been generated; in the case where no abnormality has occurred, the result of the determination becomes "NO", and then the process 401 is followed by the process 402; in the case where an abnormality has occurred, the determination operation for "YES" is not implemented and the process 401 is automatically followed by the process 403. In the process 402, fuel injection control, which is basic control operation, is implemented; then, the process 402 is followed by the operation end process 404. In the case where when the composite reset signal RST00 initializes and restarts the microprocessor CPU0 in the process 403 and then the processes 400, 400a, and 401 are resumed, the basic operation abnormality has occurred again, the result of the determination become "YES" again, and then the process 401 is followed by the process 403, where the fuel injection control, which is basic control operation, is stopped; thus, the processes 400 through 403 is recurrently implemented while the engine is stopped. In the case where when the composite reset signal RST00 initializes and restarts the microprocessor CPU0 in the process 403 and then the processes 400, 400a, and 401 are resumed, the composite reset signal RST00 has been cancelled, the result of the determination become "NO", and then the process 401 is followed by the process 402, where the basic control operation is implemented.

The process 410 is a determination step in which it is monitored whether the first storage circuit 165a in FIG. 2 has already stored occurrence of the first state; in the case where the first storage circuit 165a has already stored occurrence of the first state, the result of the determination becomes "YES", and then the process 410 is followed by the process 400c; in the case where the first storage circuit 165a has not stored any occurrence of the first state, the result of the determination becomes "NO", and then the process 410 is followed by the process 411. In the process 411, it is determined whether or not any one of the valve-opening system operation abnormalities related to various items inputted to the first logical sum circuit 163a represented in FIG. 2 has occurred and hence the composite reset signal RST00 has been generated; in the case where no abnormality has occurred, the result of the determination becomes "NO", and then the process 411 is followed by the process 412; in the case where an abnormality has occurred, the determination operation for "YES" is not implemented and the process 401 is automatically followed by the process 403. In the case where when the composite reset signal RST00 initializes and restarts the microprocessor CPU0 in the process 403 and then the processes 400, 400a, 400b, 410, and 411 are resumed, the composite reset signal RST00 has been cancelled, the result of the determination becomes "NO", and then the process 411 is followed by the process 412. In the process 412, the valve-opening control operation is implemented so that the valve-opening control output OUT1 performs reversible rotation drive of the intake valve opening degree control motor 108a, and then the intake valve opening degree is controlled so that the throttle valve opening degree corresponding to the step-on degree of the accelerator pedal is obtained.

In the process 413, in the case where any one of the basic reset signal RST0, the valve opening control abnormality signal QAE1, the valve opening control unit memory abnormality signal MME1, and the valve opening control unit H/W abnormality signal HDE1 is continuously generated and the number of times of the generation thereof exceeds a predetermined number of times or a predetermined frequency, the first storage circuit 165a stores occurrence of the first state; then, the result of the determination in the process 410 becomes "YES". In the process 413, the first cutoff circuit 198 in FIG. 1 de-energized the valve-opening control power source relay 108b. The process 420 is a determination step in which it is monitored whether the second storage circuit 165b in FIG. 2 has already stored occurrence of the second state; in the case where the second storage circuit 165b has already stored occurrence of the second state, the result of the determination becomes "YES", and then the process 420 is followed by the process 404; in the case where the second storage circuit 165b has not stored any occurrence of the second state, the result of the determination becomes "NO", and then the process 420 is followed by the process 421.

In the process 421, it is determined whether or not any one of the transmission system operation abnormalities related to various items inputted to the second logical sum circuit 163b represented in FIG. 2 has occurred and hence the composite reset signal RST00 has been generated; in the case where no abnormality has occurred, the result of the determination becomes "NO", and then the process 421 is followed by the process 422; in the case where an abnormality has occurred, the determination operation for "YES" is not implemented and the process 421 is automatically followed by the process 403. In the case where when the composite reset signal RST00 initializes and restarts the microprocessor CPU0 in the process 403 and then the processes 400, 400a, 400b, 400c, 420, and 421 are resumed, the composite reset signal RST00 has been cancelled, the result of the determination become "NO", and then the process 421 is followed by the process 422. In the process 422, the transmission control operation is continued so that the speed-change control output OUT22 performs selective drive of the automatic transmission control electromagnetic valve 109c, and then the automatic transmission control is performed so that the transmission ratio corresponding to the step-on degree of the accelerator pedal and the present vehicle speed is obtained; when the low-speed forward driving or backward driving is selected through the shift lever, the transmission control output OUT20 controls the low-speed step selection electromagnetic valve 109d.

In this regard, however, in the case where as represented by a dotted line in FIG. 1, the low-speed step selection electromagnetic valve 109d is supplied with electric power through the main apparatus power supply command output RY0, the low-speed step selection electromagnetic valve 109d is controlled by the transmission control output OUT20 in the process 402 in FIG. 4. In the process 423, in the case where any one of the basic reset signal RST0, the transmission control abnormality signal QAE2, the transmission control unit memory abnormality signal MME2, and the transmission control unit H/W abnormality signal HDE2 is continuously generated and the number of times of the generation thereof exceeds a predetermined number of times or a predetermined frequency, the second storage circuit 165b stores the occurrence of the second state; then, the result of the determination in the process 420 becomes "YES". In the process 423, the second cutoff circuit 199 in FIG. 1 de-energized the transmission control power source relay 109b.

In the foregoing explanation, it has been described that when in the process 309b represented in FIG. 3, the first state or the second state occurs, the transmission of question information for the valve-opening control system or the transmission control system and the implementation of an output control program are stopped; however, although the first auxiliary apparatus power supply command output RY1 or the second auxiliary apparatus power supply command output RY2 is stopped as an abnormality occurs, the processes 410 and 420 are deleted in FIG. 4, explaining the case where the question and the implementation of the program are not stopped. As a result, when the result of the determination in the process 400b or 400c becomes "YES", the process 411 or 421, as the case may be, is immediately implemented. However, in the case of a non-runaway abnormality at a time when any one of the valve opening control abnormality signal QAE1, the valve opening control unit memory abnormality signal MME1, and the valve opening control unit H/W abnormality signal HDE1 is generated in the process 411 and the basic reset signal RST0 does not operate, neither the basic control operation nor the transmission control operation is stopped, but only the valve-opening control operation is temporarily stopped (in the case of a non-runaway sporadic abnormality) or continuously stopped (in the case of a non-runaway continuous abnormality). In addition, in the case of a non-runaway abnormality at a time when any one of the transmission control abnormality signal QAE2, the transmission control unit memory abnormality signal MME2, and the transmission control unit H/W abnormality signal HDE2 is generated in the process 421 and the basic reset signal RST0 does not operate, neither the basic control operation nor the valve-opening control operation is stopped, but only the transmission control operation is temporarily stopped (in the case of a non-runaway sporadic abnormality) or continuously stopped (in the case of a non-runaway continuous abnormality).

(3) Gist and Feature of Embodiment 1

As is clear from the foregoing explanation, the vehicle engine control system 100A according to Embodiment 1 of the present invention is a multi-function vehicle engine control system whose collective case 70 contains the main control circuit unit 120A connected with the engine control output circuit units 177a and 178a and the transmission control output circuit unit 179a, the monitoring control circuit unit 130A serial connected with the main control circuit unit 120A, and the error processing circuit unit 160A; the main control circuit unit 120A includes the microprocessor CPU0 that operates with an opening/closing signal or an analogue signal, as an input signal, obtained from the first sensor group 103 and the second sensor group 104, which are utilized in engine control and transmission control, and that generates at least the fuel injection control output OUT0 for the fuel-injection electromagnetic valve 107a, the valve-opening control output OUT1 for the intake valve opening degree control motor 108a for an intake valve provided in the air-intake throttle, and the transmission-control output OUT2, including at least the speed-change control output OUT22, for the automatic transmission 109a; the valve-opening drive mechanism of the intake valve using the intake valve opening degree control motor 108a includes an initial-position returning mechanism that makes it possible to perform evacuation driving using a fixed intake valve opening degree when power supply to the intake valve opening degree control motor 108a is stopped; the transmission driving mechanism of the automatic transmission 109a includes a transmission ratio fixation mechanism that makes it possible to at least travel forward at a fixed transmission ratio suitable for middle- or high-speed driving when during variable-speed forward driving, power supply to the automatic transmission 109a is stopped or when power-supply driving of all the automatic transmission control electromagnetic valves 109c included in the automatic transmission 109a is stopped.

The monitoring control circuit unit 130A is provided with the valve-opening system control abnormality determination means 308a that sequentially transmits to the microprocessor CPU0 in operation a plurality of question information pieces related to at least a creation program for the valve-opening control output OUT1, receives from the microprocessor CPU0 the answer information pieces corresponding to the question information pieces, compares the answer information pieces with the respective corresponding correct answer information pieces, preliminarily stored in the monitoring control circuit unit 130A, determines whether or not a code check abnormality and an answering-response delay exist in the answer information so as to determine whether or not a valve-opening control abnormality including a communication abnormality and a question-answer abnormality exists, and then creates the valve opening control abnormality signal QAEk (k=1), which is one of the valve opening system control abnormality signals ER1; the error processing circuit unit 160A is provided with the watchdog timer 161 that generates the basic reset signal RST0 when the calculation period of the microprocessor CPU0 is abnormal and then initializes and restarts the microprocessor CPU0, the first storage circuit 165a that is set when the first state is established in which the occurrence count or the occurrence frequency of each of the basic reset signal RST0 and the valve opening control abnormality signal QAE1 becomes the same as or larger than a predetermined threshold value or the total occurrence count or the total occurrence frequency of the basic reset signal RST0 and the valve opening control abnormality signal QAE1 becomes the same as or larger than a predetermined threshold value, and the first gate circuit 166a; when the first storage circuit 165a has stored the occurrence of an abnormality, the first cutoff circuit 198 stops power supply to the intake valve opening degree control motor 108a; the first gate circuit 166a resets the microprocessor CPU0 through the basic reset signal RST0 and the valve opening control abnormality signal QAE1 when the first state has not been established, and after the first storage circuit 165a has stored the occurrence of an abnormality, the first gate circuit 166a prohibits the valve opening control abnormality signal QAE1 from performing reset processing of the microprocessor CPU0 so that a continuous non-runaway repeated abnormality related to the valve-opening control is suppressed from providing an effect to the fuel injection control; the error processing circuit unit 160A further detects and stores the occurrence state of at least the transmission system control abnormality signal ER2, and the second cutoff circuit 199, which responds to the transmission system control abnormality signal ER2, stops power supply to at least the automatic transmission control electromagnetic valve 109c in the automatic transmission 109a by having detected a transmission-control abnormality.

The transmission-control output OUT2 to be generated by the main control circuit unit 120A includes the speed-change control output OUT22 for the automatic transmission control electromagnetic valve 109c and the transmission control output OUT20 for the low-speed step selection electromagnetic valve 109d; the monitoring control circuit unit 130A is provided also with the transmission system control abnormality determination means 308b that sequentially transmits to the microprocessor CPU0 in operation a plurality of question information pieces related to at least a creation program for the speed-change control output OUT22, receives from the microprocessor CPU0 the answer information pieces corresponding to the question information pieces, compares the answer information pieces with the respective corresponding correct answer information pieces, preliminarily stored in the monitoring control circuit unit 130A, determines whether or not a code check abnormality and an answering-response delay exist in the answer information so as to determine whether or not a transmission control abnormality including a communication abnormality and a question-answer abnormality exists, and then creates the transmission control abnormality signal QAEk (k=2), which is one of the transmission system control abnormality signals ER2; the error processing circuit unit 160A is provided with the second gate circuit 166b and the second storage circuit 165b that is set when the second state is established in which the occurrence count or the occurrence frequency of each of the basic reset signal RST0 and the transmission control abnormality signal QAE2 becomes the same as or larger than a predetermined threshold value or the total occurrence count or the total occurrence frequency of the basic reset signal RST0 and the transmission control abnormality signal QAE2 becomes the same as or larger than a predetermined threshold value.

Then, when the second storage circuit 165b has stored the occurrence of an abnormality, the second cutoff circuit 199 stops power supply to at least the automatic transmission control electromagnetic valve 109c; the second gate circuit 166b resets the microprocessor CPU0 through the basic reset signal RST0 and the transmission control abnormality signal QAE2 when the second state has not been established, and after the second storage circuit 165b has stored the occurrence of an abnormality, the second gate circuit 166b prohibits the transmission control abnormality signal QAE2 from performing reset processing of the microprocessor CPU0 so that a continuous non-runaway repeated abnormality related to the transmission control is suppressed from providing an effect to the fuel injection control; when after the second storage circuit 165b has stored the occurrence of an abnormality, the variable-speed forward driving mode is once manually cancelled and then the driving mode is switched to the backward driving mode or the low-speed forward driving mode, the transmission control output OUT20 becomes effective so as to perform energization drive of the low-speed step selection electromagnetic valve 109d.

As described above, with regard to claim 4 of the present invention, when the second state is established in which the occurrence count or the occurrence frequency of each of the basic reset signal generated by the watchdog timer and the transmission control abnormality signal generated by the control abnormality determination means becomes the same as or larger than a predetermined threshold value, the second storage circuit stores the occurrence of an abnormality and stops power supply to the automatic transmission control electromagnetic valve so as to set the transmission ratio to a fixed transmission ratio for middle- or high-speed driving; until the second storage circuit stores the occurrence of an abnormality, the basic reset signal and the transmission control abnormality signal implement reset processing of the microprocessor; after the second storage circuit has stored the occurrence of an abnormality, the basic reset signal continues the reset processing of the microprocessor; however, the transmission control abnormality signal is prohibited from implementing reset processing of the microprocessor. Accordingly, with regard to the transmission control abnormality signal, when after driving is started, an abnormality with less occurrence count or less occurrence frequency than a predetermined occurrence count or a predetermined occurrence frequency occurs, the microprocessor is initialized and restarted and recovery processing for the sporadic abnormality is performed, so that fuel injection control, the valve-opening control, and the transmission control can normally be performed; in the case where the occurrence of an abnormality continues, this recovery processing is stopped; thus, in the case of a non-runaway repeated abnormality that is a continuous abnormality but does not lead to a runaway abnormality of the microprocessor, the microprocessor is not reset by the basic reset signal; as a result, although the transmission control by the microprocessor cannot be implemented, the fuel injection control and the valve-opening control can be implemented and hence evacuation driving at a fixed transmission ratio becomes effective; when a runaway abnormality occurs in the microprocessor occurs, the microprocessor is initialized and restarted by the basic rest signal; thus, there is demonstrated a characteristic that when the runaway abnormality is contingent and sporadic, at least the fuel injection control recovers to the normal state and hence the evacuation driving can be continued. When power supply to the automatic transmission is not stopped and the backward driving mode or the low-speed forward driving mode is selected, backward driving or low-speed forward driving can be performed by use of part of automatic transmission control electromagnetic valves or a dedicated low-speed step selection electromagnetic valve; thus, there is demonstrated a characteristic that it is readily made possible to escape from a run-off state or to perform evacuation driving for uphill-road driving. This characteristic is demonstrated also by a vehicle engine control system 100Ad according to Embodiment 3.

The monitoring control circuit unit 130A stops transmission of question information on valve-opening control for creating the valve opening control abnormality signal QAE1, after the first storage circuit 165a has stored the first state, or stops transmission of question information on transmission control for creating the transmission control abnormality signal QAE2 after the second storage circuit 165b has stored the second state; alternatively, the main control circuit unit 120A stops implementation of a control program for creating the valve-opening control output OUT1 for the intake valve opening degree control motor 108a, after the first storage circuit 165a has stored the first state, or stops implementation of a control program for creating the speed-change control output OUT22 for the automatic transmission control electromagnetic valve 109c, after the second storage circuit 165b has stored the second state. As described above, with regard to claim 5 of the present invention, after the first storage circuit has stored the occurrence of a valve-opening control abnormality, transmission of question information on the valve-opening control is stopped, or, preferably, implementation of the creation program for the valve-opening control output is stopped; after the second storage circuit has stored the occurrence of a transmission control abnormality, transmission of question information on the transmission control is stopped, or, preferably, implementation of the creation program for the speed-change control output is stopped. Therefore, there is demonstrated a characteristic that the microprocessor's load of implementing unnecessary control programs and answer creation programs is reduces and that the watchdog timer is prevented from operating through the implementation of the program that has caused an abnormality to occur. This characteristic is demonstrated also by a vehicle engine control system 100Ad according to Embodiment 3.

Embodiment 2

(1) Detailed Description of Configuration

Figure 5:
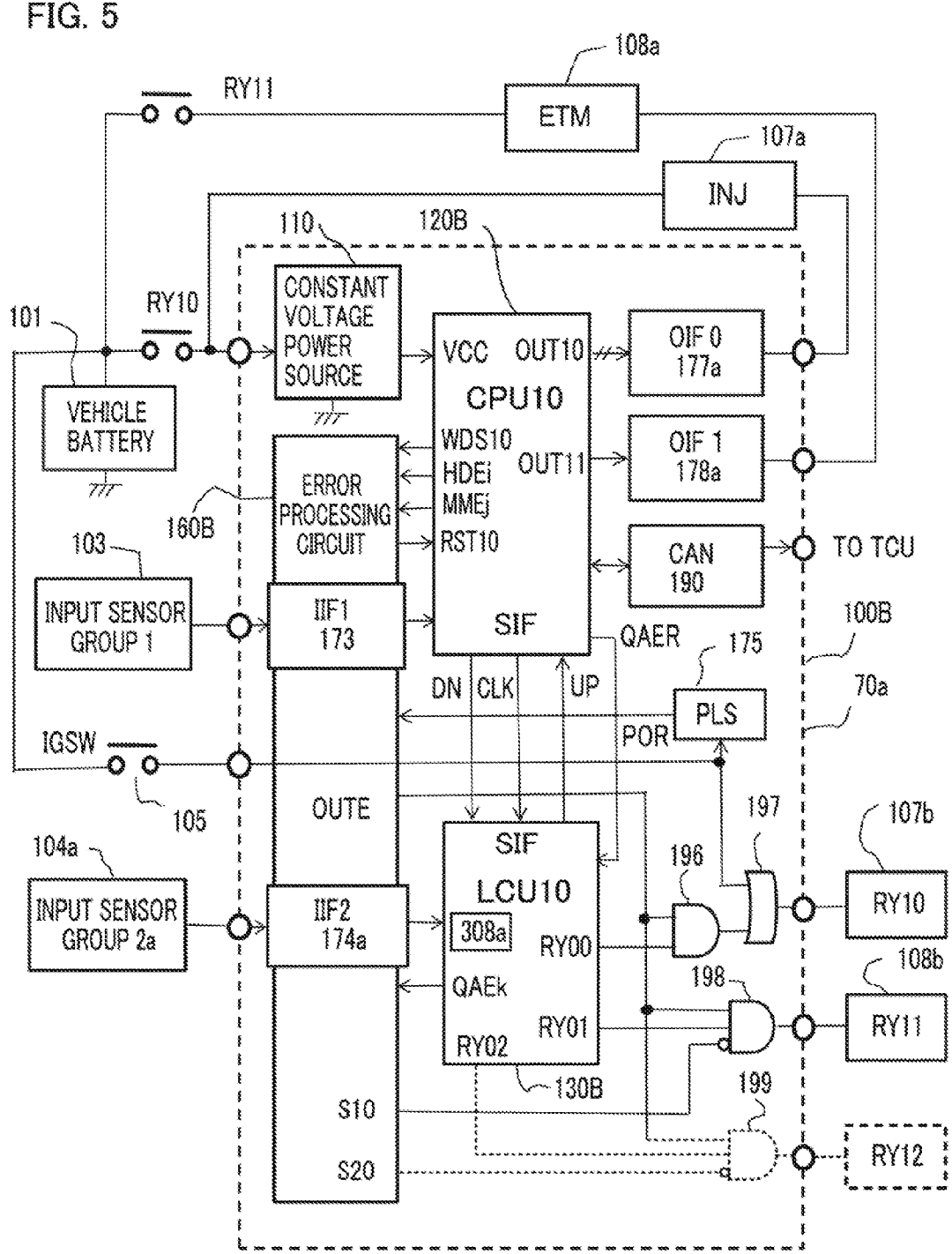
FIG. 5 is a block diagram illustrating the overall configuration of a vehicle engine control system according to Embodiment 2 of the present invention.

Hereinafter, with reference to FIG. 5, which is a block diagram representing the overall configuration of a vehicle engine control system 100B according to Embodiment 2 of the present invention, and FIG. 6, which is a detailed configuration diagram of an error processing circuit unit of the vehicle engine control system in FIG. 5, the configurations of the vehicle engine control system 100B and the error processing circuit unit will be explained in detail; the explanation will focus on the respective differences between the configurations of the vehicle engine control systems in FIGS. 1 and 5 and between the configurations of the error processing circuit units in FIGS. 2 and 6. In each of the drawings, the same reference characters denote the same or similar portions. In FIG. 5, the vehicle engine control system 100B is configured mainly with a first main control circuit unit 120B, a first monitoring control circuit unit 130B, and a first error processing circuit unit 160B that are mounted on an unillustrated circuit board and are contained in a first case 70a; the vehicle engine control system 100B contains only an engine control circuit function, and collaborates with an after-mentioned transmission control apparatus 100c including a transmission control function so that a function-separated vehicle engine control system is configured. The power-source terminal of the vehicle engine control system 100B is connected with the vehicle battery 101 through a main apparatus power supply command output RY10, which is an output element of the main apparatus control power source relay 107b that is energized by way of the after-mentioned self-holding circuit 197 when a power switch 105 is closed. The first sensor group 103 includes various kinds of sensors to be utilized in controlling an engine such as a crank angle sensor for detecting the rotation angle of the engine and a rotation sensor for detecting the rotation speed thereof, an air flow sensor for measuring the intake amount of air that passes through a throttle intake valve, an accelerator position sensor for detecting the step-on degree of the accelerator pedal, a throttle position sensor for detecting the intake valve opening degree, and a gas sensor for detecting the oxygen concentration in an exhaust-gas sensor.

In this regard, however, the accelerator position sensor and the engine rotation sensor among the various kinds of sensors are utilized also in transmission control by the after-mentioned transmission control apparatus 100c. A second sensor group 104a is part of the second sensor group 104 that is utilized also in transmission control by the after-mentioned transmission control apparatus 100c and includes a vehicle speed sensor and a gearshift sensor that are utilized also in engine control. The fuel-injection electromagnetic valve 107a, which is one of basic electric loads to be supplied with electric power by the vehicle battery 101 through the main apparatus power supply command output RY10, is provided in each of the cylinders of a multi-cylinder engine; in the case where this engine is a gasoline engine, an unillustrated ignition coil, as another one of the basic electric loads, is added thereto. The intake valve opening degree control motor 108a, which is a major first auxiliary apparatus, is supplied with electric power by the vehicle battery 101 through a first auxiliary apparatus power supply command output RY11, which is an output element of the valve-opening control power source relay 108b; there is provided a fail-safe mechanism for compulsory and mechanical resetting so that when power supply to the intake valve opening degree control motor 108a is stopped, the opening degree is set to a fixed intake valve opening degree at which a rotation speed higher than the idling rotation speed can be obtained.

With regard to the internal configuration of the vehicle engine control system 100B, the constant voltage power source 110 generates a control voltage Vcc, which is a stabilized voltage of, for example, DC 5V, and other stabilized voltages and supplies electric power to a first microprocessor CPU10 and an input/output interface circuit units. The first main control circuit unit 120B, which is an integrated circuit device and includes mainly the first microprocessor CPU10, is configured with a nonvolatile program memory, which is, for example, a flash memory, a data memory, which is part of the region of the program memory or another nonvolatile memory with which reading and writing can electrically be performed, a built-in memory including a volatile RAM, a multi-channel A/D converter, and a communication interface circuit SIF. The first main control circuit unit 120B is connected with the first sensor group 103 by way of the first input interface circuit 173 and with the second sensor group 104*a* by way of a second input interface circuit 174*a*; the first main control circuit unit 120B is also connected with the fuel-injection electromagnetic valve 107*a* and the intake valve opening degree control motor 108*a* by way of the engine control output circuit units 177*a* and 178*a*, respectively.

A fuel injection control output OUT10 generated by the first microprocessor CPU10 performs energization drive of the fuel-injection electromagnetic valve 107*a* provided in each of the cylinders, at a predetermined timing and for a predetermined period; however, in practice, instantaneous rapid power supply control through an unillustrated stepped-up voltage or opened-valve holding control is implemented. A valve-opening control output OUT11 performs reversible rotation drive of the intake valve opening degree control motor 108*a* so as to obtain the valve opening degree of the air-intake throttle corresponding to a step-on degree of the accelerator pedal. The first error processing circuit unit 160B, described later in FIG. 6, monitors the pulse width of a pulse train signal WDS10, which is a watchdog signal to be generated by the first microprocessor CPU10; when the pulse width of the pulse train signal WDS10 is normal, the first error processing circuit unit 160B generates the output permission signal OUTE. In addition, the first error processing circuit unit 160B monitors the hardware abnormality signal HDEi, the memory abnormality signal MMEj, and the question-answer abnormality signal QAEk to be generated by the first monitoring control circuit unit 130B; in the case where an abnormality occurs, a composite reset signal RST10 initializes and then restarts the first microprocessor CPU10.

The first monitoring control circuit unit 130B is serial connected with the first microprocessor CPU10 by way of the serial-parallel converter SIF, and the first monitoring control circuit unit 130B and the first microprocessor CPU10 mutually perform signal communication by use of the downstream signal DN and the upstream signal UP that are synchronized with the clock signal CLK; in this example, part of signals obtained from the second sensor group 104*a* are transmitted to the first microprocessor CPU10 through the upstream signal UP. The first monitoring control circuit unit 130B is provided with the valve-opening system control abnormality determination means 308*a* for creating the question-answer abnormality signal QAEk, and generates the main apparatus power supply control output RY00 and the first auxiliary apparatus power supply control output RY01 in response to commands issued by the first microprocessor CPU10 through the downstream signal DN. The first error processing circuit unit 160B also generates a first state storage signal S10 for storing the fact that an abnormality has occurred in the valve opening control system; this storage state is erased by the reset circuit 175 that generates the power-on-reset signal POR when the power switch 105 is closed. The first microprocessor CPU10 and a second microprocessor CPU20, described later in FIG. 7, mutually perform serial communication through an external communication circuit 190; part of signals from the first sensor group 103 for controlling the engine are transmitted from the first microprocessor CPU10 to the second microprocessor CPU20; part of signals from the second sensor group 104 for controlling the transmission are transmitted from the second microprocessor CPU20 to the first microprocessor CPU10.

Accordingly, part of the input terminals of the second sensor group 104*a* in FIG. 5 are saved; for example, among signals from the gearshift sensor, the detection signal for the neutral position or the parking position is made double so that confirmation operation can be implemented; the engine rotation speed calculated by the first microprocessor CPU10 and A/D-converted numerical data for detecting the step-on degree of the accelerator pedal are transmitted to the second microprocessor CPU20; numerical data on a vehicle speed calculated by the second microprocessor CPU20, as a duplication-system signal, is transmitted to the first microprocessor CPU10. The power cutoff circuit 196 inputs, as a self-holding signal, the output of a logical multiplication of the main apparatus power supply control output RY00 generated by the first monitoring control circuit unit 130B and the output permission signal OUTE generated by the first error processing circuit unit 160B to the self-holding circuit 197; a circuit-closure signal from the power switch 105 is inputted, as a driving signal for a logical sum, to the self-holding circuit 197; the output of the self-holding circuit 197 energizes the main apparatus control power source relay 107*b*. Accordingly, when the power switch 105 is closed, the main apparatus control power source relay 107*b* is energized, so that the main apparatus power supply command output RY10 is generated, and hence the first microprocessor CPU10 starts its operation and then the main apparatus power supply control output RY00 is generated; after that, even when the power switch 105 is closed, the energization of the main apparatus control power source relay 107*b* is continued; however, when the first microprocessor CPU10 stops the main apparatus power supply control output RY00 or when the first error processing circuit unit 160B stops the output permission signal OUTE, the main apparatus control power source relay 107*b* is de-energized.

The first cutoff circuit 198 energizes the valve-opening control power source relay 108*b* by use of the output of a logical multiplication of the first auxiliary apparatus power supply control output RY01 generated by the first monitoring control circuit unit 130B, the output permission signal OUTE generated by the first error processing circuit unit 160B, and the logical inversion signal of the first state storage signal S10; the valve-opening control power source relay 108*b* is energized and controlled by the first auxiliary apparatus power supply control output RY01; however, when the watchdog signal becomes abnormal and hence the output permission signal OUTE is stopped or when the first state storage signal S10 is generated as an abnormality occurs in the valve opening control system, the valve-opening control power source relay 108*b* is de-energized. The first microprocessor CPU10 generates the reverse monitoring abnormality determination signal QAER for resetting the first monitoring control circuit unit 130B; the reverse monitoring abnormality determination signal QAER is a signal for initializing the first monitoring control circuit unit 130B in the case where when in response to question information obtained from the first monitoring control circuit unit 130B, the first microprocessor CPU10 intentionally transmits an erroneous answer to the first monitoring control circuit unit 130B, monitors the processing state of the first monitoring control circuit unit 130B, and then determines whether or not the first monitoring control circuit unit 130B is normally operating, it is determined that the first monitoring control circuit unit 130B is not normally operating.

Next, FIG. 6, which is a detailed circuit configuration diagram of the first error processing circuit unit 160B represented in FIG. 5, will be explained. In FIG. 6, the watchdog timer 161 provided in the first error processing circuit unit 160B measures the on-time width and the off-time width of a pulse train signal WDS10, which is a watchdog signal generated by the first microprocessor CPU10; when the pulse width of the pulse train signal WDS10 exceeds a predetermined time, the watchdog timer 161 generates the basic reset signal RST0, and when the first microprocessor CPU10 normally operates, the watchdog timer 161 generates the output permission signal OUTE. The first error processing circuit unit 160B is provided with the total logical sum circuit 162 for generating the composite reset signal RST10 and the first logical sum circuit 163a for generating a valve opening system control abnormality signal ER11. The basic reset signal RST0 generated by the watchdog timer 161, a valve opening control abnormality signal QAE11 generated by the valve-opening system control abnormality determination means 308a, described above in FIG. 3, a valve opening control unit memory abnormality signal MME11 generated by the first microprocessor CPU10, and a valve opening control unit H/W abnormality signal HDE11 are inputted to and logically summed up in the first logical sum circuit 163a.

With regard to the first logical sum circuit 163a, the valve opening control abnormality signal QAE11 is an abnormality detection signal that relates to a creation program for the valve-opening control output OUT11, which is created by the first microprocessor CPU10, and that is created by the first monitoring control circuit unit 130B in the case where when each of two or more question information pieces to be generated by the first monitoring control circuit unit 130B and corresponding answer information obtained from the first microprocessor CPU10 are compared with each other, no predetermined correct answer information is obtained. The valve opening control unit memory abnormality signal MME11 is an abnormality detection signal that is created by the first microprocessor CPU10 when there occurs a code check abnormality related to a valve-opening control region of the RAM that collaborates with the first microprocessor CPU10. The valve opening control unit H/W abnormality signal HDE11 is an abnormality detection signal that is created by the first microprocessor CPU10 when there occurs a hardware error that is caused by disconnection or a short circuit in part of the input/output circuits that are connected with the first microprocessor CPU10 and are related to valve-opening control. The first counter 164a counts the number of occurrence instances of the valve opening system control abnormality signal ER11, which is an output signal of the first logical sum circuit 163a; when the number of occurrence instances thereof reaches a predetermined threshold number, the first counter 164a sets the first storage circuit 165a, which is a flip-flop circuit, so as to generate the first state storage signal S10.

The subtraction clock signal 167a periodically decreases the present counting value of the first counter 164a so that when the occurrence frequency of the valve opening system control abnormality signal ER11 is low, the present counting value of the first counter 164a does not increase up to a predetermined threshold number and hence the first storage circuit 165a is not set; subtraction limitation prevents the present counting value from becoming smaller than "0". The first storage circuit 165a is reset by the power-on-reset signal POR to be generated when the power switch 105 is closed. A first gate circuit 166a generates the first reset signal RST11, which is the output of a multiplication of the logical inversion signal of the first state storage signal S10 and the valve opening system control abnormality signal ER11, and inputs the first reset signal RST11 to the total logical sum circuit 162. Thus, before the first state storage signal S10 is generated, the valve opening system control abnormality signal ER11 is inputted to the total logical sum circuit 162; however, after the first state storage signal S10 has been generated, the valve opening system control abnormality signal ER11 is cut off. In this regard, however, because directly inputted also to the total logical sum circuit 162, the basic reset signal RST0 is still effective after the first state storage signal S10 is generated.

The basic reset signal RST0 generated by the watchdog timer 161, a basic control abnormality signal QAE10 generated by the valve-opening system control abnormality determination means 308a, described above, a basic unit memory abnormality signal MME10 generated by the first microprocessor CPU10, and a basic unit H/W abnormality signal HDE10 are inputted to and logically summed up in the total logical sum circuit 162. With regard to the total logical sum circuit 162, the basic control abnormality signal QAE10 is an abnormality detection signal that relates to a creation program for the basic control including the fuel injection control output OUT10, which is created by the first microprocessor CPU10, and that is created by the first monitoring control circuit unit 130B in the case where when each of two or more question information pieces to be generated by the first monitoring control circuit unit 130B and corresponding answer information obtained from the first microprocessor CPU10 are compared with each other, no predetermined correct answer information is obtained.

The basic unit memory abnormality signal MME10 is an abnormality detection signal that is created by the first microprocessor CPU10 when there occurs a code check abnormality related to a basic control region of the RAM that collaborates with the first microprocessor CPU10; the basic unit H/W abnormality signal HDE10 is an abnormality detection signal that is created by the first microprocessor CPU10 when there occurs a hardware error that is caused by disconnection or a short circuit in part of the input/output circuits that are connected with the first microprocessor CPU10 and are related to basic control. When there exists an overlapping part between the basic control region and the valve-opening control region of the RAM, the overlapping part is dealt as the one that belongs to any one of or both of the basic control region and the valve-opening control region. In this embodiment, the first counter 164a is provided in the output circuit unit of the first logical sum circuit 163a; however, it may be allowed that the first counter 164a is moved to the input circuit unit of the first logical sum circuit 163a and respective different determination threshold values are set for input signals or that subtraction processing by the subtraction clock signal 167a is omitted.

In the foregoing explanation, the memory abnormality signal is limited to a code check abnormality in the RAM; however, as is the case with Embodiment 1, it may be allowed that a code check abnormality in a related program memory or data memory is included. It may be allowed that the reset processing by the first microprocessor CPU10 is software resetting without utilizing the resetting terminal. With regard to a hardware abnormality, for example, in the case where both of a pair of accelerator position sensors for detecting the step-on degree of the accelerator pedal are abnormal, power supply to the intake valve opening degree control motor 108a is immediately stopped without resetting the first microprocessor CPU10 so that the driving mode moves to the evacuation driving mode using the fixed throttle valve opening degree. As described above, the respective separate abnormality processing steps are applied to various hardware abnormalities detected separately; as is the case with Embodiment 1, it is desirable that with regard to the detection means for hardware abnormality, related to part of the input and output circuits that highly depend on software, the initialization and restarting of the first microprocessor CPU10 are once implemented before abnormality dealing processing is implemented so that it is reconfirmed whether or not there exists an abnormality; thus, the foregoing hardware abnormality signals HDEi (I=10, 11) are logically summed up so as to become the composite reset signal RST10.

Figure 7:
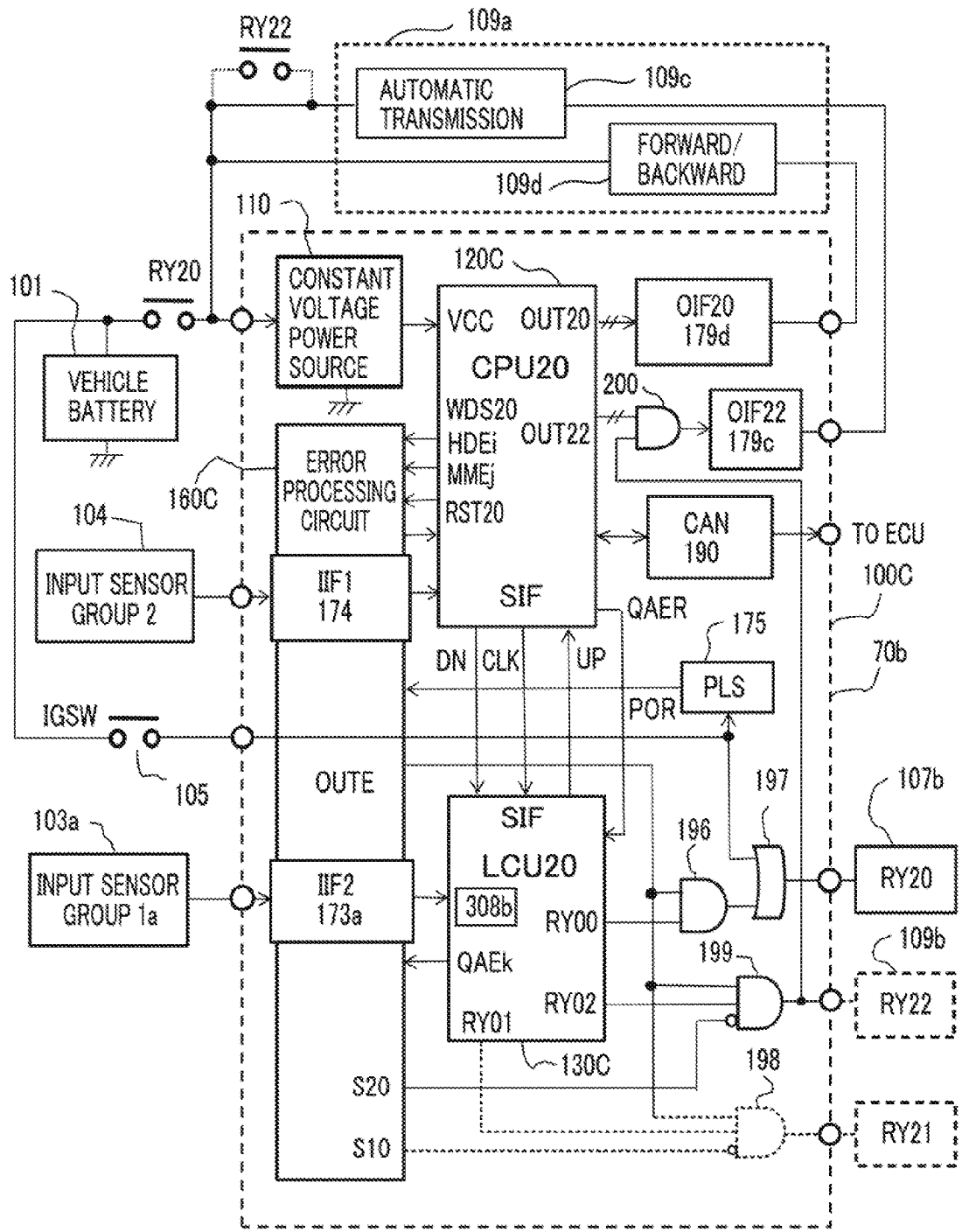
FIG. 7 is a block diagram illustrating the overall configuration of a transmission control apparatus that is connected with the vehicle engine control system in FIG. 5.

Next, with reference to FIG. 7, which is a block diagram representing the overall configuration of a transmission control apparatus 100*c* according to Embodiment 2 of the present invention, and FIG. 8, which is a detailed configuration diagram of an error processing circuit unit of the transmission control apparatus 100*c* in FIG. 7, the configurations of the transmission control apparatus 100*c* and the error processing circuit unit will be explained in detail; the explanation will focus on the respective differences between the configurations of the vehicle engine control system 100B in FIG. 1 and the transmission control apparatus 100*c* in FIG. 7 and between the configurations of the error processing circuit units in FIGS. 2 and 8. In each of the drawings, the same reference characters denote the same or similar portions. In FIG. 7, the transmission control apparatus 100*c* contained in a second case 70*b* is configured mainly with a second main control circuit unit 120C that is mounted on an unillustrated circuit board and contained in the second case 70*b*, a second monitoring control circuit unit 130C, and a second error processing circuit unit 160C. The transmission control apparatus 100*c* contains only a transmission control function, and collaborates with the foregoing vehicle engine control system 100B including an engine control function, so that the transmission control apparatus 100*c* is included in a function-separated vehicle engine control system. The power-source terminal of the transmission control apparatus 100*c* is connected with a vehicle battery 101 through a main apparatus power supply command output RY20, which is an output element of the main apparatus control power source relay 107*b* that is energized by way of the after-mentioned self-holding circuit 197 when the power switch 105 is closed. The first sensor group 103*a* is part of the first sensor group 103 for engine control and includes an engine rotation sensor and an accelerator position sensor for detecting the step-on degree of an accelerator pedal.

The second sensor group 104 includes various kinds of sensors to be utilized in controlling a transmission such as a vehicle speed sensor, a gearshift sensor for detecting the selection position of a gearshift lever, an oil temperature sensor or an oil pressure sensor in a transmission. In this regard, however, a vehicle speed sensor and a gearshift sensor among the various kinds of sensors are utilized also in engine control. The basic electric loads of the automatic transmission 109*a* include the low-speed step selection electromagnetic valve 109*d*, which is driven when a low-speed forward driving mode or a backward driving mode is mechanically or electrically selected through manual operation of a gearshift lever; the power supply system for the basic electric load utilizes the main apparatus power supply command output RY20; the low-speed step selection electromagnetic valve 109*d* is included in the automatic transmission control electromagnetic valve 109*c* or a dedicated electromagnetic valve is utilized, as the low-speed step selection electromagnetic valve 109*d*. In the case where when the backward driving mode or the low-speed forward driving is selected through the shift lever, the low-speed step selection electromagnetic valve 109*d* is driven, low-speed forward driving or backward driving can be implemented.

Two or more automatic transmission control electromagnetic valves 109*c*, which are major second auxiliary apparatuses, are supplied with electric power by the vehicle battery 101 through a second auxiliary apparatus power supply command output RY22, which is an output element of the transmission control power source relay 109*b*; when the power supply is stopped, a predetermined fixed transmission ratio, which is a transmission ratio suitable for middle- or high-speed driving, is obtained. In this regard, however, it may be allowed that instead of utilizing the transmission control power source relay 109*b*, the two or more automatic transmission control electromagnetic valves 109*c* are supplied with electric power by the main apparatus power supply command output RY20 and that the output of the speed-change control output OUT22 is controlled by the after-mentioned second cutoff circuit 199 and a gate device 200. The automatic transmission control electromagnetic valve 109*c* in the automatic transmission 109*a* is to change the transmission ratios in a no-step manner or in a multistep manner; in the case where when a variable-speed forward driving mode is selected, power supply to all the automatic transmission control electromagnetic valves 109*c* is stopped, the foregoing fixed transmission ratio suitable for middle- or high-speed driving is obtained.

With regard to the internal configuration of the transmission control apparatus 100*c*, the constant voltage power source 110 generates a control voltage Vcc, which is a stabilized voltage of, for example, DC 5V, and other stabilized voltages and supplies electric power to the second microprocessor CPU20 and an input/output interface circuit unit. The second main control circuit unit 120C, which is an integrated circuit device and includes mainly the second microprocessor CPU20, is configured with a nonvolatile program memory, which is, for example, a flash memory, a data memory, which is part of the region of the program memory or another nonvolatile memory with which reading and writing can electrically be performed, a built-in memory including a volatile RAM, a multi-channel A/D converter, and a communication interface circuit SIF. The second main control circuit unit 120C is connected with the first sensor group 103 by way of a first input interface circuit 173*a* and with the second sensor group 104 by way of the second input interface circuit 174; the second main control circuit unit 120C is connected also with the low-speed step selection electromagnetic valve 109*d* and the automatic transmission control electromagnetic valve 109*c* by way of the transmission control output circuit units 179*d* and 179*c*, respectively.

The second microprocessor CPU20 generates the transmission control output OUT20 and the speed-change control output OUT22 so as to control the automatic transmission 109*a*; in the case where the automatic transmission 109*a* operates in mechanical conjunction with a selection position of the shift lever to be manually operated, so that each of the driving modes including Reverse R, Neutral N, Low-speed forward D1, Variable-speed forward D, and Parking P is determined, the transmission control output OUT20 performs energization drive of the low-speed step selection electromagnetic valve 109*d*. In the case where the driving mode of the automatic transmission 109*a* is electrically controlled in conjunction with a selection position of the shift lever, for example, a control output for a motor that performs driving-mode-selection drive is added and the transmission control output OUT20 performs energization drive of the low-speed step selection electromagnetic valve 109d in the selected reverse driving mode or low-speed forward driving mode.

The speed-change control output OUT22 operates in conjunction with the step-on degree of the accelerator pedal and the vehicle speed so as to perform energization drive of a plurality of automatic transmission control electromagnetic valves 109c at a time when a variable-speed forward driving mode is selected. The plurality of automatic transmission control electromagnetic valves 109c is configured in such a way that energization drive is selectively applied to one of or a number of them so that multistep transmission ratios are obtained; alternatively, each of the plurality of automatic transmission control electromagnetic valves 109c is a linear solenoid valve for obtaining a no-step transmission ratios by increasing or decreasing the effective diameter of a pair of variable-speed pulleys. The second error processing circuit unit 160C, described later in FIG. 8, monitors the pulse width of a pulse train signal WDS20, which is a watchdog signal to be generated by the second microprocessor CPU20; when the pulse width of the pulse train signal WDS20 is normal, the second error processing circuit unit 160C generates the output permission signal OUTE. In addition, the second error processing circuit unit 160C monitors the hardware abnormality signal HDEi, the memory abnormality signal MMEj, and the question-answer abnormality signal QAEk to be generated by the second monitoring control circuit unit 130C; in the case where an abnormality occurs, a composite reset signal RST20 initializes and then restarts the second microprocessor CPU20.

The second monitoring control circuit unit 130C is serial connected with the second microprocessor CPU20 by way of the serial-parallel converter SIF, and the second monitoring control circuit unit 130C and the second microprocessor CPU20 mutually perform signal communication by use of the downstream signal DN and the upstream signal UP that are synchronized with the clock signal CLK; in this example, part of signals obtained from the first sensor group 103a are transmitted to the second microprocessor CPU20 through the upstream signal UP. The second monitoring control circuit unit 130C is provided with the transmission system control abnormality determination means 308b for creating the question-answer abnormality signal QAEk, and generates the main apparatus power supply control output RY00 and the second auxiliary apparatus power supply control output RY02 in response to commands issued by the second microprocessor CPU20 through the downstream signal DN. The second error processing circuit unit 160C also generates a second state storage signal S20 for storing occurrence of an abnormality in the transmission control system; this storage state is erased by the reset circuit 175 that generates the power-on-reset signal POR when the power switch 105 is closed.

The power cutoff circuit 196 inputs, as a self-holding signal, the output of a logical multiplication of the main apparatus power supply control output RY00 generated by the second monitoring control circuit unit 130C and the output permission signal OUTE generated by the second error processing circuit unit 160C to the self-holding circuit 197; a circuit-closure signal from the power switch 105 is inputted, as a driving signal for a logical sum, to the self-holding circuit 197; the output of the self-holding circuit 197 energizes the main apparatus control power source relay 107b. Accordingly, when the power switch 105 is closed, the main apparatus control power source relay 107b is energized, so that the main apparatus power supply command output RY20 is generated, and hence the second microprocessor CPU20 starts its operation and then the main apparatus power supply control output RY00 is generated; after that, even when the power switch 105 is closed, the energization of the main apparatus control power source relay 107b is continued; however, when the second microprocessor CPU20 stops the main apparatus power supply control output RY00 or when the second error processing circuit unit 160C stops the output permission signal OUTE, the main apparatus control power source relay 107b is de-energized.

The second cutoff circuit 199 energizes the transmission control power source relay 109b by use of the output of a logical multiplication of the second auxiliary apparatus power supply control output RY02 generated by the second monitoring control circuit unit 130C, the output permission signal OUTE generated by the second error processing circuit unit 160C, and the logical inversion signal of the second state storage signal S20; the transmission control power source relay 109b is energized and controlled by the second auxiliary apparatus power supply control output RY02; however, when the watchdog signal becomes abnormal and hence the output permission signal OUTE is stopped or when the second state storage signal S20 is generated as an abnormality occurs in the transmission control system, the transmission control power source relay 109b is de-energized. In this regard, however, it may be allowed that the transmission control power source relay 109b is removed and the speed-change control output OUT22 generated by the second microprocessor CPU20 is directly cut off by the output signal of the second cutoff circuit 199. The second microprocessor CPU20 generates the reverse monitoring abnormality determination signal QAER for resetting the second monitoring control circuit unit 130C; the reverse monitoring abnormality determination signal QAER is a signal for initializing the second monitoring control circuit unit 130C in the case where when in response to question information obtained from the second monitoring control circuit unit 130C, the second microprocessor CPU20 intentionally transmits an erroneous answer to the second monitoring control circuit unit 130C, monitors the processing state of the second monitoring control circuit unit 130C, and then determines whether or not the second monitoring control circuit unit 130C is normally operating, it is determined that the second monitoring control circuit unit 130C is not normally operating.

Next, FIG. 8, which is a detailed circuit configuration diagram of the second error processing circuit unit 160C represented in FIG. 7, will be explained. In FIG. 8, the watchdog timer 161 provided in the second error processing circuit unit 160C measures the on-time width and the off-time width of the pulse train signal WDS20, which is a watchdog signal generated by the second microprocessor CPU20; when the pulse width of the pulse train signal WDS20 exceeds a predetermined time, the watchdog timer 161 generates the basic reset signal RST0, and when the second microprocessor CPU20 normally operates, the watchdog timer 161 generates the output permission signal OUTE. The second error processing circuit unit 160C is provided with the total logical sum circuit 162 for generating the composite reset signal RST20 and the second logical sum circuit 163b for generating a transmission system control abnormality signal ER22. The basic reset signal RST0 generated by the watchdog timer 161, a transmission control abnormality signal QAE22 generated by the transmission system control abnormality determination means 308b, described above in FIG. 3, a transmission control unit memory abnormality signal MME22 generated by the second microprocessor CPU20, and a transmission control unit H/W abnormality signal HDE22 are inputted to and logically summed up in the second logical sum circuit 163b.

With regard to the second logical sum circuit 163b, the valve opening control abnormality signal QAE22 is an abnormality detection signal that relates to a creation program for the speed-change control output OUT22, which is created by the second microprocessor CPU20, and that is created by the second monitoring control circuit unit 130C in the case where when each of two or more question information pieces to be generated by the second monitoring control circuit unit 130C and corresponding answer information obtained from the second microprocessor CPU20 are compared with each other, no predetermined correct answer information is obtained. The transmission control unit memory abnormality signal MME22 is an abnormality detection signal that is created by the second microprocessor CPU20 when there occurs a code check abnormality related to a transmission control region of the RAM that collaborates with the second microprocessor CPU20. The transmission control unit H/W abnormality signal HDE22 is an abnormality detection signal that is created by the second microprocessor CPU20 when there occurs a hardware error that is caused by disconnection or a short circuit in part of the input/output circuits that are connected with the second microprocessor CPU20 and are related to transmission control.

The second counter 164b counts the number of occurrence instances of the transmission system control abnormality signal ER22, which is an output signal of the second logical sum circuit 163b; when the number of occurrence instances thereof reaches a predetermined threshold number, the second counter 164b sets the second storage circuit 165b, which is a flip-flop circuit, so as to generate the second state storage signal S20. The subtraction clock signal 167b periodically decreases the present counting value of the second counter 164b so that when the occurrence frequency of the transmission system control abnormality signal ER22 is low, the present counting value of the second counter 164b does not increase up to a predetermined threshold number and hence the second storage circuit 165b is not set; subtraction limitation prevents the present counting value from becoming smaller than "0". The second storage circuit 165b is reset by the power-on-reset signal POR to be generated when the power switch 105 is closed. The second gate circuit 166b generates a second reset signal RST22, which is the output of a multiplication of the logical inversion signal of the second state storage signal S20 and the transmission system control abnormality signal ER22, and inputs the second reset signal RST22 to the total logical sum circuit 162.

Thus, before the second state storage signal S20 is generated, the transmission system control abnormality signal ER22 is inputted to the total logical sum circuit 162; however, after the second state storage signal S20 has been generated, the transmission system control abnormality signal ER22 is cut off. In this regard, however, because directly inputted also to the total logical sum circuit 162, the basic reset signal RST0 is still effective after the second state storage signal S20 is generated. The basic reset signal RST0 generated by the watchdog timer 161, a basic control abnormality signal QAE20 generated by the transmission system control abnormality determination means 308b, described above in FIG. 3, a basic unit memory abnormality signal MME20 generated by the second microprocessor CPU20, and a basic unit H/W abnormality signal HDE20 are inputted to and logically summed up in the total logical sum circuit 162. With regard to the total logical sum circuit 162, the basic control abnormality signal QAE20 is an abnormality detection signal that relates to a creation program for the basic control including the transmission control output OUT20, which is created by the second microprocessor CPU20, and that is created by the second monitoring control circuit unit 130C in the case where when each of two or more question information pieces to be generated by the second monitoring control circuit unit 130C and corresponding answer information obtained from the second microprocessor CPU20 are compared with each other, no predetermined correct answer information is obtained.

The basic unit memory abnormality signal MME20 is an abnormality detection signal that is created by the second microprocessor CPU20 when there occurs a code check abnormality related to a basic control region of the RAM that collaborates with the second microprocessor CPU20; the basic unit H/W abnormality signal HDE20 is an abnormality detection signal that is created by the second microprocessor CPU20 when there occurs a hardware error that is caused by disconnection or a short circuit in part of the input/output circuits that are connected with the second microprocessor CPU20 and are related to basic control. When there exists an overlapping part between the basic control region and the transmission control region of the RAM, the overlapping part is dealt as the one that belongs to any one of or both of the basic control region and the transmission control region. In this embodiment, the second counter 164b is provided in the output circuit unit of the second logical sum circuit 163b; however, it may be allowed that the second counter 164b is moved to the input circuit unit of the second logical sum circuit 163b and respective different determination threshold values are set for input signals or that subtraction processing by the subtraction clock signal 167b is omitted.

In the foregoing explanation, the memory abnormality signal is limited to a code check abnormality in the RAM; however, it may be allowed that a code check abnormality in a related program memory or data memory is included. It may be allowed that the reset processing by the second microprocessor CPU20 is software resetting without utilizing the resetting terminal. With regard to a hardware abnormality, for example, in the case where both of a pair of accelerator position sensors for detecting the step-on degree of the accelerator pedal are abnormal, power supply to the automatic transmission control electromagnetic valve 109c is immediately stopped without resetting the second microprocessor CPU20 so that the driving mode moves to the evacuation driving mode using the fixed throttle valve opening degree. As described above, the respective separate abnormality processing steps are applied to various hardware abnormalities detected separately; it is desirable that with regard to the detection means for hardware abnormality, related to part of the input and output circuits that highly depend on software, the initialization and restarting of the second microprocessor CPU20 are once implemented before abnormality dealing processing is implemented so that it is reconfirmed whether or not there exists an abnormality; the foregoing hardware abnormality signals HDEi (I=20, 22) are logically summed up so as to become the composite reset signal RST20.

(2) Detailed Description of Operation and Action

Next, the operation of the vehicle engine control system according to Embodiment 2 of the present invention, configured as illustrated in FIGS. 5 and 7, will be explained in detail. At first, in FIGS. 5 and 7, when the power switch 105 is closed, the main apparatus control power source relay 107b is driven by way of the self-holding circuit 197; the vehicle battery 101 supplies electric power to the constant voltage power source 110 through the main apparatus power supply command outputs RY10 or RY20, which is an output element of the main apparatus control power source relay 107b; the control voltage Vcc is applied to the first and second main control circuit units 120B and 120C, the first and second monitoring control circuit units 130B and 130C, and the first and second error processing circuit units 160B and 160C, so that control operation is started. The first microprocessor CPU10 included in the first main control circuit unit 120B performs driving control of the fuel-injection electromagnetic valve 107a and the intake valve opening degree control motor 108a, in response to the operation states of the first sensor group 103 and the second sensor group 104a and the contents of program memories that collaborate with the first microprocessor CPU10. A valve opening mechanism of the intake valve includes an initial-position returning mechanism that makes it possible to perform evacuation driving using the fixed intake valve opening degree when power supply to the intake valve opening degree control motor 108a is stopped; when the valve-opening control power source relay 108b is energized, the intake valve opening degree control motor 108a can be supplied with electric power.

The second microprocessor CPU20 included in the second main control circuit unit 120C performs driving control of the low-speed step selection electromagnetic valve 109d and the automatic transmission control electromagnetic valves 109c, which are included in the basic electric load, in response to the operation states of the first and second sensor groups 103a and 104 and the contents of program memories that collaborate with the second microprocessor CPU20. A transmission driving mechanism of the automatic transmission 109a including the low-speed step selection electromagnetic valve 109d and the two or more automatic transmission control electromagnetic valves 109c contains a transmission ratio fixation mechanism that makes it possible to at least travel forward at a fixed transmission ratio suitable for middle- or high-speed driving when during variable-speed forward driving, power supply to the automatic transmission 109a is stopped or when power-supply driving of all the automatic transmission control electromagnetic valves 109c included in the automatic transmission 109a is stopped; when the transmission control power source relay 109b is energized or is capable of being energized, the automatic transmission control electromagnetic valve 109c can be supplied with electric power and can be driven. Because the low-speed step selection electromagnetic valve 109d included in the automatic transmission 109a is supplied with electric power through the main apparatus power supply command output RY20, forward and backward driving at a low-speed step can be implemented when the gearshift lever is set to a low-speed forward position or the backward position, respectively, even when the transmission control power source relay 109b has been de-energized; when the gearshift lever is switched to the variable-speed forward driving mode, evacuation driving at a fixed transmission ratio corresponding to, for example, the third speed can be implemented.

Figure 6:
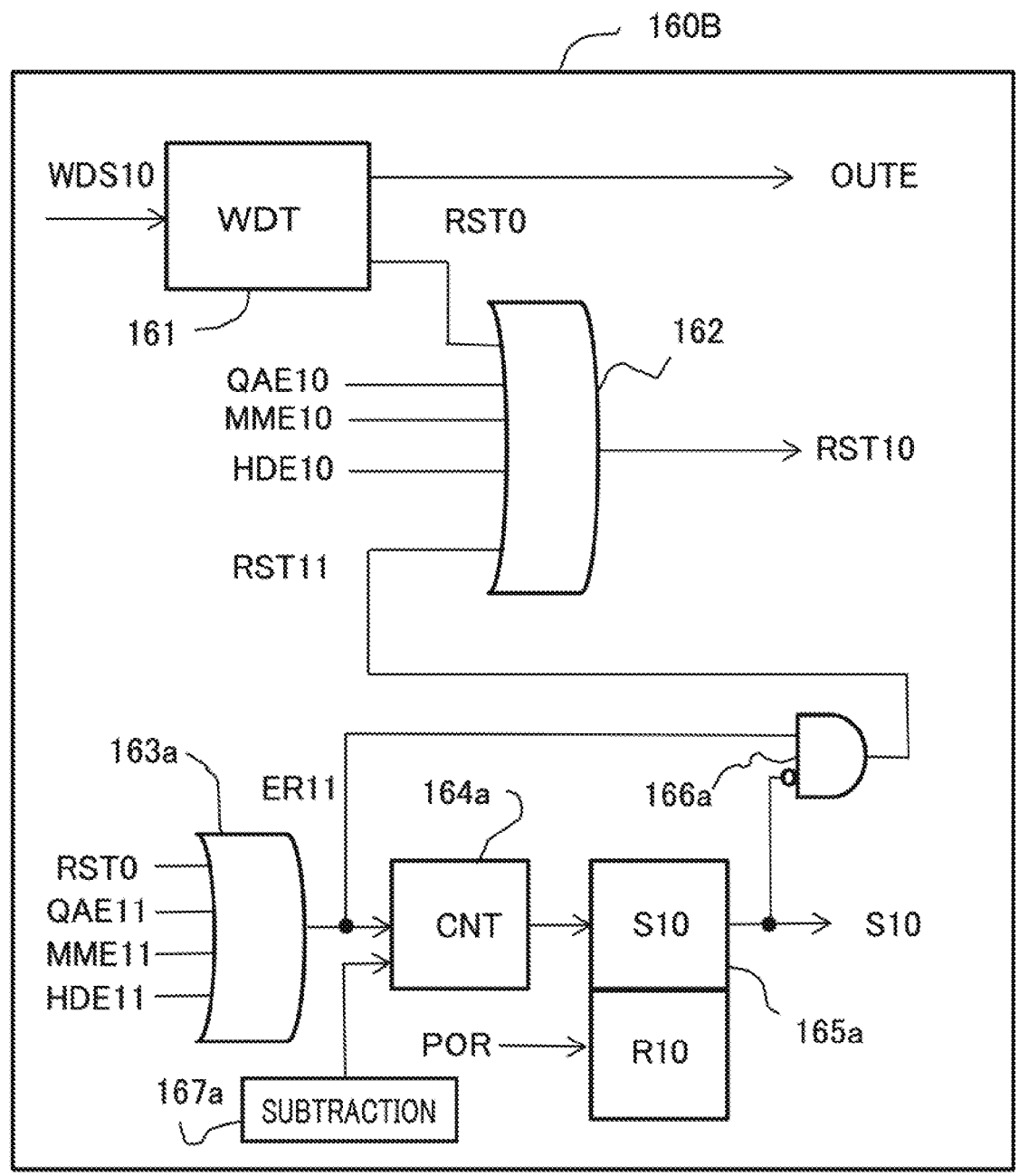
FIG. 6 is a detailed circuit configuration diagram of an error processing circuit unit in the vehicle engine control system in FIG. 5.
Figure 8:
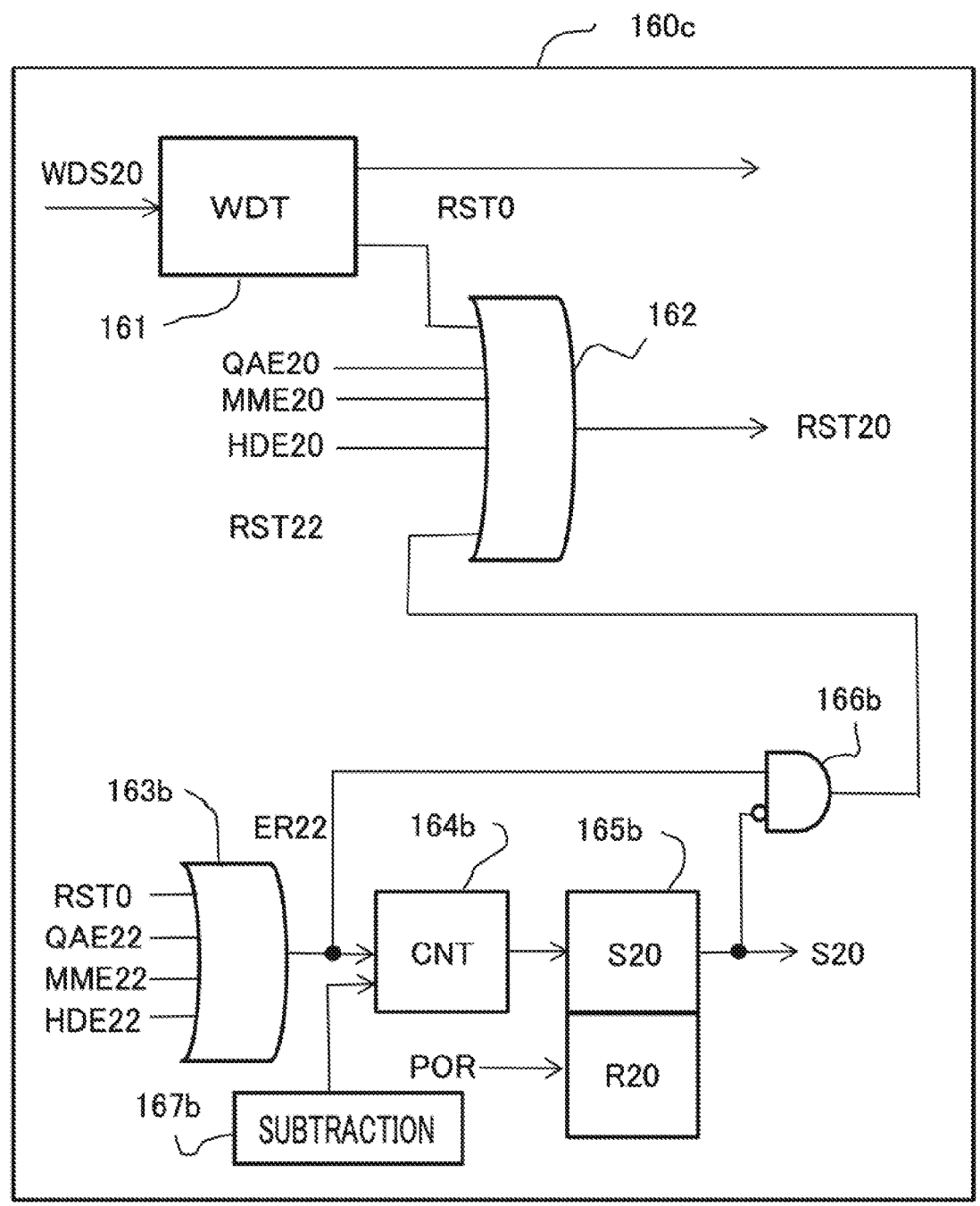
FIG. 8 is a detailed circuit configuration diagram of an error processing circuit unit in the transmission control apparatus in FIG. 7.

The watchdog signals to be generated by the first and second microprocessors CPU10 and CPU20 are monitored by the watchdog timer 161 represented in FIGS. 6 and 8; when a runaway abnormality that causes an excessive calculation period occurs, the basic reset signal RST0 is generated so as to initialize and then restart the first and second microprocessors CPU10 and CPU20. In the case where even when the first and second microprocessors CPU10 and CPU20 restart, the watchdog timer 161 immediately operates and hence the basic reset signal RST0 is generated again and where this situation continues, the first and second microprocessors CPU10 and CPU20 eventually do not perform control operation and hence the electric loads are in a non-operating state. However, when a sporadic malfunction attributed to noise causes a runaway abnormality in the first microprocessor CPU10 or the second microprocessor CPU20, the first microprocessor CPU10 or the second microprocessor CPU20 can be recovered to the normal state through initialization and restarting. The abnormality monitoring of the first main control circuit unit 120B, is implemented in such a way that the subject of abnormality monitoring is divided into basic system control and valve opening system control; in each of the systems, the abnormality monitoring is implemented in such a way that the subject of abnormality monitoring is divided into a question-answer abnormality, a memory abnormality, and a hardware abnormality.

The abnormality monitoring of the second main control circuit unit 120C is implemented in such a way that the subject of abnormality monitoring is divided into basic system control and transmission system control; in each of the systems, the abnormality monitoring is implemented in such a way that the subject of abnormality monitoring is divided into a question-answer abnormality, a memory abnormality, and a hardware abnormality. The concept of a question-answer abnormality in this embodiment is the same as that explained already in Embodiment 1; each of respective program memories that collaborate with the first and second microprocessors CPU10 and CPU20 stores a monitoring-subject control program corresponding to a question number and a data table for substitute inputs to be applied to the monitoring-subject control program; in response to the question number Qi transmitted from the first or second monitoring control circuit unit 130B or 130C, a calculation result based on the monitoring-subject control program is returned to the first or second monitoring control circuit unit 130B or 130C, as the case may be; the first or second monitoring control circuit unit 130B or 130C compares known correct answer information with answer information so as to determine whether or not there exists a calculation control abnormality.

Next, supplementary explanations for the question-answer abnormality determination operation methods in the vehicle engine control system and the transmission control apparatus represented in FIGS. 5 and 7, respectively, will simply be made with reference to FIG. 3, described above. In FIG. 3, the process 300 corresponds to the operation start step for the first or second monitoring control circuit unit 130B or 130C, which is a local control unit LCU10 or LCU20, as the case may be, formed of a logic circuit having no microprocessor. With regard to the types of abnormality signals obtained in the process 307 in response to question information transmitted in the process 301b, the abnormality signals for the first monitoring control circuit unit 130B are the basic control abnormality signal QAE10 and the valve opening control abnormality signal QAE11; the abnormality signals for the second monitoring control circuit unit 130C are the basic control abnormality signal QAE20 and the transmission control abnormality signal QAE22; the basic control abnormality signal QAE10 and the valve opening control abnormality signal QAE11 are represented in FIG. 6, and the basic control abnormality signal QAE20 and the transmission control abnormality signal QAE22 are represented in FIG. 8.

Next, supplementary explanations for the operation concepts of the abnormality determinations in the vehicle engine control system and the transmission control apparatus represented in FIGS. 5 and 7, respectively, will simply be made with reference to FIG. 4, described above. In FIG. 4, the process 400 corresponds to a start step for the control operation by the first or second microprocessor CPU10 or CPU20. In the case of the first microprocessor CPU10, basic control operation mainly based on the fuel injection control output OUT10 and the abnormality monitoring therefor are implemented in the processes 400a through 402, and controlling operation for the first auxiliary apparatus, based mainly on the valve-opening control output OUT11, and the abnormality monitoring therefor are implemented in the processes 400b through 412; when based on the valve opening system control abnormality signal ER11, the first storage circuit 165a stores the first state, power supply to the intake valve opening degree control motor 108a is stopped and the valve opening system control abnormality signal ER11 is prohibited from resetting the first microprocessor CPU10; however, the processes 400c through 422 are not the subjects thereof.

In the case of the second microprocessor CPU20, basic control operation mainly based on the transmission control output OUT20 and the abnormality monitoring therefor are implemented in the processes 400a through 402, and controlling operation for the second auxiliary apparatus, based mainly on the speed-change control output OUT22, and the abnormality monitoring therefor are implemented in the processes 400c through 422; when based on the transmission system control abnormality signal ER22, the second storage circuit 165b stores the second state, power supply to the automatic transmission control electromagnetic valve 109c is stopped and the transmission system control abnormality signal ER22 is prohibited from resetting the second microprocessor CPU20; however, the processes 400b through 412 are not the subjects thereof. In the foregoing explanation, it has been described that when in the process 309b represented in FIG. 3, the first state or the second state occurs, the transmission of question information for the valve-opening control system or the transmission control system and the implementation of the output control program are stopped; however, although the first auxiliary apparatus power supply command output RY1 or the second auxiliary apparatus power supply command output RY2 is stopped as an abnormality occurs, the control operation in Embodiment 2 is the same as that in Embodiment 1 when neither the transmission of question information nor the implementation of the program is stopped.

In the foregoing explanation, it has been described that when in the process 309b represented in FIG. 3, the first state or the second state occurs, the transmission of question information for the valve-opening control system or the transmission control system and the implementation of the output control program are stopped; however, although the first auxiliary apparatus power supply command output RY11 or the second auxiliary apparatus power supply command output RY22 is stopped as an abnormality occurs, the processes 410 and 420 are deleted in FIG. 4, explaining the case where the question and the implementation of the program are not stopped. As a result, when the result of the determination in the process 400b or 400c becomes "YES", the process 411 or 421, as the case may be, is immediately implemented. However, in the case of a non-runaway abnormality at a time when any one of the valve opening control abnormality signal QAE11, the valve opening control unit memory abnormality signal MME11, and the valve opening control unit H/W abnormality signal HDE11 occurs in the process 411 and the basic reset signal RST0 does not operate, neither the basic control operation nor the transmission control operation is stopped, but only the valve-opening control operation is temporarily stopped (in the case of a non-runaway sporadic abnormality) or continuously stopped (in the case of a non-runaway continuous abnormality). In addition, in the case of a non-runaway abnormality at a time when any one of the transmission control abnormality signal QAE22, the transmission control unit memory abnormality signal MME22, and the transmission control unit H/W abnormality signal HDE22 occurs in the process 421 and the basic reset signal RST0 does not operate, neither the basic control operation nor the valve-opening control operation is stopped, but only the transmission control operation is temporarily stopped (in the case of a non-runaway sporadic abnormality) or continuously stopped (in the case of a non-runaway continuous abnormality). This characteristic is the same as that of Embodiment 1.

(3) Gist and Feature of Embodiment 2

As is clear from the foregoing explanation, the vehicle engine control system 100B according to Embodiment 2 of the present invention is a function-separated vehicle engine control system whose first case 70a contains the first main control circuit unit 120B connected with the engine control output circuit units 177a and 178a, the first monitoring control circuit unit 130B serial connected with the first main control circuit unit 120B, and the first error processing circuit unit 160B; the vehicle engine control system 100B is connected with the transmission control apparatus 100c whose second case 70b contains the second main control circuit unit 120C connected with the transmission control output circuit units 179d and 179c, the second monitoring control circuit unit 130C serial connected with the second main control circuit unit 120C, and the second error processing circuit unit 160C; the first main control circuit unit 120B includes the first microprocessor CPU10 that operates with an opening/closing signal or an analogue signal, as an input signal, obtained from the first sensor group 103, which is utilized in engine control, and the second sensor group 104a, which is shared with partial transmission control, and that generates at least the fuel injection control output OUT10 for the fuel-injection electromagnetic valve 107a and the valve-opening control output OUT11 for the intake valve opening degree control motor 108a for an intake valve provided in the air-intake throttle; the valve-opening drive mechanism of the intake valve using the intake valve opening degree control motor 108a includes an initial-position returning mechanism that makes it possible to perform evacuation driving using a fixed intake valve opening degree when power supply to the intake valve opening degree control motor 108a is stopped; the second main control circuit unit 120C includes the second microprocessor CPU20 that operates with an opening/closing signal or an analogue signal, as an input signal, obtained from the second sensor group 104 utilized in the transmission control and the first sensor group 103a, which is shared with the part of the engine control, and that generates at least the speed-change control output OUT22 for the automatic transmission control electromagnetic valve 109c.

The transmission driving mechanism of the automatic transmission 109a containing the automatic transmission control electromagnetic valve 109c includes a transmission ratio fixation mechanism that makes it possible to at least travel forward at a fixed transmission ratio suitable for middle- or high-speed driving when during variable-speed forward driving, power supply to the automatic transmission 109a is stopped or when driving of all the automatic transmission control electromagnetic valves 109c is stopped; the first monitoring control circuit unit 130B is provided with the valve-opening system control abnormality determination means 308a that sequentially transmits to the first microprocessor CPU10 in operation a plurality of question information pieces related to at least a creation program for the valve-opening control output OUT11, receives from the first microprocessor CPU10 the answer information pieces corresponding to the question information pieces, compares the answer information pieces with the respective corresponding correct answer information pieces, preliminarily stored in the first monitoring control circuit unit 130B, determines whether or not a code check abnormality and an answering-response delay exist in the answer information so as to determine whether or not a valve-opening control abnormality including a communication abnormality and a question-answer abnormality exists, and then creates the valve opening control abnormality signal QAEk (k=11), which is one of the valve opening system control abnormality signals ER11; the first error processing circuit unit 160B is provided with the watchdog timer 161 that generates the basic reset signal RST0 when the calculation period of the first microprocessor CPU10 is abnormal and then initializes and restarts the first microprocessor CPU10, the first storage circuit 165a that is set when the first state is established in which the occurrence count or the occurrence frequency of each of the basic reset signal RST0 and the valve opening control abnormality signal QAE11 becomes the same as or larger than a predetermined threshold value or the total occurrence count or the total occurrence frequency of the basic reset signal RST0 and the valve opening control abnormality signal QAE11 becomes the same as or larger than a predetermined threshold value, and the first gate circuit 166a.

In addition, when the first storage circuit 165a has stored occurrence of an abnormality, the first cutoff circuit 198 stops power supply to the intake valve opening degree control motor 108a; the first gate circuit 166a resets the first microprocessor CPU10 through the basic reset signal RST0 and the valve opening control abnormality signal QAE11 when the first state has not been established, and after the first storage circuit 165a has stored occurrence of an abnormality, the first gate circuit 166a prohibits the valve opening control abnormality signal QAE11 from performing reset processing of the first microprocessor CPU10 so that a continuous non-runaway repeated abnormality related to the valve-opening control is suppressed from providing an effect to the fuel injection control; the second error processing circuit unit 160C detects and stores the occurrence state of at least the transmission system control abnormality signal ER22, and the second cutoff circuit 199, which responds to the transmission system control abnormality signal ER22, stops driving of or power supply to at least the automatic transmission control electromagnetic valve 109c in the automatic transmission 109a by having detected a transmission-control abnormality.

The second main control circuit unit 120C generates the speed-change control output OUT22 for the automatic transmission control electromagnetic valve 109c and the transmission control output OUT20 for the low-speed step selection electromagnetic valve 109d; the second monitoring control circuit unit 130C is provided with the transmission system control abnormality determination means 308b that sequentially transmits to the second microprocessor CPU20 in operation a plurality of question information pieces related to at least a creation program for the speed-change control output OUT22, receives from the second microprocessor CPU20 the answer information pieces corresponding to the question information pieces, compares the answer information pieces with the respective corresponding correct answer information pieces, preliminarily stored in the second monitoring control circuit unit 130C, determines whether or not a code check abnormality and an answering-response delay exist in the answer information so as to determine whether or not a transmission control abnormality including a communication abnormality and a question-answer abnormality exists, and then creates the transmission control abnormality signal QAEk (k=22), which is one of the transmission system control abnormality signals ER22; the second error processing circuit unit 160C is provided with the second gate circuit 166b and the second storage circuit 165b that is set when the second state is established in which the occurrence count or the occurrence frequency of each of the basic reset signal RST0 and the transmission control abnormality signal QAE22 becomes the same as or larger than a predetermined threshold value or the total occurrence count or the total occurrence frequency of the basic reset signal RST0 and the transmission control abnormality signal QAE22 becomes the same as or larger than a predetermined threshold value.

Then, when the second storage circuit 165b has stored occurrence of an abnormality, the second cutoff circuit 199 stops power supply to the automatic transmission control electromagnetic valve 109c or stops the speed-change control output OUT22 from being generated; the second gate circuit 166b resets the second microprocessor CPU20 through the basic reset signal RST0 and the transmission control abnormality signal QAE22 when the second state has not been established, and after the second storage circuit 165b has stored occurrence of an abnormality, the second gate circuit 166b prohibits the transmission control abnormality signal QAE22 from performing reset processing of the second microprocessor CPU20 so that a continuous non-runaway repeated abnormality related to the transmission control is suppressed from providing an effect to the operation of other transmission control outputs; when after the second storage circuit 165b has stored the occurrence of an abnormality, the variable-speed forward driving mode is once manually cancelled and then the driving mode is switched to the backward driving mode or the low-speed forward driving mode, the transmission control output OUT20 becomes effective so as to perform energization drive of the low-speed step selection electromagnetic valve 109d.

As described above, with regard to claim 6 of the present invention, when the second state is established in which the occurrence count or the occurrence frequency of each of the basic reset signal generated by the watchdog timer and the transmission control abnormality signal generated by the control abnormality determination means becomes the same as or larger than a predetermined threshold value, the second storage circuit stores the occurrence of an abnormality and stops power supply to the automatic transmission control electromagnetic valve or stops the generation of the speed-change control output so as to set the transmission ratio to a fixed transmission ratio for middle- or high-speed driving; until the second storage circuit stores the occurrence of an abnormality, the basic reset signal and the transmission control abnormality signal implement reset processing of the second microprocessor, and after the second storage circuit has stored the occurrence of an abnormality, the basic reset signal continues the reset processing of the second microprocessor; however, the transmission control abnormality signal is prohibited from implementing reset processing of the second microprocessor.

Accordingly, with regard to the transmission control abnormality signal, when after driving is started, an abnormality with less occurrence count or less occurrence frequency than a predetermined occurrence count or a predetermined occurrence frequency occurs, the second microprocessor is initialized and restarted and recovery processing for the sporadic abnormality is performed, so that the transmission control can normally be performed; in the case where the occurrence of an abnormality continues, this recovery processing is stopped; thus, in the case of a non-runaway repeated abnormality that is a continuous abnormality but does not lead to a runaway abnormality of the microprocessor, the second microprocessor is not reset; as a result, although the transmission control by the second microprocessor cannot be implemented, the driving control of the low-speed step selection electromagnetic valve can be implemented and hence evacuation driving at a fixed transmission ratio becomes effective; when a runaway abnormality occurs in the microprocessor occurs, the microprocessor is always initialized and restarted by the watchdog timer; thus, there is demonstrated a characteristic that when the runaway abnormality is contingent and sporadic, at least forward/backward selection control recovers to the normal state and hence the low-speed evacuation driving can be continued. That is to say, when power supply to the automatic transmission is not stopped and the backward driving mode or the low-speed forward driving mode is selected, backward driving or low-speed forward driving can be performed by use of part of automatic transmission control electromagnetic valves or a low-speed step selection electromagnetic valve; thus, there is demonstrated a characteristic that it is readily made possible to escape from a run-off state or to perform evacuation driving for uphill-road driving. This characteristic is demonstrated also by a vehicle engine control system 100Bd and a transmission control apparatus 100Cd according to Embodiment 3.

The first monitoring control circuit unit 130B stops transmission of question information on valve-opening control for creating the valve opening control abnormality signal QAE11, after the first storage circuit 165*a* has stored the first state, or the second monitoring control circuit unit 130C stops transmission of question information on transmission control for creating the transmission control abnormality signal QAE22, after the second storage circuit 165*b* has stored the second state; alternatively, the first main control circuit unit 120B stops implementation of a control program for creating the valve-opening control output OUT11 for the intake valve opening degree control motor 108*a*, after the first storage circuit 165*a* has stored the first state, or the second main control circuit unit 120C stops implementation of a control program for creating the speed-change control output OUT22 for the automatic transmission control electromagnetic valve 109*c*, after the second storage circuit 165*b* has stored the second state.

As described above, with regard to claim 7 of the present invention, after the first storage circuit has stored occurrence of a valve-opening control abnormality, transmission of question information on the valve-opening control is stopped, or, preferably, implementation of the creation program for the valve-opening control output is stopped; after the second storage circuit has stored occurrence of a transmission control abnormality, transmission of question information on the transmission control is stopped, or, preferably, implementation of the creation program for the speed-change control output is stopped. Therefore, there is demonstrated a characteristic that the microprocessor's load of implementing unnecessary control programs and answer creation programs is reduced and that the watchdog timer is prevented from operating through the implementation of the program that has caused an abnormality to occur. This characteristic is demonstrated also by the vehicle engine control system 100Bd and the transmission control apparatus 100Cd according to Embodiment 3.

Embodiment 3

(1) Detailed Description of Configuration

Figure 9:
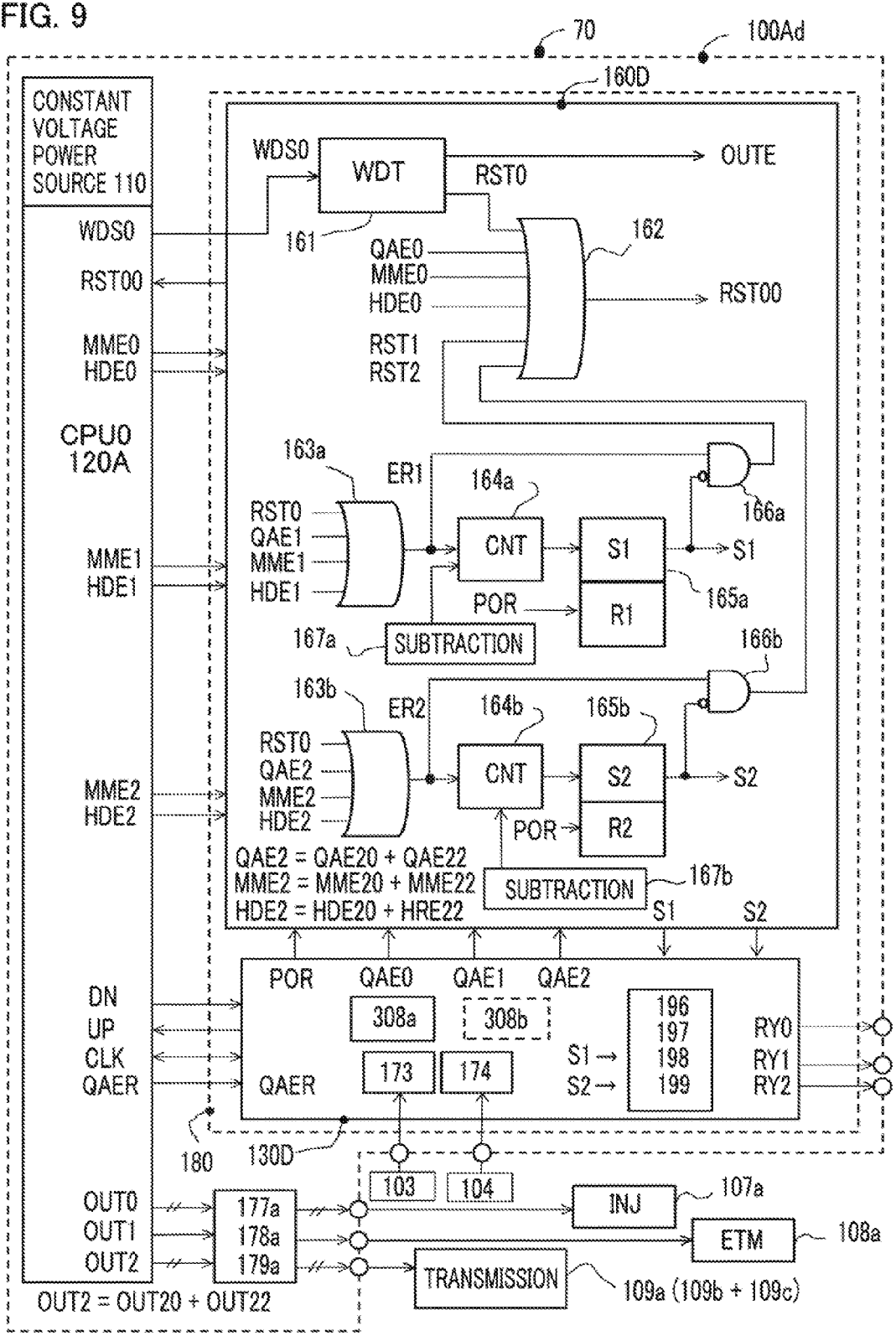
FIG. 9 is a block diagram illustrating the overall configuration of a vehicle engine control system according to Embodiment 3 of the present invention.

Hereinafter, with reference to FIG. 9, which is a block diagram representing the overall configuration of the vehicle engine control system 100Ad according to Embodiment 3 of the present invention, the configuration thereof will be explained while attention is focused on the difference from the vehicle engine control system represented in FIG. 1. In FIG. 9, the vehicle engine control system 100Ad is configured mainly with the main control circuit unit 120A, a monitoring control circuit unit 130D, and an error processing circuit unit 160D that are mounted on an unillustrated circuit board and are contained in the collective case 70; as is the case with the vehicle engine control system 100A, the vehicle engine control system 100Ad is a function-integrated vehicle engine control system in which an engine control circuit function and a transmission control function are included. The external connection apparatuses of the vehicle engine control system 100Ad are the same as those of the foregoing vehicle engine control system 100A, and the respective functions of the monitoring control circuit unit 130D and the error processing circuit unit 160D are the same as those of the monitoring control circuit unit 130A and the error processing circuit unit 160A. In this regard, however, the monitoring control circuit unit 130D and the error processing circuit unit 160D are integrated with each other, as an integrated circuit device 180. The integrated circuit device 180 contains the first and second input interface circuits 173 and 174, the power cutoff circuit 196, the self-holding circuit 197, the first cutoff circuit 198, and the second cutoff circuit 199, which are represented in FIG. 1; however, the engine control output circuit units 177*a* and 178*a*, the transmission control output circuit unit 179*a* (179*d* and 179*c*), and the power circuit unit of the constant voltage power source 110 are directly mounted on an unillustrated circuit board.

Figure 10:
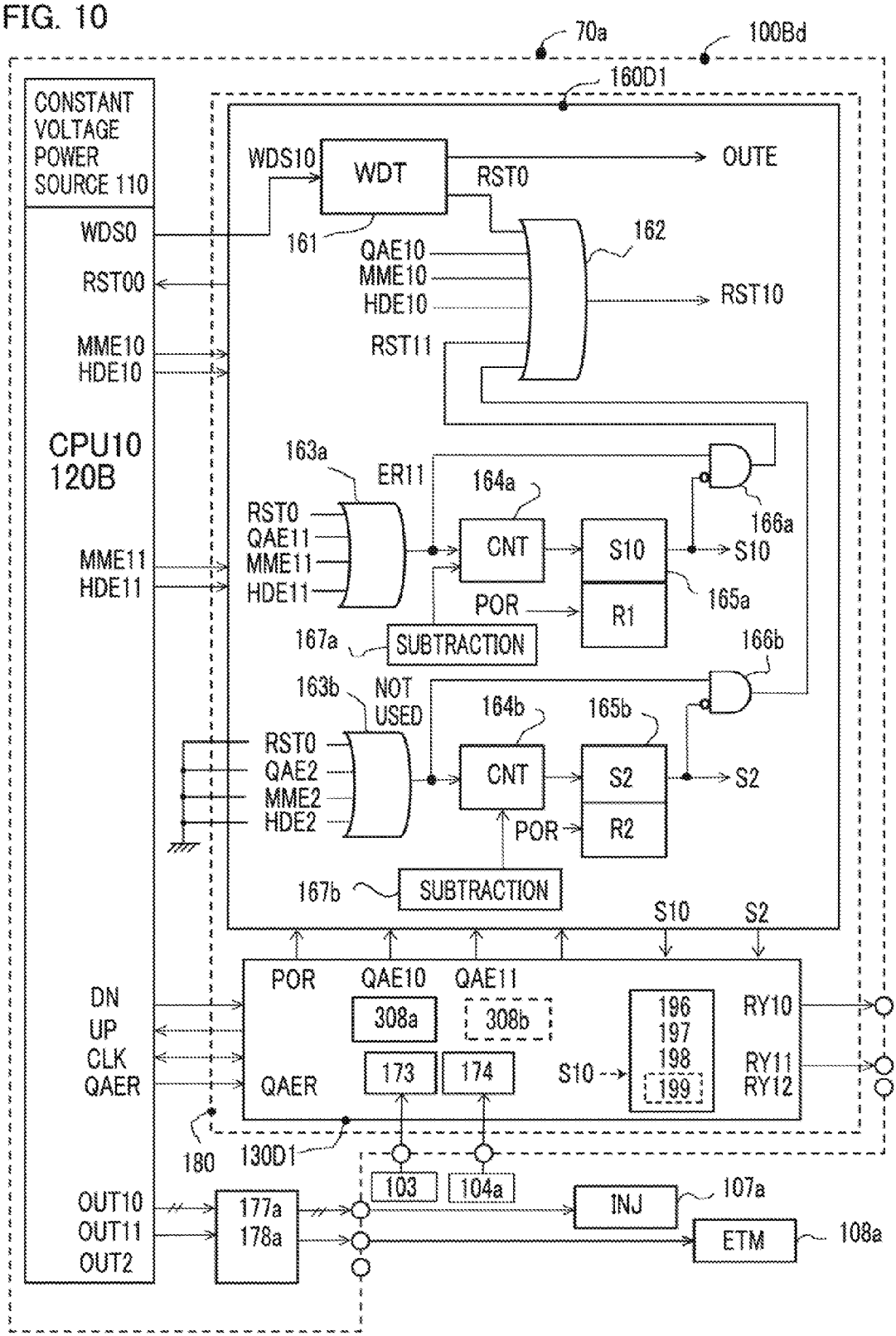
FIG. 10 is a block diagram illustrating the overall configuration of a vehicle engine control system, as a variant of the vehicle engine control system in FIG. 9.

Next, with reference to FIG. 10, which is a block diagram representing the overall configuration of the vehicle engine control system 100Bd, which is a variant embodiment of Embodiment 3 of the present invention, the configuration thereof will be explained while attention is focused on the difference from the vehicle engine control system represented in FIG. 5. In FIG. 10, the vehicle engine control system 100Bd is configured mainly with a first main control circuit unit 120B, a first monitoring control circuit unit 130D1, and a first error processing circuit unit 160D1 that are mounted on an unillustrated circuit board and are contained in the first case 70*a*; the vehicle engine control system 100B contains only an engine control function, and collaborates with the after-mentioned transmission control apparatus 100Cd including a transmission control function so that a function-separated vehicle engine control system is configured. The external connection apparatuses of the vehicle engine control system 100Bd are the same as those of the foregoing vehicle engine control system 100B, and the respective functions of the first monitoring control circuit unit 130D1 and the first error processing circuit unit 160D1 are the same as those of the first monitoring control circuit unit 130B and the first error processing circuit unit 160B. In this regard, however, the first microprocessor CPU10 included in the first main control circuit unit 120B is connected with the unillustrated external communication circuit 190; the first microprocessor CPU10 and the after-mentioned second microprocessor CPU20 mutually perform serial communication.

The first monitoring control circuit unit 130D1 and the first error processing circuit unit 160D1 are integrated with each other, as the integrated circuit device 180; the second logical sum circuit 163b in the first error processing circuit unit 160D1 is not utilized; the input circuit of the second logical sum circuit 163b is connected to the ground circuit through an unillustrated circuit board. The integrated circuit device 180 contains the first and second input interface circuits 173 and 174, the power cutoff circuit 196, the self-holding circuit 197, the first cutoff circuit 198, and the second cutoff circuit 199, which are represented in FIG. 1; however, the engine control output circuit units 177a and 178a and the power circuit unit of the constant voltage power source 110 are directly mounted on an unillustrated circuit board. However, the second sensor group 104a, represented in FIG. 5, is connected with the second input interface circuit 174a, and neither part of the second input interface circuit 174a nor the second cutoff circuit 199 is utilized.

Figure 11:
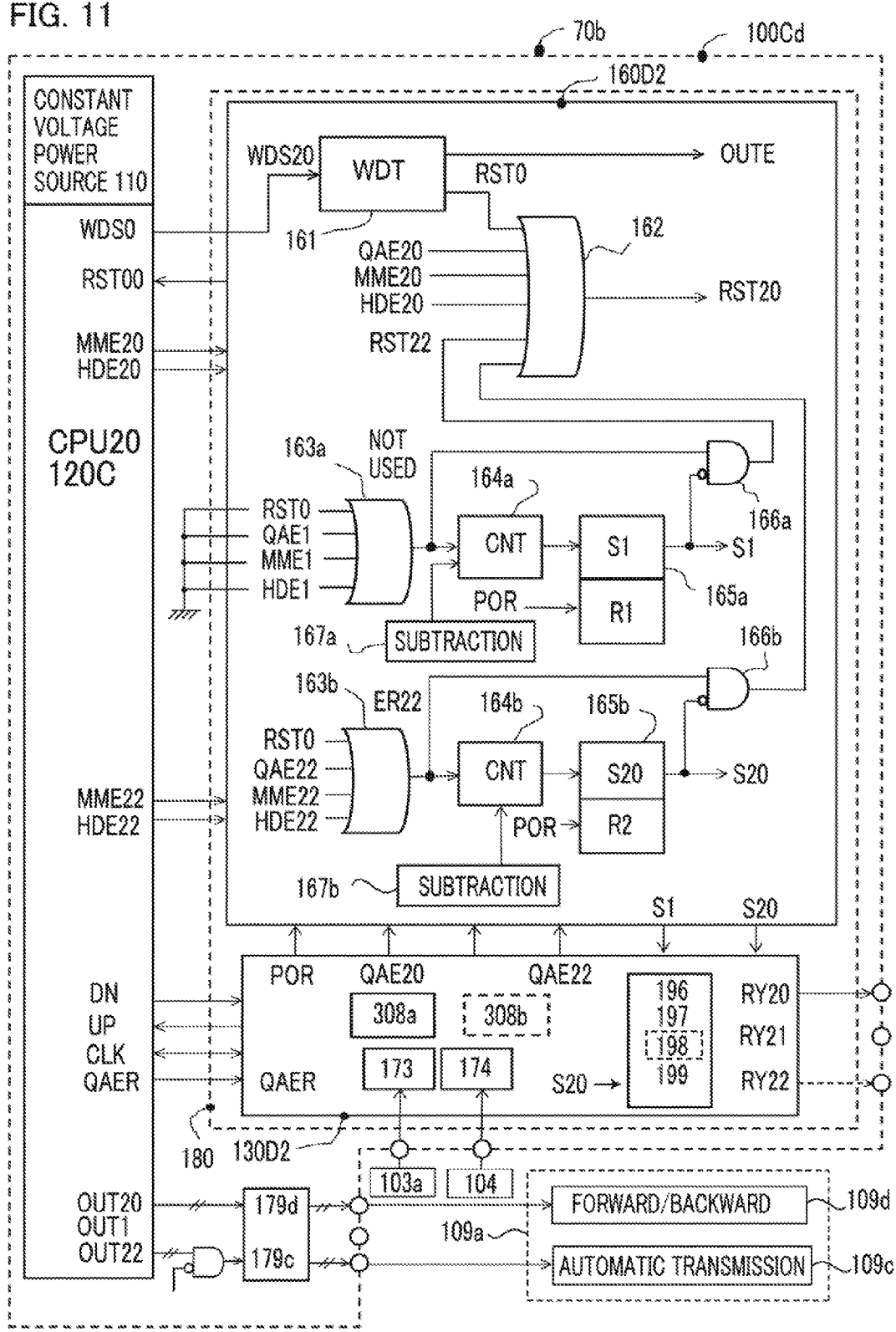
FIG. 11 is a block diagram illustrating the overall configuration of a transmission control apparatus that is connected with the vehicle engine control system in FIG. 10.

Next, with reference to FIG. 11, which is a block diagram representing the overall configuration of the vehicle engine control system 100Cd which is a variant embodiment of Embodiment 3 of the present invention, the configuration thereof will be explained while attention is focused on the difference from the vehicle engine control system represented in FIG. 7. In FIG. 11, the transmission control apparatus 100Cd is configured mainly with the second main control circuit unit 120C, a second monitoring control circuit unit 130D2, and a second error processing circuit unit 160D2 that are mounted on an unillustrated circuit board and are contained in the second case 70b; the transmission control apparatus 100Cd contains only a transmission control function, and collaborates with the foregoing vehicle engine control system 100Bd including an engine control function, so that the transmission control apparatus 100Cd is included in a function-separated vehicle engine control system. The external connection apparatuses of the transmission control apparatus 100Cd are the same as those of the foregoing vehicle engine control system 100C, and the respective functions of the second monitoring control circuit unit 130D2 and the second error processing circuit unit 160D2 are the same as those of the second monitoring control circuit unit 130C and the second error processing circuit unit 160C. In this regard, however, the second microprocessor CPU20 included in the second main control circuit unit 120C is connected with the unillustrated external communication circuit 190; the second microprocessor CPU20 and the foregoing first microprocessor CPU10 mutually perform serial communication.

The second monitoring control circuit unit 130D2 and the second error processing circuit unit 160D2 are integrated with each other, as the integrated circuit device 180; the first logical sum circuit 163a in the second error processing circuit unit 160D2 is not utilized; the input circuit of the first logical sum circuit 163a is connected to the ground circuit through an unillustrated circuit board. The integrated circuit device 180 contains the first and second input interface circuits 173 and 174, the power cutoff circuit 196, the self-holding circuit 197, the first cutoff circuit 198, and the second cutoff circuit 199, which are represented in FIG. 1; however, the transmission control output circuit unit 179d and 179c and the power circuit unit of the constant voltage power source 110 are directly mounted on an unillustrated circuit board. However, the first sensor group 103a, represented in FIG. 7, is connected with the first input interface circuit 173, and neither part of the first input interface circuit 173 nor the first cutoff circuit 198 is utilized.

As is clear from the foregoing explanation, the monitoring control circuit unit and the error processing circuit, explained in FIGS. 9 through 11, are the shared monitoring control circuit unit 130D and the shared error processing circuit unit 160D, respectively, and are integrated with each other, as an integrated circuit device 180. In each of Embodiments 1 through 3, the main apparatus control power source relay 107b, the valve-opening control power source relay 108b, and the transmission control power source relay 109b are each represented as an electromagnetic relay having a contact; however, it may also be allowed that each of these relays is replaced by a no-contact power supply relay formed of a semiconductor opening/closing device and that the output element thereof is provided inside the vehicle engine control system. the fuel injection control outputs OUT0 and OUT10, the valve-opening control output OUT1 and OUT11, and the transmission control output OUT20, and the speed-change control output OUT22 are connected with the corresponding electric loads at the respective downstream positions thereof; however, it may also be allowed that these outputs are connected with the corresponding electric loads at the respective upstream positions thereof.

(2) Gist and Feature of Embodiment 3

As is clear from the foregoing explanation, the vehicle engine control system according to Embodiment 3 of the present invention is the multi-function vehicle engine control system 100Ad whose collective case 70 contains the main control circuit unit 120A connected with the engine control output circuit units 177a and 178a and the transmission control output circuit unit 179a, the monitoring control circuit unit 130D serial connected with the main control circuit unit 120A, and the error processing circuit unit 160D; alternatively, the vehicle engine control system according to Embodiment 3 of the present invention is a function-separated vehicle engine control system 100Bd whose first case 70a contains the first main control circuit unit 120B connected with the engine control output circuit units 177a and 178a, the first monitoring control circuit unit 130D1 serial connected with the main control circuit unit 120B, and the first error processing circuit unit 160D1. The function-separated vehicle engine control system 100B is connected with the transmission control apparatus 100Cd whose second case 70b contains the second main control circuit unit 120C connected with the transmission control output circuit units 179d and 179c, the second monitoring control circuit unit 130D2 serial connected with the second main control circuit unit 120C, and the second error processing circuit unit 160D2; the monitoring control circuit unit 130D, and the first monitoring control circuit unit 130D1 and the second monitoring control circuit unit 130D2, and, the error processing circuit unit 160D, and the first error processing circuit unit 160D1 and the second error processing circuit unit 160D2 are all integrated in such a way that the redundancy of common part among the corresponding circuit units is avoided (does not redundant); the integrated device forms the shared integrated circuit device 180 that collaborates with the main control circuit unit 120A, the first main control circuit unit 120B, or the second main control circuit unit 120C; the main control circuit unit 120A or the first main control circuit unit 120B includes the microprocessor CPU0 or the first microprocessor CPU10, as the case may be, that operates with an opening/closing signal or an analogue signal, as an input signal, obtained from the first sensor group 103 and the second group 104 or 104a, which are utilized in engine control and transmission control, and that generates at least the fuel injection control output OUT0 or OUT10, as the case may be, for the fuel-injection electromagnetic valve 107a and the valve-opening control output OUT1 or OUT11, as the case may be, for the intake valve opening degree control motor 108a for an intake valve provided in the air-intake throttle.

The main control circuit unit 120A or the second main control circuit unit 120C includes the microprocessor CPU0 or the second microprocessor CPU20, as the case may be, that operates with an opening/closing signal or an analogue signal, as an input signal, obtained from the first sensor group 103 or 103a and the second sensor group 104, which are utilized in engine control and transmission control, and that generates the transmission-control output OUT2, including at least the speed-change control output OUT22, for the automatic transmission 109a; the valve-opening drive mechanism of the intake valve using the intake valve opening degree control motor 108a includes an initial-position returning mechanism that makes it possible to perform evacuation driving using a fixed intake valve opening degree when power supply to the intake valve opening degree control motor 108a is stopped; the transmission driving mechanism of the automatic transmission 109a includes a transmission ratio fixation mechanism that makes it possible to at least travel forward at a fixed transmission ratio suitable for middle- or high-speed driving when during variable-speed forward driving, power supply to the automatic transmission 109a is stopped or when power-supply driving of all the automatic transmission control electromagnetic valves 109c included in the automatic transmission 109a is stopped; the shared monitoring control circuit unit 130D incorporated in the integrated circuit device 180 is provided with the valve-opening system control abnormality determination means 308a that sequentially transmits to the microprocessor CPU0 or the first microprocessor CPU10 in operation a plurality of question information pieces related to at least a creation program for the valve-opening control output OUT1 or OUT11, receives from the microprocessor CPU0 or the first microprocessor CPU10 the answer information pieces corresponding to the question information pieces, compares the answer information pieces with the respective corresponding correct answer information pieces, preliminarily stored in the shared monitoring control circuit unit 130D, determines whether or not a code check abnormality and an answering-response delay exist in the answer information so as to determine whether or not a valve-opening control abnormality including a communication abnormality and a question-answer abnormality exists, and then creates the valve opening control abnormality signal QAEk (k=1 or 11), which is one of the valve opening system control abnormality signal ER1 or ER11.

The shared error processing circuit unit 160D incorporated in the integrated circuit device 180 is provided with the watchdog timer 161 that generates the basic reset signal RST0 when the calculation period of the microprocessor CPU0 or the first microprocessor CPU10 is abnormal and then initializes and restarts the microprocessor CPU0 or the first microprocessor CPU10, the first storage circuit 165a that is set when the first state is established in which the occurrence count or the occurrence frequency of each of the basic reset signal RST0 and the valve opening control abnormality signal QAE1 or QAE11 becomes the same as or larger than a predetermined threshold value or the total occurrence count or the total occurrence frequency of the basic reset signal RST0 and the valve opening control abnormality signal QAE1 or QAE11 becomes the same as or larger than a predetermined threshold value, and the first gate circuit 166a; when the first storage circuit 165a has stored the occurrence of an abnormality, the first cutoff circuit 198 stops power supply to the intake valve opening degree control motor 108a; the first gate circuit 166a resets the microprocessor CPU0 or the first microprocessor CPU10 through the basic reset signal RST0 and the valve opening control abnormality signal QAE1 or QAE11 when the first state has not been established, and after the first storage circuit 165a has stored the occurrence of an abnormality, the first gate circuit 166a prohibits the valve opening control abnormality signal QAE1 or QAE11 from performing reset processing of the microprocessor CPU0 or the first microprocessor CPU10 so that a continuous non-runaway repeated abnormality related to the valve-opening control is suppressed from providing an effect to the fuel injection control; the main control circuit unit 120A or the second main control circuit unit 120C collaborates with the shared error processing circuit unit 160D incorporated in the integrated circuit device 180 so as to detect and store the occurrence state of at least the transmission system control abnormality signal ER2 or ER22, as the case may be, and the second cutoff circuit 199, which responds to the transmission system control abnormality signal ER2 or ER22, stops a driving output to at least the automatic transmission control electromagnetic valve 109c in the automatic transmission 109a by having detected a transmission-control abnormality.

The transmission-control output OUT2 to be generated by the main control circuit unit 120A includes the speed-change control output OUT22 for the automatic transmission control electromagnetic valve 109c and the transmission control output OUT20 for the low-speed step selection electromagnetic valve 109d; the monitoring control circuit unit 130D is provided also with the transmission system control abnormality determination means 308b that sequentially transmits to the microprocessor CPU0 in operation a plurality of question information pieces related to at least a creation program for the speed-change control output OUT22, receives from the microprocessor CPU0 the answer information pieces corresponding to the question information pieces, compares the answer information pieces with the respective corresponding correct answer information pieces, preliminarily stored in the monitoring control circuit unit 130D, determines whether or not a code check abnormality and an answering-response delay exist in the answer information so as to determine whether or not a transmission control abnormality including a communication abnormality and a question-answer abnormality exists, and then creates the transmission control abnormality signal QAEk (k=2), which is one of the transmission system control abnormality signals ER2; the error processing circuit unit 160D is provided with the second gate circuit 166b and the second storage circuit 165b that is set when the second state is established in which the occurrence count or the occurrence frequency of each of the basic reset signal RST0 and the transmission control abnormality signal QAE2 becomes the same as or larger than a predetermined threshold value or the total occurrence count or the total occurrence frequency of the basic reset signal RST0 and the transmission control abnormality signal QAE2 becomes the same as or larger than a predetermined threshold value.

Then, when the second storage circuit 165*b* has stored the occurrence of an abnormality, the second cutoff circuit 199 stops power supply to at least the automatic transmission control electromagnetic valve 109*c*; the second gate circuit 166*b* resets the microprocessor CPU0 through the basic reset signal RST0 and the transmission control abnormality signal QAE2 when the second state has not been established, and after the second storage circuit 165*b* has stored the occurrence of an abnormality, the second gate circuit 166*b* prohibits the transmission control abnormality signal QAE2 from performing reset processing of the microprocessor CPU0 so that a continuous non-runaway repeated abnormality related to the transmission control is suppressed from providing an effect to the fuel injection control; when after the second storage circuit 165*b* has stored the occurrence of an abnormality, the variable-speed forward driving mode is once manually cancelled and then the driving mode is switched to the backward driving mode or the low-speed forward driving mode, the transmission control output OUT20 becomes effective so as to perform energization drive of the low-speed step selection electromagnetic valve 109*d*. As described above, with regard to claim 8 of the present invention, there is the similar feature as claim 4 in Embodiment 1.

The monitoring control circuit unit 130D stops transmission of question information on valve-opening control for creating the valve opening control abnormality signal QAE1, after the first storage circuit 165*a* has stored the first state, or stops transmission of question information on transmission control for creating the transmission control abnormality signal QAE2 after the second storage circuit 165*b* has stored the second state; alternatively, the main control circuit unit 120A stops implementation of a control program for creating the valve-opening control output OUT1 for the intake valve opening degree control motor 108*a*, after the first storage circuit 165*a* has stored the first state, or stops implementation of a control program for creating the speed-change control output OUT22 for the automatic transmission control electromagnetic valve 109*c*, after the second storage circuit 165*b* has stored the second state. As described above, with regard to claim 9 of the present invention, there is the similar feature as claim 5 in Embodiment 1.

The second main control circuit unit 120C generates the speed-change control output OUT22 for the automatic transmission control electromagnetic valve 109*c* and the transmission control output OUT20 for the low-speed step selection electromagnetic valve 109*d*; the second monitoring control circuit unit 130D2 is provided with the transmission system control abnormality determination means 308*b* that sequentially transmits to the second microprocessor CPU20 in operation a plurality of question information pieces related to at least a creation program for the speed-change control output OUT22, receives from the second microprocessor CPU20 the answer information pieces corresponding to the question information pieces, compares the answer information pieces with the respective corresponding correct answer information pieces, preliminarily stored in the second monitoring control circuit unit 130D2, determines whether or not a code check abnormality and an answering-response delay exist in the answer information so as to determine whether or not a transmission control abnormality including a communication abnormality and a question-answer abnormality exists, and then creates the transmission control abnormality signal QAEk (k=22), which is one of the transmission system control abnormality signals ER22; the second error processing circuit unit 160D2 is provided with the second gate circuit 166*b* and the second storage circuit 165*b* that is set when the second state is established in which the occurrence count or the occurrence frequency of each of the basic reset signal RST0 and the transmission control abnormality signal QAE22 becomes the same as or larger than a predetermined threshold value or the total occurrence count or the total occurrence frequency of the basic reset signal RST0 and the transmission control abnormality signal QAE22 becomes the same as or larger than a predetermined threshold value.

Then, when the second storage circuit 165*b* has stored occurrence of an abnormality, the second cutoff circuit 199 stops power supply to the automatic transmission control electromagnetic valve 109*c* or stops the speed-change control output OUT22 from being generated; the second gate circuit 166*b* resets the second microprocessor CPU20 through the basic reset signal RST0 and the transmission control abnormality signal QAE22 when the second state has not been established, and after the second storage circuit 165*b* has stored occurrence of an abnormality, the second gate circuit 166*b* prohibits the transmission control abnormality signal QAE22 from performing reset processing of the second microprocessor CPU20 so that a continuous non-runaway repeated abnormality related to the transmission control is suppressed from providing an effect to the operation of other transmission control outputs; when after the second storage circuit 165*b* has stored the occurrence of an abnormality, the variable-speed forward driving mode is once manually cancelled and then the driving mode is switched to the backward driving mode or the low-speed forward driving mode, the transmission control output OUT20 becomes effective so as to perform energization drive of the low-speed step selection electromagnetic valve 109*d*. As described above, with regard to claim 10 of the present invention, there is the similar feature as claim 6 in Embodiment 2.

The first monitoring control circuit unit 130D1 stops transmission of question information on valve-opening control for creating the valve opening control abnormality signal QAE11, after the first storage circuit 165*a* has stored the first state, or the second monitoring control circuit unit 130D2 stops transmission of question information on transmission control for creating the transmission control abnormality signal QAE22, after the second storage circuit 165*b* has stored the second state; alternatively, the first main control circuit unit 120B stops implementation of a control program for creating the valve-opening control output OUT11 for the intake valve opening degree control motor 108*a*, after the first storage circuit 165*a* has stored the first state, or the second main control circuit unit 120C stops implementation of a control program for creating the speed-change control output OUT22 for the automatic transmission control electromagnetic valve 109*c*, after the second storage circuit 165*b* has stored the second state. As described above, with regard to claim 11 of the present invention, there is the similar feature as claim 7 in Embodiment 2.

The integrated circuit device 180 is provided with the main apparatus power supply control output RY00, the first auxiliary apparatus power supply control output RY01, the second auxiliary apparatus power supply control output RY02 that are connected with respective command terminals for generating the main apparatus power supply command output RY0, RY10, or RY20, the first auxiliary apparatus power supply command output RY1 or RY11, and the second auxiliary apparatus power supply command output RY2 or RY22; the main apparatus power supply command output RY0, RY10, or RY20 generates a power supply output as the power switch 105 is closed; accordingly, the microprocessor CPU0, the first microprocessor CPU10, or the second microprocessor CPU20 is supplied with electric power; as the control operation thereof starts, the power supply command is maintained and self-holding power supply is implemented while the watchdog timer 161 detects the normal operation of the microprocessor; the fuel injection control output OUT0 or OUT10 generated by the microprocessor CPU0 or the first microprocessor CPU10, as the case may be, performs driving control of the fuel-injection electromagnetic valve 107a, or the transmission control output OUT20 generated by the microprocessor CPU0 or the second microprocessor CPU20 performs driving control of low-speed step selection electromagnetic valve 109d, which is a basic electric load, included in the automatic transmission 109a, other than the automatic transmission control electromagnetic valve 109c; the first auxiliary apparatus power supply command output RY1 or RY11 closes the power supply circuit for the intake valve opening degree control motor 108a so that the valve-opening control output OUT1 or OUT11 generated by the microprocessor CPU0 or the first microprocessor CPU10, as the case may be, performs driving control of the intake valve opening degree control motor 108a; the second auxiliary apparatus power supply command output RY2 or RY22 closes the power supply circuit for the automatic transmission 109a so that the transmission-control output OUT2 generated by the microprocessor CPU0 performs driving control of the automatic transmission 109a or so that the speed-change control output OUT22 generated by the second microprocessor CPU20 performs driving control of the automatic transmission control electromagnetic valve 109c.

As described above, with regard to claim 12 of the present invention, the integrated circuit device 180 that collaborates with any one of the microprocessors is provided with the first auxiliary apparatus power supply control output for valve opening control, the second auxiliary apparatus power supply control output for transmission control, and the main apparatus power supply control output to be utilized in engine control and transmission control. Thus, in the case where the engine control and the transmission control are performed by a single main control circuit unit, power supply to the whole transmission is implemented through the second auxiliary apparatus power supply control output, and in the case where the transmission control is performed by the second main control circuit unit, power supply to the whole transmission through the main apparatus power supply control output and the stoppage of power supply, through the second auxiliary apparatus power supply control output, to the automatic transmission control electromagnetic valve are separately implemented, so that even when a transmission control abnormality occurs, control of the basic electric loads, other than the transmission control, can be performed; thus, there is demonstrated a characteristic that the functions of the integrated circuit device can be utilized without being wasted.

The first storage circuit 165a related to the valve opening control includes, as the valve opening system control abnormality signals ER1 or ER11, the basic reset signal RST0, the valve opening control abnormality signal QAE1 or QAE11, the valve opening control unit memory abnormality signal MME1 or MME11, and the valve opening control unit H/W abnormality signal HDE1 or HDE11, and stores the first state when each of the occurrence counts or the occurrence frequencies of the occurrence causes of these abnormalities becomes the same as or larger than a predetermined threshold value or when the total occurrence count or the total occurrence frequency thereof becomes the same as or larger than a predetermined threshold value; the valve opening control unit memory abnormality signal MME1 or MME11 is an abnormality detection signal that is created by the microprocessor CPU0 or the first microprocessor CPU10 when there occurs a code check abnormality in the RAM, among memories that collaborate with the microprocessor CPU0 or the first microprocessor CPU10, that is related to at least a valve-opening control region; the valve opening control unit H/W abnormality signal HDE1 or HDE11 is an abnormality detection signal that is created by the microprocessor CPU0 or the first microprocessor CPU10 when there occurs a hardware error that is caused by disconnection or a short circuit in part of the input/output circuits that are connected with the microprocessor CPU0 or the first microprocessor CPU10 and are related to valve-opening control; the integrated circuit device 180 is also provided with the second storage circuit 165b related to a transmission-control abnormality including a communication abnormality and a question-answer abnormality; the second storage circuit 165b includes, as the transmission system control abnormality signals ER2 or ER22, the basic reset signal RST0, the transmission control abnormality signal QAE2 or QAE22, the transmission control unit memory abnormality signal MME2 or MME22, and the transmission control unit H/W abnormality signal HDE2 or HDE22, and stores the second state when each of the occurrence counts or the occurrence frequencies of the occurrence causes of these abnormalities becomes the same as or larger than a predetermined threshold value or when the total occurrence count or the total occurrence frequency thereof becomes the same as or larger than a predetermined threshold value.

The transmission control abnormality signal QAE2 or QAE22 is an abnormality detection signal that relates to a creation program for speed-change control output OUT22, which is created by the microprocessor CPU0 or the second microprocessor CPU20, and that is created by the shared monitoring control circuit unit 130D in the case where when each of two or more question information pieces to be generated by the shared monitoring control circuit unit 130D and corresponding answer information obtained from the microprocessor CPU0 or the second microprocessor CPU20 are compared with each other, no predetermined correct answer information is obtained; the transmission control unit memory abnormality signal MME2 or MME22 is an abnormality detection signal that is created by the microprocessor CPU0 or the second microprocessor CPU20 when there occurs a code check abnormality in the RAM, among memories that collaborate with the microprocessor CPU0 or the second microprocessor CPU20, that is related to at least a transmission control region; the transmission control unit H/W abnormality signal HDE2 or HDE22 is an abnormality detection signal that is created by the microprocessor CPU0 or the second microprocessor CPU20 when there occurs a hardware error that is caused by disconnection or a short circuit in part of the input/output circuits that are connected with the microprocessor CPU0 or the second microprocessor CPU20 and are related to transmission control; when the second storage circuit 165a stores the occurrence of an abnormality, the second cutoff circuit 199 stops power supply to the automatic transmission 109a or driving of the automatic transmission control electromagnetic valve 109c is stopped, and then the first and the second storage circuits 165a and 165b are initializes when the power switch 105 is closed.

As described above, with regard to claim 13 of the present invention, the first storage circuit that stores the occurrence of the first state stops the valve-opening control in response to the occurrence states of the basic reset signal generated by the watchdog timer, and the valve opening control abnormality signal, the valve opening control unit memory abnormality signal, or the valve opening control unit H/W abnormality signal; the second storage circuit that stores the occurrence of the second state stops the valve-opening control in response to the occurrence states of the basic reset signal generated by the watchdog timer, and the transmission control abnormality signal, the transmission control unit memory abnormality signal, or the transmission unit H/W abnormality signal; the first and second storage circuits are reset when the power switch is turned on. Thus, because respective question-answer abnormalities in the valve-opening control and the transmission control are monitored separately from each other and diverse abnormality detections can be processed in a controlled manner by a unified error processing circuit, there is demonstrated a characteristic that the integrated circuit device can be simplified. Each of Embodiments 1 and 2 demonstrates the same characteristic.

The microprocessor CPU0, the first microprocessor CPU10, the second microprocessor CPU20 are initialized and restarted by the composite reset signals RST00, RST 10, and RST20, respectively, when an abnormality occurs; the composite reset signal RST00, RST10, or RST20 is obtained by applying logical-sum operation to the basic reset signal RST0 generated by the watchdog timer 161, basic control abnormality signal QAE0, QAE10, or QAE20, the basic unit memory abnormality signal MME0, MME10, or MME20, the basic unit H/W abnormality signal HDE0, HDE10, or HDE20, and one of or both of the first reset signal RST1 or RST11 and the second reset signal RST2 or RST22, as the case may be; the basic control abnormality signal QAE0, QAE10, or QAE20 is an abnormality detection signal that relates to a creation program for the basic control including the fuel injection control output OUT0 or OUT10 which is created by the microprocessor CPU0 or the first microprocessor CPU10, or the transmission control output OUT20 which is created by the second microprocessor CPU20, and that is created by the shared monitoring control circuit unit 130D in the case where when each of two or more question information pieces to be generated by the shared monitoring control circuit unit 130D and corresponding answer information obtained from the microprocessor CPU0, or the first microprocessor CPU10 and the second microprocessor CPU20 are compared with each other, no predetermined correct answer information is obtained; the basic unit memory abnormality signal MME0, MME10, or MME20 is an abnormality detection signal that is created by the microprocessor CPU0, or the first microprocessor CPU10 and the second microprocessor CPU20 when there occurs a code check abnormality in the RAM, among memories that collaborate with the microprocessor CPU0, or the first microprocessor CPU10 and the second microprocessor CPU20, as the case may be, that is related to at least a transmission control region.

The basic unit H/W abnormality signal HDE0, HDE10, or HDE20 is an abnormality detection signal that is created by the microprocessor CPU0, the first microprocessor CPU10, or the second microprocessor CPU20 when there occurs a hardware error that is caused by disconnection or a short circuit in part of the input/output circuits that are connected with the microprocessor CPU0, the first microprocessor CPU10, or the second microprocessor CPU20, as the case may be, and are related to the basic control; the first reset signal RST1 or RST11 is a logical-sum signal obtained by applying logical-sum operation to the basic reset signal RST0, the valve opening control abnormality signal QAE1 or QAE11, the valve opening control unit memory abnormality signal MME1 or MME11, and the valve opening control unit H/W abnormality signal HDE1 or HDE11, as the case may be, which forms the valve opening system control abnormality signals ER1 or ER11 for the first storage circuit 165a, and this logical-sum signal is cut off by the first gate circuit 166a as the first storage circuit 165a stores the occurrence of an abnormality; the second reset signal RST2 or RST22 is a logical-sum signal obtained by applying logical-sum operation to the basic reset signal RST0, the transmission control abnormality signal QAE2 or QAE22, the transmission control unit memory abnormality signal MME2 or MME22, and the transmission control unit H/W abnormality signal HDE2 or HDE22, as the case may be, which forms the transmission system control abnormality signals ER2 or ER22 for the second storage circuit 165b, and this logical-sum signal is cut off by the second gate circuit 166a as the second storage circuit 165b stores the occurrence of an abnormality; when there exists an overlapping part between the basic control region, and the valve-opening control region or the transmission control region of the program memory, the overlapping part is dealt as the one that belongs to any one of or both of the basic control region, and the valve-opening control region or the transmission control region.

As described above, with regard to claim 14 of the present invention, each of the microprocessors is initialized and restarted by the composite reset signal; the composite reset signal includes a question-answer abnormality signal, a memory abnormality detection signal, and a hardware abnormality signal that relate to each of the basic control, the valve-opening control, and the transmission control; among the abnormality signals, the abnormality signal that relates to the valve-opening control becomes ineffective as the first storage circuit stores the occurrence of an abnormality, and the abnormality signal that relates to the transmission control becomes ineffective as the second storage circuit stores the occurrence of an abnormality. Therefore, there is demonstrated a characteristic that diverse abnormality detection means enhance the overall abnormality-monitoring function, that it is prevented that when the occurrence of any abnormality is detected, the basic function is stopped and hence evacuation driving cannot be implemented, and that the evacuation driving can be implemented in diverse evacuation driving modes. Each of Embodiments 1 and 2 demonstrates the same characteristic.

Various modifications and alterations of this invention will be apparent to those skilled in the art without departing from the scope and spirit of this invention, and it should be understood that this is not limited to the illustrative embodiments set forth herein.

What is claimed is:

1. A multi-function vehicle engine control system whose collective case includes a main control circuit unit connected with an engine control output circuit unit and a transmission control output circuit unit, a monitoring control circuit unit serial connected with the main control circuit unit, and an error processing circuit unit, wherein the main control circuit unit includes a microprocessor that operates with an opening/closing signal or an analogue signal, as an input signal, obtained from a first sensor group and a second sensor group, which are utilized in engine control and transmission control, and that generates at least a fuel injection control output for a fuel-injection electromagnetic valve, a valve-opening control output for an intake valve opening degree control motor for an intake valve provided in an air-intake throttle, and a transmission-control output, including at least a speed-change control output, for an automatic transmission; and a valve-opening drive mechanism of the intake valve using the intake valve opening degree control motor includes an initial-position returning mechanism that makes it possible to perform evacuation driving using a fixed intake valve opening degree when power supply to the intake valve opening degree control motor is stopped, wherein a transmission driving mechanism of the automatic transmission includes a transmission ratio fixation mechanism that makes it possible to at least travel forward at a fixed transmission ratio suitable for middle- or high-speed driving when during variable-speed forward driving, power supply to the automatic transmission is stopped or when power-supply driving of all automatic transmission control electromagnetic valves included in the automatic transmission is stopped, wherein the monitoring control circuit unit is provided with a valve-opening system control abnormality determinator that sequentially transmits to the microprocessor in operation a plurality of question information pieces related to at least a creation program for the valve-opening control output, receives from the microprocessor answer information pieces corresponding to the question information pieces, compares the answer information pieces with the respective corresponding correct answer information pieces, preliminarily stored in the monitoring control circuit unit, determines whether or not a code check abnormality and an answering-response delay exist in the answer information so as to determine whether or not a valve-opening control abnormality including a communication abnormality and a question-answer abnormality exists, and then creates a valve opening control abnormality signal, which is one of valve opening system control abnormality signals, wherein the error processing circuit unit is provided with a watchdog timer that generates a basic reset signal when a calculation period of the microprocessor is abnormal and then initializes and restarts the microprocessor, a first storage circuit that is set when a first state is established in which the occurrence count or the occurrence frequency of each of the basic reset signal and the valve opening control abnormality signal becomes the same as or larger than a predetermined threshold value or the total occurrence count or the total occurrence frequency of the basic reset signal and the valve opening control abnormality signal becomes the same as or larger than a predetermined threshold value, and a first gate circuit, wherein when the first storage circuit has stored the occurrence of an abnormality, a first cutoff circuit stops power supply to the intake valve opening degree control motor, wherein the first gate circuit resets the microprocessor through the basic reset signal and the valve opening control abnormality signal when the first state has not been established, and after the first storage circuit has stored the occurrence of an abnormality, the first gate circuit prohibits the valve opening control abnormality signal from performing reset processing of the microprocessor so that a continuous non-runaway repeated abnormality related to valve-opening control is suppressed from providing an effect to fuel injection control, and wherein the error processing circuit unit further detects and stores an occurrence state of at least a transmission system control abnormality signal, and a second cutoff circuit, which responds to the transmission system control abnormality signal, stops power supply to at least the automatic transmission control electromagnetic valve in the automatic transmission by having detected a transmission-control abnormality.

2. A function-separated vehicle engine control system whose first case includes a first main control circuit unit connected with an engine control output circuit unit, a first monitoring control circuit unit serial connected with the first main control circuit unit, and a first error processing circuit unit, wherein the vehicle engine control system is connected with a transmission control apparatus whose second case includes a second main control circuit unit connected with a transmission control output circuit unit, a second monitoring control circuit unit serial connected with the second main control circuit unit, and a second error processing circuit unit, wherein the first main control circuit unit includes a first microprocessor that operates with an opening/closing signal or an analogue signal, as an input signal, obtained from a first sensor group, which is utilized in engine control, and a second sensor group, which is shared with partial transmission control, and that generates at least a fuel injection control output for a fuel-injection electromagnetic valve and a valve-opening control output for an intake valve opening degree control motor for an intake valve provided in an air-intake throttle, wherein a valve-opening drive mechanism of the intake valve using the intake valve opening degree control motor includes an initial-position returning mechanism that makes it possible to perform evacuation driving using a fixed intake valve opening degree when power supply to the intake valve opening degree control motor is stopped, wherein the second main control circuit unit includes a second microprocessor that operates with an opening/closing signal or an analogue signal, as an input signal, obtained from the second sensor group utilized in transmission control and the first sensor group, which is shared with partial engine control, and that generates at least a speed-change control output for an automatic transmission control electromagnetic valve, wherein a transmission driving mechanism of an automatic transmission containing the automatic transmission control electromagnetic valve includes a transmission ratio fixation mechanism that makes it possible to at least travel forward at a fixed transmission ratio suitable for middle- or high-speed driving when during variable-speed forward driving, power supply to the automatic transmission is stopped or when driving of all the automatic transmission control electromagnetic valves is stopped, wherein the first monitoring control circuit unit is provided with a valve-opening system control abnormality determinator that sequentially transmits to the first microprocessor in operation a plurality of question information pieces related to at least a creation program for the valve-opening control output, receives from the first microprocessor answer information pieces corresponding to the question information pieces, compares the answer information pieces with the respective corresponding correct answer information pieces, preliminarily stored in the first monitoring control circuit unit, determines whether or not a code check abnormality and an answering-response delay exist in the answer information so as to determine whether or not a valve-opening control abnormality including a communication abnormality and a question-answer abnormality exists, and then creates a valve opening control abnormality signal, which is one of valve opening system control abnormality signals, wherein the first error processing circuit unit is provided with a watchdog timer that generates a basic reset signal when a calculation period of the first microprocessor is abnormal and then initializes and restarts the first microprocessor, a first storage circuit that is set when a first state is established in which the occurrence count or the occurrence frequency of each of the basic reset signal and the valve opening control abnormality signal becomes the same as or larger than a predetermined threshold value or the total occurrence count or the total occurrence frequency of the basic reset signal and the valve opening control abnormality signal becomes the same as or larger than a predetermined threshold value, and a first gate circuit, wherein when the first storage circuit has stored the occurrence of an abnormality, a first cutoff circuit stops power supply to the intake valve opening degree control motor, wherein the first gate circuit resets the first microprocessor through the basic reset signal and the valve opening control abnormality signal when the first state has not been established, and after the first storage circuit has stored the occurrence of an abnormality, the first gate circuit prohibits the valve opening control abnormality signal from performing reset processing of the first microprocessor so that a continuous non-runaway repeated abnormality related to valve-opening control is suppressed from providing an effect to fuel injection control, and wherein the second error processing circuit unit detects and stores an occurrence state of at least a transmission system control abnormality signal, and a second cutoff circuit, which responds to the transmission system control abnormality signal, stops driving of or power supply to at least the automatic transmission control electromagnetic valve in the automatic transmission by having detected a transmission-control abnormality.

3. A multi-function vehicle engine control system whose collective case includes a main control circuit unit connected with an engine control output circuit unit and a transmission control output circuit unit, a monitoring control circuit unit serial connected with the main control circuit unit, and an error processing circuit unit, or a function-separated vehicle engine control system whose first case includes a first main control circuit unit connected with an engine control output circuit unit, a first monitoring control circuit unit serial connected with the first main control circuit unit, and a first error processing circuit unit, wherein the function-separated vehicle engine control system is connected with a transmission control apparatus whose second case includes a second main control circuit unit connected with a transmission control output circuit unit, a second monitoring control circuit unit serial connected with the second main control circuit unit, and a second error processing circuit unit, wherein the monitoring control circuit unit, and the first monitoring control circuit unit and the second monitoring control circuit unit, and, the error processing circuit unit, and the first error processing circuit unit and the second error processing circuit unit are all integrated in such a way that the redundancy of common part among the corresponding circuit units is avoided; and the integrated device forms a shared integrated circuit device that collaborates with the main control circuit unit, the first main control circuit unit, or the second main control circuit unit, wherein the main control circuit unit or the first main control circuit unit includes a microprocessor or a first microprocessor, as the case may be, that operates with an opening/closing signal or an analogue signal, as an input signal, obtained from a first sensor group, which is utilized in engine control, and a second sensor group, which is utilized in transmission control, and that generates at least a fuel injection control output for a fuel-injection electromagnetic valve and a valve-opening control output for an intake valve opening degree control motor for an intake valve provided in an air-intake throttle, wherein the main control circuit unit or the second main control circuit unit includes the microprocessor or the second microprocessor, as the case may be, that operates with an opening/closing signal or an analogue signal, as an input signal, obtained from the first sensor group, which is utilized in engine control, and the second sensor group, which is utilized in transmission control, and that generates a transmission-control output, including at least a speed-change control output, for an automatic transmission, wherein a valve-opening drive mechanism of the intake valve using the intake valve opening degree control motor includes an initial-position returning mechanism that makes it possible to perform evacuation driving using a fixed intake valve opening degree when power supply to the intake valve opening degree control motor is stopped, wherein a transmission driving mechanism of the automatic transmission includes a transmission ratio fixation mechanism that makes it possible to at least travel forward at a fixed transmission ratio suitable for middle- or high-speed driving when during variable-speed forward driving, power supply to the automatic transmission is stopped or when power-supply driving of all automatic transmission control electromagnetic valves included in the automatic transmission is stopped, wherein a shared monitoring control circuit unit incorporated in the integrated circuit device is provided with a valve-opening system control abnormality determinator that sequentially transmits to the microprocessor or the first microprocessor in operation a plurality of question information pieces related to at least a creation program for the valve-opening control output, receives from the microprocessor or the first microprocessor answer information pieces corresponding to the question information pieces, compares the answer information pieces with the respective corresponding correct answer information pieces, preliminarily stored in the shared monitoring control circuit unit, determines whether or not a code check abnormality and an answering-response delay exist in the answer information so as to determine whether or not a valve-opening control abnormality including a communication abnormality and a question-answer abnormality exists, and then creates a valve opening control abnormality signal, which is one of valve opening system control abnormality signals, wherein a shared error processing circuit unit incorporated in the integrated circuit device is provided with a watchdog timer that generates a basic reset signal when a calculation period of the microprocessor or the first microprocessor is abnormal and then initializes and restarts the microprocessor or the first microprocessor, a first storage circuit that is set when a first state is established in which the occurrence count or the occurrence frequency of each of the basic reset signal and the valve opening control abnormality signal becomes the same as or larger than a predetermined threshold value or the total occurrence count or the total occurrence frequency of the basic reset signal and the valve opening control abnormality signal becomes the same as or larger than a predetermined threshold value, and a first gate circuit, wherein when the first storage circuit has stored the occurrence of an abnormality, a first cutoff circuit stops power supply to the intake valve opening degree control motor, wherein the first gate circuit resets the microprocessor or the first microprocessor through the basic reset signal and the valve opening control abnormality signal when the first state has not been established, and after the first storage circuit has stored the occurrence of an abnormality, the first gate circuit prohibits the valve opening control abnormality signal from performing reset processing of the microprocessor or the first microprocessor so that a continuous non-runaway repeated abnormality related to valve-opening control is suppressed from providing an effect to fuel injection control, and wherein the main control circuit unit or the second main control circuit unit collaborates with the shared error processing circuit unit incorporated in the integrated circuit device so as to detect and store an occurrence state of at least a transmission system control abnormality signal, and a second cutoff circuit, which responds to the transmission system control abnormality signal, stops a driving output to at least the automatic transmission control electromagnetic valve in the automatic transmission by having detected a transmission-control abnormality.

4. The vehicle engine control system according to claim 1, wherein the transmission-control output to be generated by the main control circuit unit includes the speed-change control output for the automatic transmission control electromagnetic valve and a transmission control output for a low-speed step selection electromagnetic valve, wherein the monitoring control circuit unit is provided with a transmission system control abnormality determinator that sequentially transmits to the microprocessor in operation a plurality of question information pieces related to at least a creation program for the speed-change control output, receives from the microprocessor answer information pieces corresponding to the question information pieces, compares the answer information pieces with the respective corresponding correct answer information pieces, preliminarily stored in the monitoring control circuit unit, determines whether or not a code check abnormality and an answering-response delay exist in the answer information so as to determine whether or not a transmission control abnormality including a communication abnormality and a question-answer abnormality exists, and then creates a transmission control abnormality signal, which is one of the transmission system control abnormality signals, wherein the error processing circuit unit is provided with a second gate circuit and a second storage circuit that is set when a second state is established in which the occurrence count or the occurrence frequency of each of the basic reset signal generated by the watchdog timer and the transmission control abnormality signal becomes the same as or larger than a predetermined threshold value or the total occurrence count or the total occurrence frequency of the basic reset signal and the transmission control abnormality signal becomes the same as or larger than a predetermined threshold value, wherein when the second storage circuit has stored the occurrence of an abnormality, the second cutoff circuit stops power supply to at least the automatic transmission control electromagnetic valve, wherein the second gate circuit resets the microprocessor through the basic reset signal and the transmission control abnormality signal when the second state has not been established, and after the second storage circuit has stored the occurrence of an abnormality, the second gate circuit prohibits the transmission control abnormality signal from performing reset processing of the microprocessor so that a continuous non-runaway repeated abnormality related to transmission control is suppressed from providing an effect to fuel injection control, and wherein when after the second storage circuit has stored the occurrence of an abnormality, a variable-speed forward driving mode is once manually cancelled and then the driving mode is switched to a backward driving mode or a low-speed forward driving mode, the transmission control output becomes effective so as to perform energization drive of the low-speed step selection electromagnetic valve.

5. The vehicle engine control system according to claim 4, wherein the monitoring control circuit unit stops transmission of question information on valve-opening control for creating the valve opening control abnormality signal, after the first storage circuit has stored the first state, or stops transmission of question information on transmission control for creating the transmission control abnormality signal, after the second storage circuit has stored the second state; alternatively, the main control circuit unit stops implementation of a control program for creating the valve-opening control output for the intake valve opening degree control motor, after the first storage circuit has stored the first state, or stops implementation of a control program for creating the speed-change control output for the automatic transmission control electromagnetic valve, after the second storage circuit has stored the second state.

6. The vehicle engine control system according to claim 2, wherein the second main control circuit unit generates the speed-change control output for the automatic transmission control electromagnetic valve and the transmission control output for the low-speed step selection electromagnetic valve, wherein the second monitoring control circuit unit is provided with a transmission system control abnormality determinator that sequentially transmits to the second microprocessor in operation a plurality of question information pieces related to at least a creation program for the speed-change control output, receives from the second microprocessor answer information pieces corresponding to the question information pieces, compares the answer information pieces with the respective corresponding correct answer information pieces, preliminarily stored in the second monitoring control circuit unit, determines whether or not a code check abnormality and an answering-response delay exist in the answer information so as to determine whether or not a transmission control abnormality including a communication abnormality and a question-answer abnormality exists, and then creates a transmission control abnormality signal, which is one of the transmission system control abnormality signals, wherein the second error processing circuit unit is provided with a second gate circuit and a second storage circuit that is set when a second state is established in which the occurrence count or the occurrence frequency of each of the basic reset signal generated by the watchdog timer and the transmission control abnormality signal becomes the same as or larger than a predetermined threshold value or the total occurrence count or the total occurrence frequency of the basic reset signal and the transmission control abnormality signal becomes the same as or larger than a predetermined threshold value, wherein when the second storage circuit has stored the occurrence of an abnormality, the second cutoff circuit stops power supply to the automatic transmission control electromagnetic valve or stops the speed-change control output from being generated, wherein the second gate circuit resets the second microprocessor through the basic reset signal and the transmission control abnormality signal when the second state has not been established, and after the second storage circuit has stored the occurrence of an abnormality, the second gate circuit prohibits the transmission control abnormality signal from performing reset processing of the second microprocessor so that a continuous non-runaway repeated abnormality related to transmission control is suppressed from providing an effect to operations of other transmission control outputs, and wherein when after the second storage circuit has stored the occurrence of an abnormality, a variable-speed forward driving mode is once manually cancelled and then the driving mode is switched to a backward driving mode or a low-speed forward driving mode, the transmission control output becomes effective so as to perform energization drive of the low-speed step selection electromagnetic valve.

7. The vehicle engine control system according to claim 6,
wherein the first monitoring control circuit unit stops transmission of question information on valve-opening control for creating the valve opening control abnormality signal, after the first storage circuit has stored the first state, or the second monitoring control circuit unit stops transmission of question information on transmission control for creating the transmission control abnormality signal, after the second storage circuit has stored the second state; alternatively, the first main control circuit unit stops implementation of a control program for creating the valve-opening control output for the intake valve opening degree control motor, after the first storage circuit has stored the first state, or the second main control circuit unit stops implementation of a control program for creating the speed-change control output for the automatic transmission control electromagnetic valve, after the second storage circuit has stored the second state.

8. The vehicle engine control system according to claim 3,
wherein the transmission-control output to be generated by the main control circuit unit includes the speed-change control output for the automatic transmission control electromagnetic valve and a transmission control output for a low-speed step selection electromagnetic valve, wherein the monitoring control circuit unit is provided with a transmission system control abnormality determinator that sequentially transmits to the microprocessor in operation a plurality of question information pieces related to at least a creation program for the speed-change control output, receives from the microprocessor answer information pieces corresponding to the question information pieces, compares the answer information pieces with the respective corresponding correct answer information pieces, preliminarily stored in the monitoring control circuit unit, determines whether or not a code check abnormality and an answering-response delay exist in the answer information so as to determine whether or not a transmission control abnormality including a communication abnormality and a question-answer abnormality exists, and then creates a transmission control abnormality signal, which is one of the transmission system control abnormality signals, wherein the error processing circuit unit is provided with a second gate circuit and a second storage circuit that is set when a second state is established in which the occurrence count or the occurrence frequency of each of the basic reset signal generated by the watchdog timer and the transmission control abnormality signal becomes the same as or larger than a predetermined threshold value or the total occurrence count or the total occurrence frequency of the basic reset signal and the transmission control abnormality signal becomes the same as or larger than a predetermined threshold value, wherein when the second storage circuit has stored the occurrence of an abnormality, the second cutoff circuit stops power supply to at least the automatic transmission control electromagnetic valve, wherein the second gate circuit resets the microprocessor through the basic reset signal and the transmission control abnormality signal when the second state has not been established, and after the second storage circuit has stored the occurrence of an abnormality, the second gate circuit prohibits the transmission control abnormality signal from performing reset processing of the microprocessor so that a continuous non-runaway repeated abnormality related to transmission control is suppressed from providing an effect to fuel injection control, and wherein when after the second storage circuit has stored the occurrence of an abnormality, a variable-speed forward driving mode is once manually cancelled and then the driving mode is switched to a backward driving mode or a low-speed forward driving mode, the transmission control output becomes effective so as to perform energization drive of the low-speed step selection electromagnetic valve.

9. The vehicle engine control system according to claim 8,
wherein the monitoring control circuit unit stops transmission of question information on valve-opening control for creating the valve opening control abnormality signal, after the first storage circuit has stored the first state, or stops transmission of question information on transmission control for creating the transmission control abnormality signal, after the second storage circuit has stored the second state; alternatively, the main control circuit unit stops implementation of a control program for creating the valve-opening control output for the intake valve opening degree control motor, after the first storage circuit has stored the first state, or stops implementation of a control program for creating the speed-change control output for the automatic transmission control electromagnetic valve, after the second storage circuit has stored the second state.

10. The vehicle engine control system according to claim 3,
wherein the second main control circuit unit generates the speed-change control output for the automatic transmission control electromagnetic valve and the transmission control output for the low-speed step selection electromagnetic valve,
wherein the second monitoring control circuit unit is provided with a transmission system control abnormality determinator that sequentially transmits to the second microprocessor in operation a plurality of question information pieces related to at least a creation program for the speed-change control output, receives from the second microprocessor answer information pieces corresponding to the question information pieces, compares the answer information pieces with the respective corresponding correct answer information pieces, preliminarily stored in the second monitoring control circuit unit, determines whether or not a code check abnormality and an answering-response delay exist in the answer information so as to determine whether or not a transmission control abnormality including a communication abnormality and a question-answer abnormality exists, and then creates a transmission control abnormality signal, which is one of the transmission system control abnormality signals,
wherein the second error processing circuit unit is provided with a second gate circuit and a second storage circuit that is set when a second state is established in which the occurrence count or the occurrence frequency of each of the basic reset signal generated by the watchdog timer and the transmission control abnormality signal becomes the same as or larger than a predetermined threshold value or the total occurrence count or the total occurrence frequency of the basic reset signal and the transmission control abnormality signal becomes the same as or larger than a predetermined threshold value,
wherein when the second storage circuit has stored the occurrence of an abnormality, the second cutoff circuit stops power supply to the automatic transmission control electromagnetic valve or stops the speed-change control output from being generated,
wherein the second gate circuit resets the second microprocessor through the basic reset signal and the transmission control abnormality signal when the second state has not been established, and after the second storage circuit has stored the occurrence of an abnormality, the second gate circuit prohibits the transmission control abnormality signal from performing reset processing of the second microprocessor so that a continuous non-runaway repeated abnormality related to transmission control is suppressed from providing an effect to operations of other transmission control outputs, and
wherein when after the second storage circuit has stored the occurrence of an abnormality, a variable-speed forward driving mode is once manually cancelled and then the driving mode is switched to a backward driving mode or a low-speed forward driving mode, the transmission control output becomes effective so as to perform energization drive of the low-speed step selection electromagnetic valve.

11. The vehicle engine control system according to claim 10,
wherein the first monitoring control circuit unit stops transmission of question information on valve-opening control for creating the valve opening control abnormality signal, after the first storage circuit has stored the first state, or the second monitoring control circuit unit stops transmission of question information on transmission control for creating the transmission control abnormality signal, after the second storage circuit has stored the second state; alternatively, the first main control circuit unit stops implementation of a control program for creating the valve-opening control output for the intake valve opening degree control motor, after the first storage circuit has stored the first state, or the second main control circuit unit stops implementation of a control program for creating the speed-change control output for the automatic transmission control electromagnetic valve, after the second storage circuit has stored the second state.

12. The vehicle engine control system according to claim 3,
wherein the integrated circuit device is provided with a main apparatus power supply control output, a first auxiliary apparatus power supply control output, and a second auxiliary apparatus power supply control output that are connected with respective command terminals for generating a main apparatus power supply command output, a first auxiliary apparatus power supply command output, and a second auxiliary apparatus power supply command output, respectively,
wherein the main apparatus power supply command output generates a power supply output as the power switch is closed; accordingly, the microprocessor is or the first microprocessor and the second microprocessor are supplied with electric power; and as the control operation thereof starts, a power supply command is maintained and self-holding power supply is implemented while the watchdog timer detects the normal operation of each of the microprocessors,
wherein a fuel injection control output generated by the microprocessor or the first microprocessor performs driving control of the fuel-injection electromagnetic valve, or a transmission control output generated by the microprocessor or the second microprocessor performs driving control of a low-speed step selection electromagnetic valve, which is a basic electric load, included in the automatic transmission, other than the automatic transmission control electromagnetic valve, wherein the first auxiliary apparatus power supply command output closes a power supply circuit for the intake valve opening degree control motor so that the valve-opening control output generated by the microprocessor or the first microprocessor performs driving control of the intake valve opening degree control motor, and wherein the second auxiliary apparatus power supply command output closes a power supply circuit for the automatic transmission so that the transmission-control output generated by the microprocessor performs driving control of the automatic transmission or so that the speed-change control output generated by the second microprocessor performs driving control of the automatic transmission control electromagnetic valve.

13. The vehicle engine control system according to claim 12, wherein the first storage circuit related to the valve opening control includes, as the valve opening system control abnormality signals, the basic reset signal, the valve opening control abnormality signal, the valve opening control unit memory abnormality signal, and the valve opening control unit H/W abnormality signal, and stores occurrence of the first state when the occurrence count or the occurrence frequency of each of the occurrence causes of these abnormalities becomes the same as or larger than a predetermined threshold value or when the total occurrence count or the total occurrence frequency thereof becomes the same as or larger than a predetermined threshold value, wherein the valve opening control unit memory abnormality signal is an abnormality detection signal that is created by the microprocessor or the first microprocessor when there occurs a code check abnormality in a RAM, among memories that collaborate with the microprocessor or the first microprocessor, that is related to at least a valve-opening control region, wherein the valve opening control unit H/W abnormality signal is an abnormality detection signal that is created by the microprocessor or the first microprocessor when there occurs a hardware error that is caused by disconnection or a short circuit in part of the input/output circuits that are connected with the microprocessor or the first microprocessor and are related to the valve-opening control, wherein the integrated circuit device is also provided with a second storage circuit related to a transmission-control abnormality including a communication abnormality and a question-answer abnormality; and the second storage circuit includes, as the transmission system control abnormality signals, the basic reset signal, the transmission control abnormality signal, the transmission control unit memory abnormality signal, and the transmission control unit H/W abnormality signal, and stores occurrence of a second state when the occurrence count or the occurrence frequency of each of the occurrence causes of these abnormalities becomes the same as or larger than a predetermined threshold value or when the total occurrence count or the total occurrence frequency thereof becomes the same as or larger than a predetermined threshold value, wherein the transmission control abnormality signal is an abnormality detection signal that relates to a creation program for speed-change control output, which is created by the microprocessor or the second microprocessor, and that is created by the shared monitoring control circuit unit in the case where when each of two or more question information pieces to be generated by the shared monitoring control circuit unit and corresponding answer information obtained from the microprocessor or the second microprocessor are compared with each other, no predetermined correct answer information is obtained, wherein the transmission control unit memory abnormality signal is an abnormality detection signal that is created by the microprocessor or the second microprocessor when there occurs a code check abnormality in a RAM, among memories that collaborate with the microprocessor or the second microprocessor, that is related to at least a transmission control region, wherein the transmission control unit H/W abnormality signal is an abnormality detection signal that is created by the microprocessor or the second microprocessor when there occurs a hardware error that is caused by disconnection or a short circuit in part of the input/output circuits that are connected with the microprocessor or the second microprocessor and are related to the transmission control, and wherein when the second storage circuit stores occurrence of an abnormality, the second cutoff circuit stops power supply to the automatic transmission or driving of the automatic transmission control electromagnetic valve is stopped, and then the first and the second storage circuits are initializes when the power switch is closed.

14. The vehicle engine control system according to claim 13, wherein the microprocessor is or the first microprocessor and the second microprocessor are initialized and restarted by a composite reset signal when an abnormality occurs, wherein the composite reset signal is obtained by applying logical-sum operation to a basic reset signal generated by the watchdog timer, a basic control abnormality signal, a basic unit memory abnormality signal, a basic unit H/W abnormality signal, and both of or any one of a first reset signal and a second reset signal, wherein the basic control abnormality signal is an abnormality detection signal that relates to a creation program for the basic control including the fuel injection control output which is created by the microprocessor or the first microprocessor, or the transmission control output which is created by the second microprocessor, and that is created by the shared monitoring control circuit unit in the case where when each of two or more question information pieces to be generated by the shared monitoring control circuit unit and corresponding answer information obtained from the microprocessor, or the first microprocessor and the second microprocessor are compared with each other, no predetermined correct answer information is obtained, wherein the basic unit memory abnormality signal is an abnormality detection signal that is created by the microprocessor, or the first microprocessor and the second microprocessor when there occurs a code check abnormality in a RAM, among memories that collaborate with the microprocessor, or the first microprocessor and the second microprocessor, that is related to at least a basic control region, wherein the basic unit H/W abnormality signal is an abnormality detection signal that is created by the microprocessor or the first microprocessor and the second microprocessor when there occurs a hardware error that is caused by disconnection or a short circuit in part of the input/output circuits that are connected with the microprocessor or the first microprocessor and the second microprocessor and that are related to the basic control, wherein the first reset signal is a logical-sum signal obtained by applying logical-sum operation to the basic reset signal, the valve opening control abnormality signal, the valve opening control unit memory abnormality signal, and the valve opening control unit H/W abnormality signal, which are the valve opening system control abnormality signals for the first storage circuit, and this logical-sum signal is cut off by the first gate circuit as the first storage circuit stores occurrence of an abnormality, wherein the second reset signal is a logical-sum signal obtained by applying logical-sum operation to the basic reset signal, the transmission control abnormality signal, the transmission control unit memory abnormality signal, and the transmission control unit H/W abnormality signal, which are the transmission system control abnormality signals for the second storage circuit, and this logical-sum signal is cut off by the second gate circuit as the second storage circuit stores occurrence of an abnormality, and wherein when there exists an overlapping part between the basic control region, and the valve-opening control region or the transmission control region of the program memory, the overlapping part is dealt as the one that belongs to any one of or both of the basic control region, and the valve-opening control region or the transmission control region.

\* \* \* \* \*